United States Patent [19]
Colwell et al.

[11] Patent Number: 5,471,633
[45] Date of Patent: Nov. 28, 1995

[54] IDIOM RECOGNIZER WITHIN A REGISTER ALIAS TABLE

[75] Inventors: Robert P. Colwell, Portland; Andrew F. Glew, Hillsboro; David B. Papworth, Beaverton; Glenn J. Hinton, Portland; David W. Clift, Hillsboro, all of Oreg.

[73] Assignee: Intel Corporation, Santa Clara, Calif.

[21] Appl. No.: 205,842

[22] Filed: Mar. 1, 1994

Related U.S. Application Data

[63] Continuation-in-part of Ser. No. 129,867, Sep. 30, 1993.
[51] Int. Cl.$^6$ ........................................ G06F 7/00
[52] U.S. Cl. .................. 395/800; 395/500; 364/DIG. 1; 364/255.1; 364/255.7; 364/259
[58] Field of Search ........................ 395/800, 375, 395/550, 500, 925, 725, 700, 775

[56] References Cited

U.S. PATENT DOCUMENTS

| | | | |
|---|---|---|---|
| 4,992,934 | 2/1991 | Portanova et al. | 395/375 |
| 4,992,938 | 2/1991 | Cooke et al. | 395/375 |
| 5,107,415 | 4/1992 | Sato et al. | 395/800 |
| 5,197,132 | 3/1993 | Steely et al. | 395/375 |
| 5,280,593 | 1/1994 | Bullions, III et al. | 395/375 |
| 5,355,457 | 10/1994 | Shebanow et al. | 395/375 |

OTHER PUBLICATIONS

"Metaflow Architecture", Popescu, et al., pp. 10–13 & 63–73, IEEE Micro, 1991 IEEE, *Metaflow Technologies, Inc.*

"PA7200: A PA–RISC Processor with Integrated High Performance MP Bus Interface", Kurpanek, et al., pp. 375–382, 1994 IEEE, *Hewlett–Packard Company.*

Author, Mike Johnson, entitled *Superscalar Microprocessor Design*, Advance Micro Devices, Prentice Hall Series in Innovative Technology, 1991, pp. 1–289.

*Primary Examiner*—Mehmet Geckil
*Attorney, Agent, or Firm*—Blakely, Sokoloff, Taylor & Zafman

[57] ABSTRACT

A register alias table unit (RAT) with an idiom recognition mechanism for overriding partial width conditions stalls is described. A partial width stall condition occurs during the RAT renaming process when a logical source register being renamed is larger than the corresponding physical source register pointed to by a renaming table. An idiom recognizer detects uops that zero their logical destination register and sets and clears zero bits in an iRAT array accordingly. The zero bits indicate which portions of an entry's physical source register are known to be zeros. A partial width stall override mechanism overrides a partial width stall condition when the zero bits for the physical source register causing the partial width stall indicate that the "missing" portion of the physical source register contains zeros. The performance of a microprocessor implementing such a RAT renaming mechanism with an idiom recognizer is improved because common partial width stalls are avoided.

56 Claims, 19 Drawing Sheets

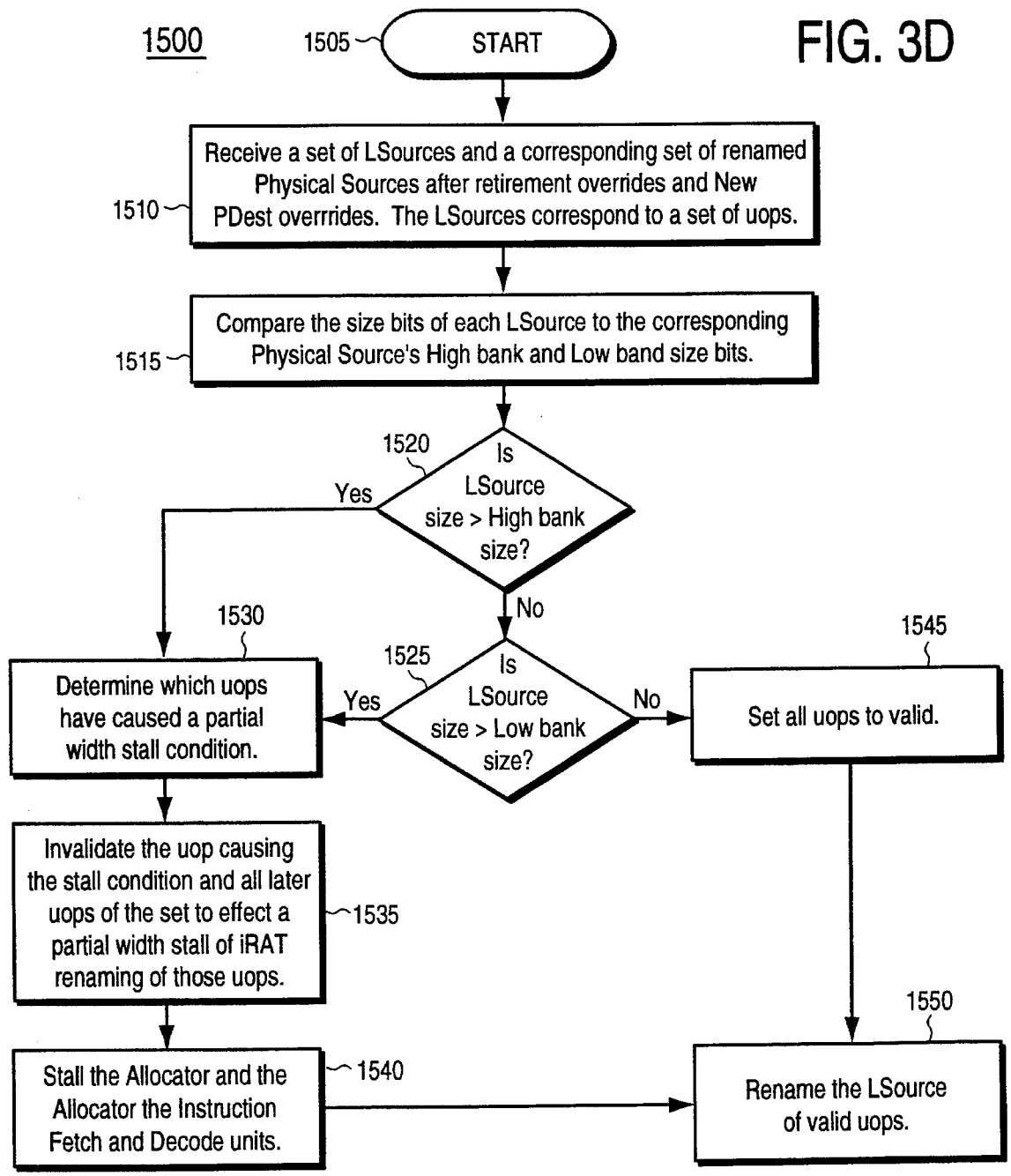

IDIOM RECOGNIZER WITHIN A REGISTER ALIAS TABLE

RELATED U.S. APPLICATION

This is a continuation-in-part of U.S. patent application entitled "N-Wide bypass for Data Dependencies within Register Alias Table", Ser. No. 08/129,867, filed on Sep. 30, 1993.

BACKGROUND OF THE INVENTION

1. Field of the Invention

The present invention relates to the field of microprocessor architecture. Specifically, the present invention relates to the field of microprocessor architecture for increasing processing efficiency within microprocessors having limited numbers of registers by providing a register renaming ability and, in addition, an idiom recognition ability for preventing certain partial width renaming stalls.

2. Related Art

Microprocessors execute instructions and micro-operations ("uops") by reading source operands from registers and storing destinations or result operands into registers. A register is a temporary storage area within a microprocessor for holding arithmetic and other results used by the microprocessor device. Different registers may be used for different functions. For example, some registers may be used primarily for storage of arithmetic results, while other registers may be used primarily for conveying status information via various flag bits (such as system status or floating point status). Registers arc individually composed of bits. A bit is a binary digit and may adopt either a "0" value or a "1" value. A given register may contain various bit widths. For example, a full width 32 bit register may also contain separate 8 bit widths or a separate 16 bit width. Each of the above different register widths for a given 32 bit register (i.e., partial widths of the 32 bit register) may be separately addressable.

The register set of the well known Intel architecture has specially defined registers. For background information regarding the register set of the well known Intel macroarchitecture, reference is made to Chapter 2 of the *i486 Microprocessor Programmer's Reference Manual*, published by Osborne-McGraw-Hill, 1990, which is also available directly from Intel Corporation of Santa Clara, Calif. In terms of the Intel macroarchitecture register set, 32-bit arithmetic registers are called eax, ebx, ecx, and edx. With reference to the full width register eax, this register is composed of other partial width registers of varying width; the low word 16 bits, bits 15–0, of the eax register are called the ax register. The low byte, bits 7–0, of the ax register is the al register. The high byte, bits 15–8, of the ax register is the ah register. Likewise in similar fashion, the other full width 32-bit registers, ebx, ecx, and edx individually contain separate registers of varying widths. The basic arithmetic registers for use within the Intel macroarchitecture register set include: eax, ebx, ecx, and edx (as well as the partial bit widths thereof). These are the logical registers.

The number of registers available within the Intel architecture register set is adequate within some microprocessor architectures. However, the register set of the Intel architecture is somewhat limited and it would be advantageous to be able to expand the register set in some way. Superscalar microprocessors, as any other microprocessor, could take advantage of the expanded register set to increase performance. A superscalar microprocessor simultaneously executes uops that do not have data dependencies between them. For instance, consider the pseudo code below.

| uop0: | mov | eax, 0x8A |
| uop1: | add | eax, ebx |
| uop2: | add | ecx, eax |

The uop1 may not execute simultaneously with uop0 because uop1 adds the value of eax with ebx and stores the result into eax. Therefore, uop1 requires the result of uop0 to perform its operation. Likewise, uop2 requires the result (i.e., eax) of uop1 and therefore may not execute simultaneously with uop1. When one uop requires as a source of information a register from a prior uop that is a destination register, this condition is referred to as a data dependency between the two uops. For instance, uop2 and uop1 are data dependent. Some data dependencies, like the above, are unavoidable and therefore impact on the performance of a superscalar microprocessor simply because some uops demand a particular execution order. These data dependencies are called true data dependencies.

However, other data dependencies of uops are not true data dependencies and are more the result of the limited size of a particular microprocessor's register set. Because a register set may be constrained in size, uops may tend to utilize the same registers as temporary storage locations (registers) rather than moving data to and from memory. This is the case because memory moves take quite a large amount of processing time and are very costly to processor overall performance. Therefore, a small register set may create a form of "bottleneck" in the performance stream of a superscalar microprocessor as multiple uops target the same register for temporary storage of data but really do not depend on the data of these registers for their own execution. For instance, consider the instruction code below:

| uop0: | mov | bx, 0x8A |
| uop1: | add | ax, bx |
| uop2: | mov | bx, cx |
| uop3: | inc | bx |

While uop1 is data dependent on the result of uop0 for the bx register, there are no data dependencies between uop2 and uop1. Although uop2 and uop1 both utilize the bx register, the source value of uop2 does not in any way depend on the outcome of the execution of uop0 or uop1 even though both uops in some way utilize the bx register. This is called a false dependency (or resource dependency) between uop1 and uop2. The same is true for uop3 in that uop3, while data dependent on uop2, does not depend on the results of either uop0 or uop1. Therefore, a superscalar microprocessor should (in principle) be able to at least execute uop1 and uop2 simultaneously. However, since they both utilize the bx register, it would be advantageous to be able to provide a microprocessor architecture to allow the above uops (uop1 and uop2) to simultaneously execute.

Superscalar microprocessors execute several operations simultaneously and therefore, any process that removes false data dependencies as discussed above must operate on a given set of operations simultaneously, the set being those operations that are simultaneously issued by the microprocessor within a given "cycle." Data dependencies may occur between operations of different sets or may occur within operations of the same set (i.e., intracyle). It would be advantageous to be able to eliminate false data dependencies between operands of different sets of operations and also between operands of the same set of operations. The present invention provides such advantageous result. Furthermore, it would be advantageous to preserve the use of partial widths of a larger register such as al, ah, and ax partial widths of the full width eax register while eliminating false data dependencies. The present invention provides such advantageous result.

When renaming of partial width registers is accommodated there are certain cases that cause renaming to stall. For instance, if a write to a partial width of a register is followed by a read of a larger width of the register, then the data required by the larger width read must be an assimilation of multiple previous writes to different pieces of the larger register. This is called a partial width stall. It would be advantageous to eliminate partial width stalls where possible. The present invention provides such advantageous result.

Accordingly, it is an object of the present invention to provide increased processor performance within a microprocessor, and particularly within a superscalar microprocessor. It is an object of the present invention to specifically increase the execution performance of a superscalar microprocessor by allowing more uops the ability to simultaneously execute within a given execution cycle. It is yet another object of the present invention to allow simultaneous execution of multiple uops that utilize the same registers as operands but are not truly data dependent uops. It is yet another object of the present invention to provide a mechanism ,and method for eliminating false data dependencies between operands of operations that are issued simultaneously by a superscalar microprocessor.

It is an object of the present invention to provide a register renaming capability that accommodates partial width registers. It is an object of the present invention to provide a register renaming capability that detects a partial width stall condition upon a larger width read of a register having partial widths that was previously renamed as a smaller width register. It is yet another object of the present invention to override partial width stalls in certain cases.

It is another object of the present invention to provide the above functionality within a high performance superscalar microprocessor resulting in increased execution performance. It is another object of the present invention to provide a general purpose computer system having such high performance superscalar microprocessor as an integral component. These and other objects of the present invention not specifically stated above will become evident according to discussions of the present invention to follow.

SUMMARY OF THE INVENTION

An apparatus and method for recognizing idioms to allow overriding of partial width stall conditions of a register alias table unit (RAT) within a microprocessor is described. A set of logical registers that may have partial widths is presented in program order for renaming to a set of physical registers. A partial width stall condition occurs when the width of a logical register being renamed exceeds the last width renamed by the corresponding physical register. The present invention includes a size comparison mechanism to detect this condition. When a partial width stall is detected, the RAT unit does not know where all of the larger width information is located. An idiom recognizer is included that detects operations that zero their logical destination registers and sets and clears a set of zero bits in the RAT accordingly. If a partial width stall condition is detected but the corresponding zero bits indicate that the portion of the logical register corresponding to the "missing" portion of the physical register contains zeros, the partial width stall condition can be overridden. A zero extend apparatus zeros "missing" portion of the physical register. In general the RAT unit provides register renaming to provide a larger physical register set than would ordinarily be available within a given macroarchitecture's logical register set to eliminate false data dependencies that reduce overall processing performance of the microprocessor, and specifically of a superscalar microprocessor.

Implementation of the mechanism for overriding partial width stalls using idiom recognition in Intel architecture microprocessors is shown by way of example only. The present invention also applies to other microprocessor architectures having other register sets as well. More specifically, in Intel architecture microprocessors the register set comprises larger width registers having partial width registers, such as eax having partial widths ax, ah, and al or ax having partial widths ah and al. A partial width stall condition occurs during the renaming of logical source registers by the RAT when a smaller width write to a partial width register is followed by a read of a larger width register that includes that partial width register (such as a write to al followed by a read of ax or eax). The present invention provides an apparatus for overriding such partial width stall conditions in certain cases. However, it is within the scope and spirit of the present invention to apply the present invention to other microprocessor architectures having other types of partial width registers. In other words, the present invention generally addresses the problem of overriding partial width stall conditions by using an idiom recognition apparatus.

Specifically, embodiments of the present invention include, in a mechanism for renaming a current set of logical registers associated with a current set of operations to a current set of physical registers of an extended register set, an apparatus for overriding partial width stalls of the renaming mechanism, the apparatus including: array means for renaming the current set of logical registers to the current set of physical registers, wherein the logical registers and the physical registers have partial widths, wherein the logical registers have logical register sizes and the physical registers have physical register sizes, wherein each of the physical registers having a corresponding set of zero bits for indicating whether portions of the logical registers contain zeros; size comparison means, coupled to the array means, for comparing the logical register sizes to the physical register sizes; partial width stall means, coupled to the size comparison means and the array means, for stalling the array means when a first logical register is of larger size than a corresponding first partial width register of a first physical register to which the first logical register would be renamed, wherein the first logical register having a first and second contiguous portions, the first partial width register corresponding to the first contiguous portion, the first physical register having a third portion contiguous with the first partial width register, and the third portion corresponding to the second portion; and partial width stall override means, coupled to the partial width stall means, for overriding the stalling of the array means when a first set of zero bits indicates that the second contiguous portion contains zeros.

The present invention includes the above apparatus with a zero extension means, coupled to the array means and the physical registers, for zeroing the third contiguous portion when the first set of zero bits indicates that the second contiguous portion contains zeros. The present invention includes the above apparatus with an idiom recognizer means, coupled to the array means, for detecting operations that zero the logical registers and setting and clearing the sets of zero bits to indicate which portions of the corresponding logical registers contain zeros. The present invention includes the above apparatus wherein operations of the current set of operations are issued simultaneously but maintain program code order and wherein the array means renames the current set of logical source registers simultaneously. The present invention includes the above apparatus wherein the current set of logical source registers are integer registers.

The present invention includes the above elements embodied within a high performance microprocessor and also a general computer system that utilizes the high performance microprocessor.

BRIEF DESCRIPTION OF THE DRAWINGS

FIG. 36 illustrates the partial width stall detection logic of FIG. 3C as modified to include both the partial width stall detection and partial width stall override functions of the present invention.

DETAILED DESCRIPTION OF THE INVENTION

Figure 1:
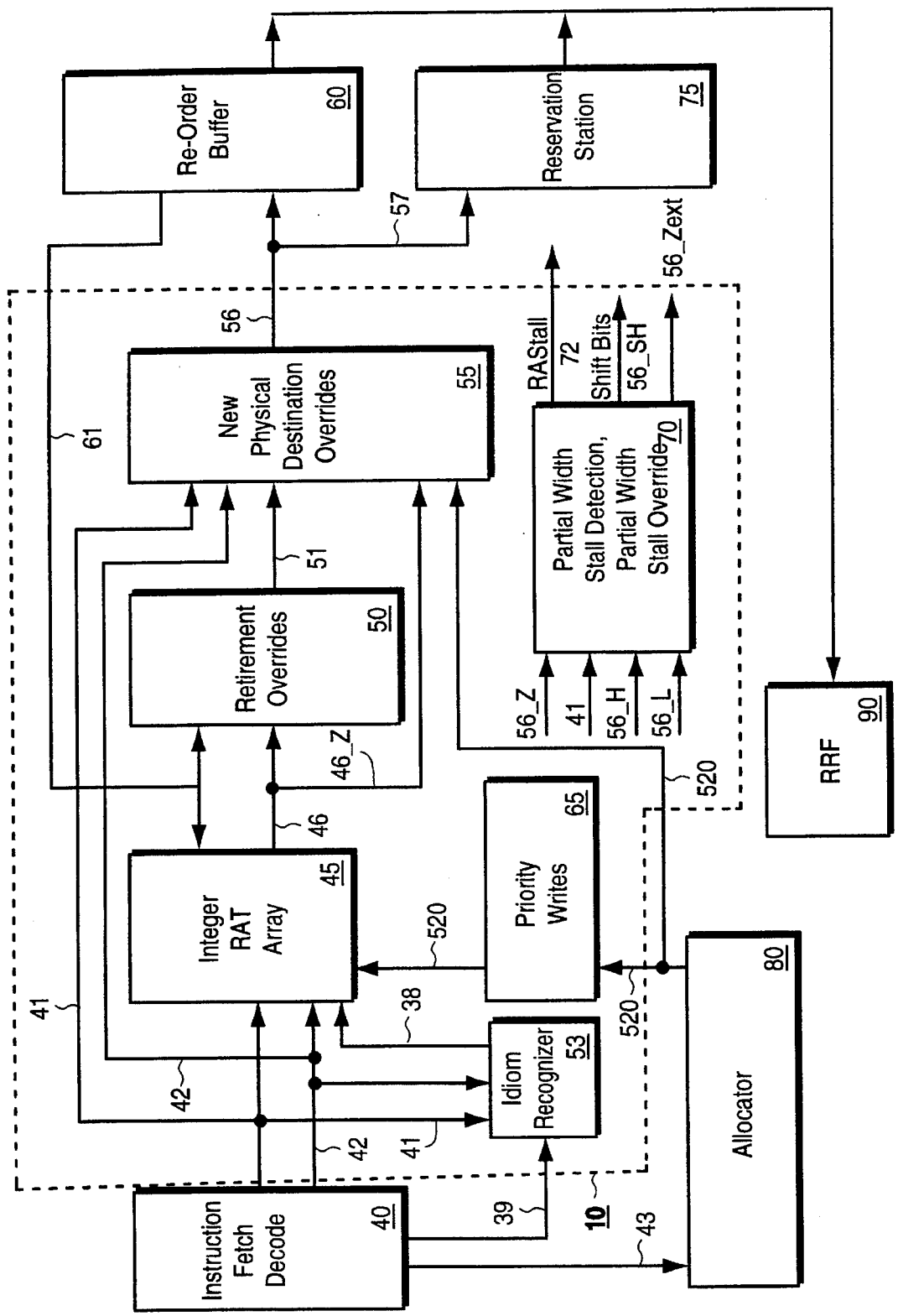
FIG. 1 illustrates an overall block diagram of the major components of the iRAT logic of the present invention.

It is appreciated that while the Intel architecture microprocessor is illustrated by way of example only, the present invention may be advantageously utilized in a number of various microprocessor designs. The register renaming and idiom recognition for overriding partial width stalls of the present invention may operate within other microprocessor architectures as well. Therefore, while the Intel instruction set and architecture are described herein, it should be borne in mind that alternative microprocessor instruction sets and architectures are within the spirit, scope and discussion of the present invention. It is further appreciated that the present invention may be realized by manufacturing the entire circuitry and resulting microprocessor on a single chip or by manufacturing different sections on different and separate chips. Further the chip or chips, as the case may be, may be manufactured from silicon substrate, gallium arsenide, or other suitable materials.

In the following detailed description of the present invention numerous specific details, such as register widths, data widths, register set definitions, specific idioms, and a specific implementation of preventing register renaming stalls by recognizing certain idioms are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure the present invention.

The present invention includes an apparatus and method of utilizing register alias tables for renaming logical registers to physical registers in order to remove false dependencies within the uops of a high performance superscalar microprocessor. By utilizing the integer point register alias tables, the registers of the relatively constrained Intel macroarchitecture register set may be renamed into an expanded set of physical registers which reside within a reorder buffer ("ROB") of a high performance superscalar microprocessor. By renaming the logical registers of the Intel macroarchitecture register set, not only are there more registers with which to work, but false data dependencies can be effectively removed from the program code thus increasing the number of uops that can be simultaneously executed by the high performance superscalar microprocessor. The above features become additionally advantageous coupled with a superscalar microprocessor that can execute uops out of program order. In such an out-of-order microprocessor, logical registers within uops having false data dependencies can be effectively renamed to registers of a physical register set thus removing the false dependencies and increasing execution throughput.

Certain terminology is utilized in the following discussion of the present invention by way of example. Logical registers are those registers of the Intel macroarchitecture register set, i.e., eax, ebx, ecx, ah, bh, di, edi, and so on. The present invention RAT architecture is designed to operate associated with and within a superscalar microprocessor that can execute up to four uops per instruction cycle in one mode. The microprocessor is also capable of executing uops out-of-order when the case allows. Therefore, within a given instruction cycle (i.e., available clock cycle) one uop to four uops, in this mode, may be presented for processing to the integer RAT simultaneously. The uops presented to the RAT arrays of the present invention, for any given clock cycle are called the "current set of uops" within a cycle. The clock cycle referred to is a single clock cycle within a pipeline of the microprocessor. The pipeline stage of the microprocessor covered within the present invention is the register renaming stage. The logical registers associated with this set of uops of a cycle are similarly referred to as the logical registers of a cycle or of the current set of uops. It is understood that any given set of uops within a cycle are processed through the integer RAT or floating point RAT within a single clock cycle so by the start of the next clock cycle the RATs will be ready to process the next set of uops presented in a next clock cycle.

Figure 8:
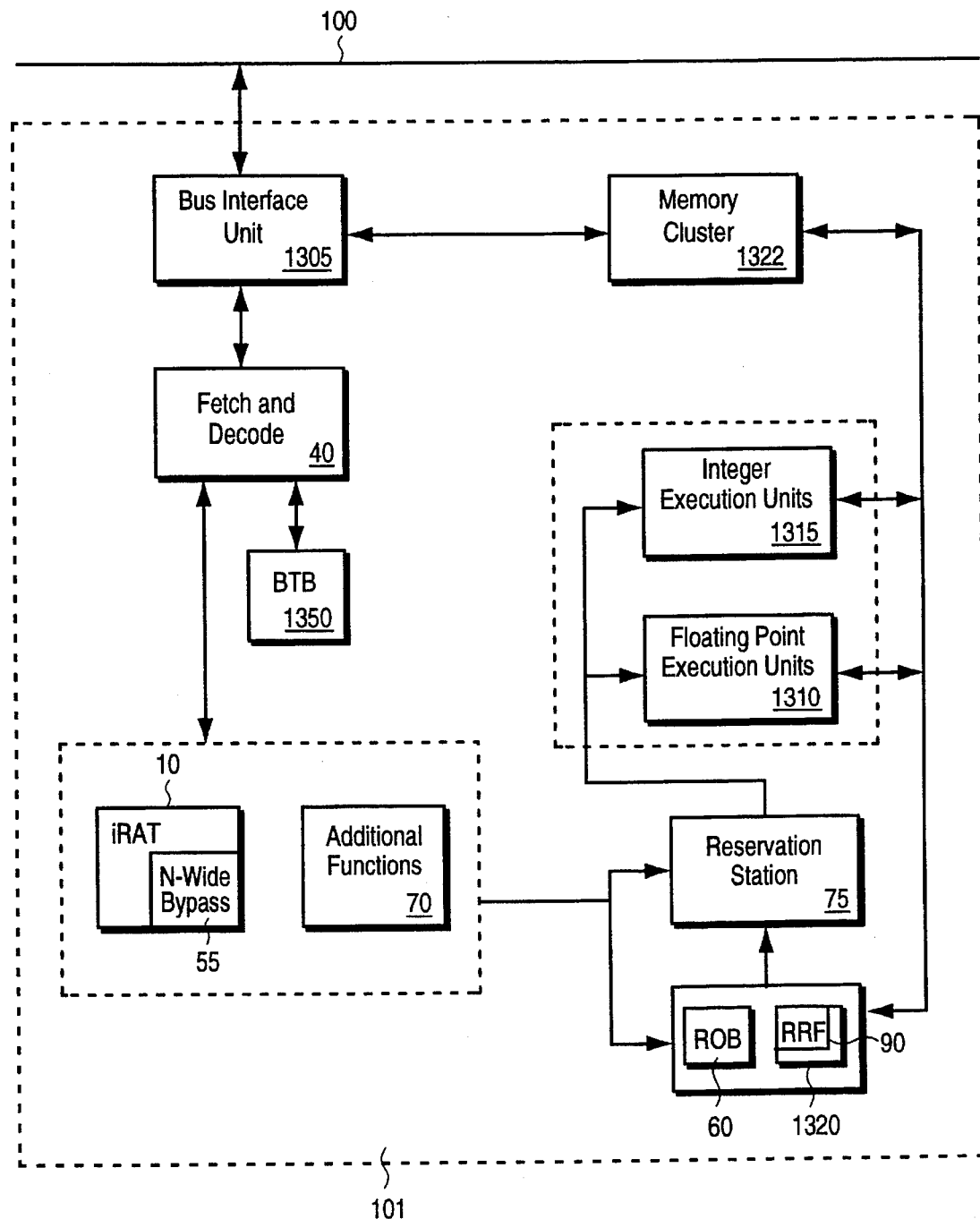
FIG. 8 illustrates a high performance microprocessor of the present invention utilizing the register alias table with idiom recognition of the present invention.

The RAT functions with a high performance superscalar microprocessor (see FIG. 8). The microprocessor of the present invention executes instructions speculatively utilizing a branch target buffer. The front end of the microprocessor may take an educated guess on the pathway of a program code at a particular branch instruction (based on the pathway previously taken by the microprocessor or based on a default pathway) and follows and executes a program path that may or may not actually be executed depending on the real results of the branch instruction. Until the checking hardware of the microprocessor actually determines that it took the right pathway (i.e., when the branch is reduced to architectural state), each instruction and uop executed and processed by the microprocessor after encountering the branch instruction will be speculative. Speculative instructions are not allowed to update certain portions of the microprocessor that hold "real results" or architecturally visible data which represent results of nonspeculative instructions. If the front end of the microprocessor guessed correctly, then the speculative instructions "retire" and their results may be updated into the architecturally visible buffers (i.e., retirement register buffers). The processing of the present invention prior to an operation's retirement is called issuance or issuing.

If the microprocessor took the wrong pathway, then the results of the speculative instructions are purged and the microprocessor is set along the correct pathway. Therefore, reference to an instruction "retiring" means that an instruction or uop has been determined to be nonspeculative and has actually updated the architecturally visible portions of the superscalar microprocessor. In one mode of microprocessor including this invention, upon each clock cycle up to four uops can retire; these retiring uops are referred to as the retiring set of uops. Other numbers of retiring uops are readily implemented and are within the scope of the present invention. Therefore, according to the below discussion two sets of uops are discussed. The first set is the current set of uops that are supplied to the RAT for renaming and other pre-retirement RAT processing (this set is being "issued"). The second set is an older set of retiring uops that has already been processed by the RAT and are used by the RAT operations to determine the proper location of source data for the current set of uops. It is appreciated that the precise details of the speculative execution of the microprocessor used by the present invention are not required to understand the operation of the RAT of the present invention. However, the interface between the RAT operations of the present invention and the microprocessor are described in detail where pertinent. It is sufficient to understand that the microprocessor will communicate to the RAT operations of the present invention when particular uops and their associated operands have "retired" and this retirement indication will impact the RAT operations, which will be explained below. At retirement, the data associated with the retiring uop is written into the retirement register file (RRF).

I. Integer Register Alias Table

The integer RAT logic 10 of the present invention is illustrated with reference to FIG. 1. FIG. 1 illustrates the pertinent functional blocks required to realize the integer RAT functions and those blocks required for interfacing the integer RAT ("iRAT") to a high performance superscalar microprocessor as well as the major bus lines that couple the functional blocks. The iRAT array block 45 is essentially a table used for renaming logical registers that are supplied by the instruction fetch/decode unit 40 of the superscalar microprocessor. The logical registers associated with each uop output from block 40 represent those registers common to the Intel register set and are those registers that are used in the program code that is read and interpreted by the fetch/decode unit 40. The logical registers also refer to and include those registers that are internal to the microcode, such as the temporary storage registers. The logical registers are of limited number within the Intel instruction set and therefore it is a function of the iRAT to rename the input logical registers that are for integer functions to individual physical registers that reside within the Re-Order Buffer unit ("ROB") 60. The physical register set within the ROB is comparatively larger than the logical register set and contains greater than 32 entries in one mode; therefore a pointer into the physical registers of the ROB requires at least six bits of address width in this mode.

Within the iRAT array 45 there is a separate entry (FIG. 3) for each and every logical register that may hold integer data. The iRAT array receives logical sources from block 40 and outputs physical sources (PSources) whose identity are contained in the array. Associated with each logical register entry is a pointer indicating a location within the ROB 60 to a particular physical register. When a pointer is within the entry (i.e., stored in the entry), the logical register associated with that entry has been renamed to the associated physical register. Any subsequent reference to the logical register will thereafter be directed to the physical register within the ROB 60 that actually holds the data for that logical register. It is appreciated that during the period in which an operand is associated with a speculative uop, the entry of the iRAT associated with that operand points to a physical register of the ROB 60. However, once the uop retires, the data for that operand is placed into the retirement register file or "RRF" 90 of which some of the registers are then architecturally visible. The RRF 90 contains only nonspeculative information and this data is said to be reduced to microarchitecture state. The iRAT array 45 has a special bit associated with each entry that indicates if the data associated with a logical register may be found (1) in the ROB 60 or (2) in the RRF 90. This bit, which will be explained in detail below, is called the RRF valid bit for each iRAT 45 entry. There is more detail associated with the iRAT array 45 and it will be developed in discussions presented further below.

The allocator unit 80 of FIG. 1 supplies the iRAT array 45 with a list of pointers that represent available physical registers ("PDests") via bus 520. These physical registers reside in the ROB 60 and become vacant for use by the current set of logical destination registers within the current clock cycle. The list of pointers supplied by the allocator unit 80 is in reality a set of 6-bit pointers used to index the ROB where the actual physical registers ("PDests") reside. A discussion of the precise operation of the allocator unit 80 is not required for a full understanding of the iRAT or of the floating point RAT operations. It is sufficient to note that the allocator 80 supplies the iRAT operations, for a given cycle, with a list of at most four vacant PDests for use by the current set of uops within that given cycle. The allocator supplies the iRAT with as many vacant PDests as there are uops in the current set. The instruction fetch and decode unit 40 is also coupled to the allocator 80 via bus 43. The allocator 80 is required to assign four vacant PDests (i.e., newly allocated PDests) to the RAT every cycle for RAT operation. If the resources are not available, the allocator 80 informs the instruction decoder 40 and the RAT 10 that they must delay all processing until sufficient vacant PDests are available. This is one form of a RAT stall.

Referring still to FIG. 1, the uops of a current set and their associated logical registers are supplied by the instruction fetch and decode unit 40 which is coupled to the integer RAT array 45 via bus 41 and bus 42. The precise operation of such unit 40 is not pertinent to a full understanding of the present invention iRAT operations. It is sufficient to note that the instruction fetch and decode unit 40 fetches the instructions of the program code in program code order, decodes these instructions, and isolates the logical sources and logical destination for each uop. Any well known instruction fetch and decode unit 40 may operate to supply the iRAT with uops of a given cycle. It is important to note that since the microprocessor used in the present invention is superscalar, the instruction fetch and decode unit 40 must be able to fetch and decode at least enough instructions to supply 4 uops (with associated logical destinations and logical sources) for each clock cycle.

By definition each uop of a given set will have up to two source operands (i.e., two logical source registers) and will have an additional logical destination register. The logical sources of the current set are supplied to the iRAT array over bus 41 via eight separate bus lines, one for each possible logical source. The logical destinations are supplied over bus 42 via four separate bus lines, one for each possible logical destination. A logical source register for a given uop is called a "LSource1" or "LSource2" where the 1 or 2 represents the source number (i.e., each uop may have as many as two sources) and a logical destination register for a given uop is called an "LDest." The below list illustrates a typical current set of uops and represents terminology used herein:

|       | Source1  | Source2  | Destination |
|-------|----------|----------|-------------|
| uop0: | LSource1 | LSource2 | LDest       |
| uop1: | LSource1 | LSource2 | LDest       |
| uop2: | LSource1 | LSource2 | LDest       |
| uop3: | LSource1 | LSource2 | LDest       |

The iRAT array 45 performs two important but distinct functions. First, it renames logical source registers to physical source registers of the ROB 60 and keeps track of the renaming processing. At any given time the iRAT must know the most recent physical location (rename) of a given logical source register in order to accurately track the uops that flow through the renaming process. Second, the iRAT array 45 updates its entry pointers of logical destination registers to the new physical destination registers within the ROB 60 assigned by the allocator. To perform the above, the iRAT basically must accomplish two major tasks. First, it must read the logical source registers of the current uop set and determine which physical source registers have been assigned to these logical source registers; this is a table read function. Second, it must interpret the logical destination registers associated with a given set and it must assign appropriate vacant physical destination registers "PDests" (which are supplied by the allocator 80) to these logical destination registers; this is a table write process.

The table write and table read functions must be performed within a clock cycle with the table read occurring for all uops of a given set in parallel during a first half clock cycle and the table write occurring in parallel for all uops of a given set within the second half of the clock cycle. Therefore several of the operations of the iRAT must occur simultaneously. There is simply not enough time to process each uop of a given set sequentially within a table read or write operation when a microprocessor is running at high clock speeds. All uops received must be processed (i.e., have table read operations and table write operations) simultaneously. Therefore, the write logic and the read logic of the present invention must accomplish and output in parallel that result which would have been accomplished if each uop were sequentially processed with respect to the RAT.

However, at least two possible cases complicate the operations of the iRAT which, in part, are due to the simultaneous operation of the iRAT functions. Within a given set of uops, the logical source of a later-in-time uop may be the same logical register as the logical destination register of a previous-in-time uop. This case requires special treatment in the table read operations of the iRAT and will be explained further below. Also, during a read operation, the physical source register assigned to a logical source register may be the same ROB pointer as associated with a uop that retires (i.e., a retiring PDest) during the given clock cycle. This case also requires special attention. In addition, during a table write operation, multiple uops of a given set may target the same logical destination register. This case requires special treatment by the iRAT table write operations. Also, during a table write process, a retiring uop's PDest may affect the outcome of the write function. These special cases will be further explained with reference to detailed discussions of the priority write block 65 and retirement override block 50 of the present invention.

The priority write block 65 of FIG. 1 receives the PDests generated by the allocator 80 over bus 520 and will determine which PDest values will be written into which entries of the iRAT array 45. The priority write block 65 prioritizes the array update of the newly allocated physical destinations according to the intra-cycle destination dependencies of the current set of uops. It is appreciated that the table write function of block 65 is not performed until after the iRAT table read function is complete. The table write function inputs the four logical destination registers of the current set and writes to each iRAT entry, defined by the logical destination registers, an appropriate PDest value which is merely a pointer to the ROB 60. The priority write block 65 also sets the RRF valid bit for a given iRAT entry if that entry is found to have retired within the current clock cycle.

The iRAT read functions are performed by the retirement overrides unit 50 and the new physical destinations overrides block 55 ("new PDest overrides") of FIG. 1. For a given cycle, the logical sources of the current set of uops am input into the iRAT array 45 over bus 41 and the iRAT array outputs the physical source registers that are associated with each entry of the iRAT corresponding to the logical sources. However, since retirement of uops may affect the proper location of these sources, the retirement overrides block 50 performs the determinations required to locate the proper source of data for each uop of the current set. The retirement overrides block 50 handles the case in which uops retire during the given cycle thus retiring certain PDests and the uops of the current set (of the same cycle) utilize the data of these retired PDests.

The iRAT array 45 receives pointers over bus 61 corresponding to the physical register destinations CPDests") of the retiring uops from the ROB 60. Since there can be up to four retiring uops per cycle there are four possible retiring PDests fed from the ROB 60 over bus 61. The retirement override block 50, via a CAM matching circuit compares the retirement pointers ("retiring PDests") received over bus 61 against the iRAT entries and generates up to four match signals (i.e., one match line per possible retiring uop) which are then used internally by the retirement override block 50. The retirement overrides block 50 overrides the physical source registers that are output by the iRAT array 45 with pointers that point into entries of the real register file 90. The iRAT array 45 is coupled to the retirement overrides block 50 via bus 46. It is appreciated that bus 42 carries the four possible logical destination registers of the current set of uops.

Referring still to FIG. 1, the retirement overrides block 50 is coupled to the new PDest overrides block 55 via bus 51. Bus 42 and Bus 41 also couple the instruction fetch and decode unit 40 with the new PDest overrides block 55 to deliver the logical source and logical destination values for the current set. The allocator 80 is coupled to block 55 via bus 520. The new PDest overrides block 55 overrides retirement-bypassed physical sources to output the renamed physical sources, which reflect the intra-cycle data dependencies between uop destinations and sources of subsequent uops. The new PDest overrides block 55 is coupled to the ROB 60 via bus 56 and also coupled to the reservation station 75 via bus 57. The reservation station 75 receives the uops with renamed sources and destinations (i.e., physical sources and physical destinations) and queues the uops for execution to particular execution units (not shown) of the microprocessor. The ROB 60, via input from bus 56, keeps track of certain information regarding register renaming and iRAT data which will be described later.

Refer to the RRF block 90 and ROB block 60 of FIG. 1. It is important to realize that for the duration that a uop and its associated parameters are speculative, the data associated with the source and destination operands for the speculative uop may be found within the physical registers of the ROB 60 or in a reservation station, but it will not be found in the RRF 90. However, the ROB 60 is not visible to the programmer (i.e., the ROB physical registers are not architecturally visible). This is the case because the microprocessor is not sure that it went down the correct program path and therefore the data in the ROB 60 may not be valid. However, as soon as the checking hardware of the microprocessor determines that the front end guessed the correct program path, appropriate data of the ROB 60 that are processed (i.e., the PDests) may be retired and then are not speculative any longer. At this point, the PDest data of each retired uop is written from the ROB 60 to the RRF 90 (some registers of which are architecturally visible to the programmer) into the appropriate entry as defined by the original logical register which was renamed. The ROB remembers, for each PDest of each retiring uop, the original logical destination register that is associated with the retiring PDest. As with any well known register file, within the RRF 90 there is a unique entry for each register of the Intel macroarchitecture register set. For integer registers, these entry points do not vary. Therefore, data representing the eax register always has the same location within the RRF 90. Therefore, not only does the ROB 60 provide additional registers for use to the microprocessor in order to remove otherwise false dependencies between uops, but the ROB 60 also provides a temporary storage area in which the results of speculative uops may be placed until they retire into the RRF 90.

Timing of Major RAT Tasks

Figure 2:
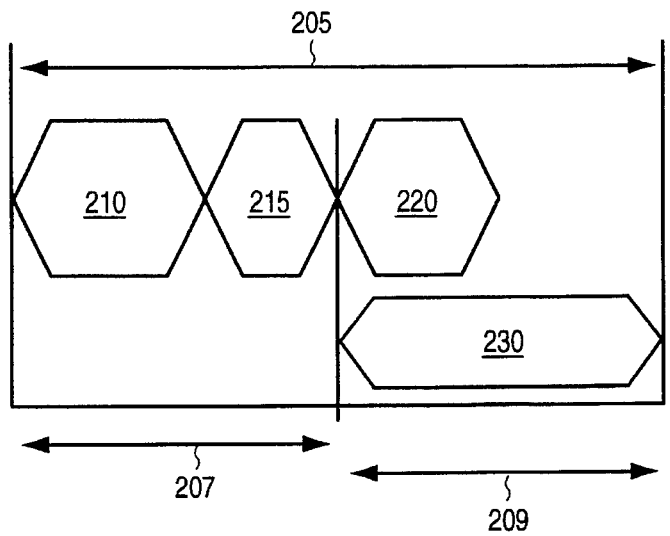
FIG. 2 illustrates a timing diagram of a clock cycle and illustrates the time periods in which major iRAT logic functions are performed within the present invention.

FIG. 2 illustrates the overall timing diagram of the major functions of the RAT logic 10. It is appreciated that the clock cycle 205 is but one clock cycle stage within a pipeline of stages required to completely fetch, decode, execute and "retire" a given set of uops. As the interfaces with the preceding and subsequent stages become pertinent to discussions regarding the RAT operations, they will be discussed at length. Regarding FIG. 2, one full clock stage is illustrated as 205. A current set of uops must be fully processed by the iRAT logic 10 within cycle 205. The retiring PDest data (over bus 61) associated with the retiring set of uops becomes available for use within period 207. During the first half 207 of the clock stage 205 there are two clock stages 210 and 215. At stage 210 the iRAT 45 is read by indexing the logical source registers as input and the corresponding physical source registers are output. During the period 210 CAM matching occurs simultaneously by block 418 (FIG. 4A) with respect to retiring PDests and the iRAT entries of array 45. At 215 the retirement override logic 50 is performed on the table read outputs. The next half clock cycle is 209 and is composed of duration 220 and overlapping 230. During period 220, the new PDest override logic 55 functions to handle the case of intra-cycle data dependencies between logical sources and logical destinations. During the period 230 the table write functions of block 65 and 45 occur which utilize the CAM match results of the retirement override block 50. As noted the table write functions occur during period 230, in part, simultaneously with the PDest override functions during 220. The typical duration of clock cycle 205 is 6.7 nanoseconds in one mode.

iRAT Array Block 45

Figure 3:
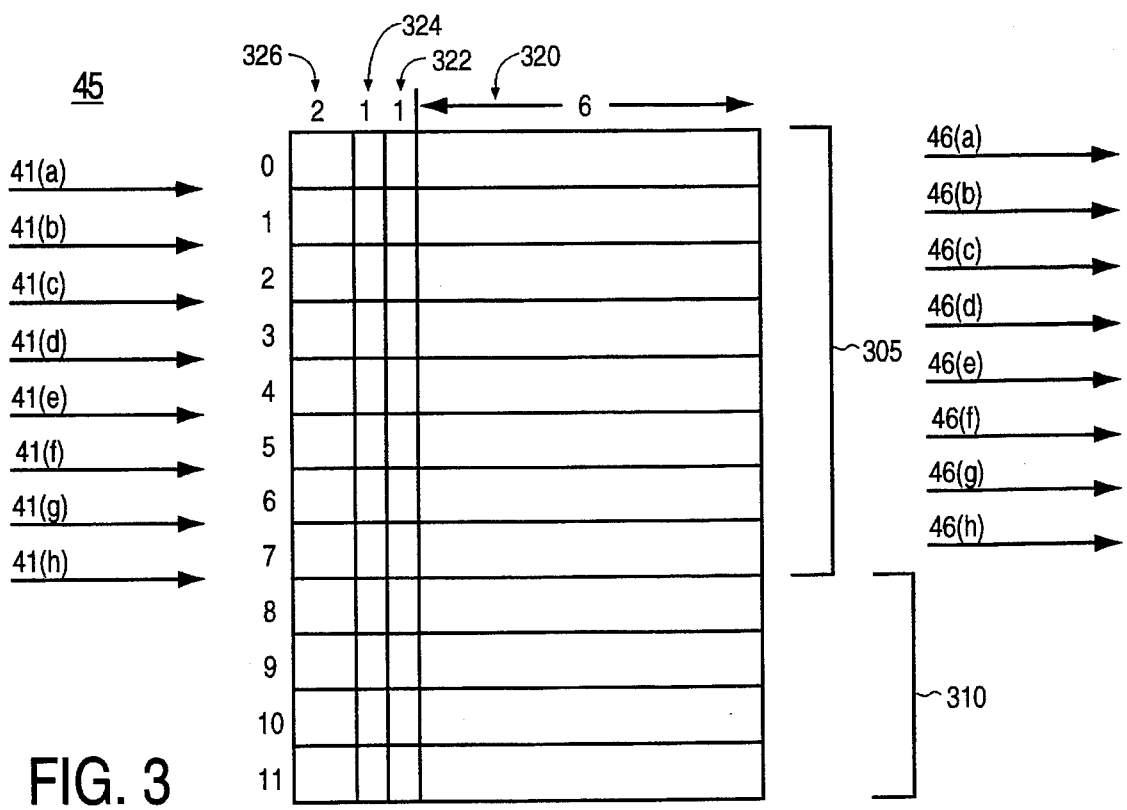
FIG. 3 illustrates a sample iRAT array composed of 12 entries, and for each entry a register size find; a RRF valid field, a zero bit field, and a physical register pointer field.

FIG. 3 illustrates a sample iRAT array 45. It is appreciated that the array 45 illustrated is a sample of the total array that exists within the present invention. The numbers of bits for specific register widths and table fields in the following discussion are exemplary only. Different bit widths are within the scope and spirit of the present invention. However, in order to more clearly illustrate the present invention, a representative version of the iRAT table is shown in FIG. 3. The iRAT array 45 illustrates a table having 12 entries and four columns. Each entry in the table is associated with a separate logical register of the Intel macroarchitecture register set. The first column 326 of each entry indicates the size of the data represented by the entry; some logical registers may adopt individual sizes depending on their width. For instance, the size column 326 is two bits wide and will indicate either storage of a 32-bit width of data (i.e. eax), a 16-bit width of data (i.e., ax), an 8-bit width of data of the upper byte of the lower word (i.e., ah) and an 8-bit width of data of the lower byte of the lower word (i.e., al) for each of the 12 entries of the RAM array. It is appreciated that the above pointer sizes may be altered for configuration with other microprocessor architectures and are presented for illustration. The second column 324 of each entry is the RRF valid bit. If this bit is set then the data currently representing the integer logical register associated with the entry may be found in the RRF 90 and not in the ROB 60. The third column 322 for each entry represents a zero bit. If this bit is set it indicates that a portion of the physical source register pointed to by that table entry contains zeros. The fourth column 320 for each entry represents a pointer to a particular physical register within the ROB 60 which has been assigned to contain the data for the logical register associated with the given entry of the pointer. Alternatively, the column 320 for each entry may indicate a location within the RRF 90 if the RRF valid bit (column 324) is set for a particular entry.

In one mode, the iRAT array 45 is a multi-ported RAM and each entry of the RAM has eight read ports which can read the entry. Each entry will be read by associated sources used by the uops of the current set. These sources are fed via bus lines 41(a)–41(h) for each source for each uop of the current set. The logical source1 values for uop0–uop3 are input over bus 41(a)–41(d) and the logical source2 values for uop0–uop3 are input over bus 41(e)–41(h). The physical registers associated with the input bus lines 41(a)–41(h) for the initial read cycle are output over corresponding buses 46(a)–46(h). Since there are four uops for any given set within a cycle and since each uop of a set may have up to two integer sources, the iRAT array 45 accommodates the condition when each and every source of each uop demands to read the same entry. For this reason, there are eight read decoder units per each iRAT entry that each recognize when that entry is to be read for a given source of the current uop set. Each read decoder unit for a given iRAT entry is coupled to an individual input bus of 41(a)–41(h). Each entry can similarly output its contents over buses 46(a)–46(h). Initial read outputs 46(a)–46(d) correspond to the iRAT array physical source outputs corresponding to inputs 41(a)–41(d) and initial read outputs 46(e)–46(h) correspond to the iRAT array physical source outputs corresponding to inputs 41(e)–41(h).

The instruction fetch and decoder unit 40 supplies up to eight logical source registers (via bus 41) to the iRAT array 45 and the iRAT array 45 performs an initial read to output the physical register pointers associated with each entry referenced by each of the logical source registers. These eight physical source register outputs are sent via bus 46 to the retirement overrides block 50. Each of the eight input logical source registers fed to the iRAT table 45 is channeled via a separate port of the iRAT array so that all eight sources may be input to the table 45 at once. Therefore, the outputs (over bus 46) corresponding to the physical source registers of the table 45 are also simultaneously output over bus 46. Table 1 illustrates the input to the iRAT and the initial read output of the iRAT table 45 before any overrides take place to account for retirement and/or data dependency.

TABLE 1

| | Input 41(a)–41(h) | | Output 46(a)–46(h) | |
|---|---|---|---|---|
| uop0 | LSource1 | LSource2 | PSource1 | PSource2 |
| uop1 | LSource1 | LSource2 | PSource1 | PSource2 |
| uop2 | LSource1 | LSource2 | PSource1 | PSource2 |
| uop3 | LSource1 | LSource2 | PSource1 | PSource2 |

As shown by Table 1, up to eight logical sources may be input to the iRAT for the current set of uops (uop0–uop3) and eight possible outputs may result. Each output is the physical source register pointer value found within the entries of the iRAT that are indexed by the logical source register inputs for a given set of uops.

Partial Width Stalls.

Given the renaming functions of the iRAT, use of partial width registers may cause the iRAT operations to stall until the last speculative instruction to write the register retires. For instance, if a write to a partial width of a larger register is followed by a read of a larger width of the register, then the data required by the larger width read must be an assimilation of multiple previous writes to different pieces of the larger register. For instance, consider the below sequence of uops that exist within a set for a given cycle:

| uop0: | mov | eax, 0 | ;eax gets value 0 |
|---|---|---|---|
| uop1: | mov | al, 0xff | ;al register gets ff |
| uop2: | mov | ah, 0xb4 | ;ah register gets b4 |
| uop3: | push | ax | ;store ax on top of stack, inc sp |

The iRAT logic 10 of the present invention will treat the eax register of uop0 as a destination register and the table write logic will assign a vacant PDest (say PDest 6) that is supplied from the allocator to entry 0 and entry 8 of the iRAT table 45 and set the size bits of both entries to represent 32 bits. Next, the iRAT logic 10 will treat the al register of uop1 as a destination register and the table write logic will assign another PDest (say PDest 7) to entry 0 of the iRAT table corresponding to logical register al of uop1 and will also set the size bits of entry 0 to represent 8 bits. Next, the iRAT logic 10 will treat the ah register of uop2 as a destination register and the table write logic will assign another PDest (say PDest 8) to entry 8 of the iRAT table corresponding to logical register ah of uop2 and will also set the size bits of entry 8 to represent 8 bits. However, when the iRAT logic 10 encounters uop3 it encounters a read operation of the ax logical register. There is no single location where the ax logical register is stored. For instance, the lower portion, al, is pointed to by entry 0 of the iRAT table which points to PDest 7 of the ROB. The upper portion, ah, is pointed to by entry 8 of the iRAT table which points to PDest 8 of the ROB. Since there was a write to a smaller register portion (ah or al) followed by a read of a larger portion (ax) of the eax register, the RAT logic 10 must stall any further table read or write functions until all pieces of the desired register retire, including those uops of previous and current cycles. In other words, the iRAT logic 10 cannot rename the ax register of uop3 until the uop that last wrote to a partial width of ax retires (uop2 in this case). It is appreciated that a write to a larger register portion (eax) followed by a read of a smaller register portion (ax) does not cause a RAT stall because the data of the smaller register portion (ax) can always be found as a subset of the larger register portion (eax).

However, by allowing data for the al and ah registers to be separately stored within the iRAT table 45 (as described below), the present invention iRAT logic 10 avoids a common partial width stall condition that occurs according to the below example which is characteristic of program code compiled for the 8086, or 8088 microprocessors supplied by Intel Corporation of Santa Clara, Calif. If only one alias in the iRAT array 45 is maintained for all four sizes (eax, ax, ah, and al for example) of a general register access, then independent 8-bit register use would cause a tremendous number of false dependencies to occur. For example:

```
uop0:    mov     al, 0xff
uop1:    mov     ah, 0xff
uop2:    push    al
```

The above example illustrates partial register use that treats the ah and the al registers as separate but does not necessarily access the 16-bit or 32-bit registers (such as ax or eax) often. Given this scenario, the present invention iRAT logic 10 avoids the partial width stall condition because the iRAT contains separate entries for the ah register and al register renaming functions, thereby providing independent renaming of high byte and low byte registers (such as ah and al).

Refer now to FIG. 3. The iRAT array 45 is logically separated into a low bank 305 and a high bank 310 for the integer registers that utilize partial width sizes. The low bank 305 is implemented to account for the partial width portions that exclude the upper 8-bit portion of the lower word (such as ah) and the high bank 310 is implemented to account for the partial width portions that exclude the lower 8-bit portion of the lower word (such as al). For instance, entry 0 of the iRAT array 45 corresponds to registers eax, ax, or al. Also, entry 8 of the table corresponds to registers eax, ax, or ah. Write operations to eax, or ax will be directed to both entry 0 and entry 8. However, write operations to the al register are solely directed to entry 0, while write operations to ah are directed solely to entry 8. Read operations of eax or ax are directed solely to entry 0. Read operations of al and ah are directed to entry 0 or entry 8, respectively. The reason the high and low bytes of the low word are separated is to eliminate RAT stalls upon independent renaming of high byte and low byte registers (such as ah and al). The Table 2 below indicates the integer logical registers represented by the 12 entry table 45.

TABLE 2

| Low Bank | | High Bank | |
| --- | --- | --- | --- |
| Entry | Logical Registers | Entry | Logical Registers |
| 0 | eax, ax, al | 8 | eax, ax, ah |
| 1 | ebx, bx, bl | 9 | ebx, bx, bh |
| 2 | ecx, cx, cl | 10 | ecx, cx, ch |
| 3 | edx, dx, dl | 11 | edx, dx, dh |
| 4 | edi, di | | |
| 5 | esi, si | | |
| 6 | ebp, bp | | |
| 7 | esp, sp | | |

It is appreciated that the RAT array 45 also contains two banks of temporary storage registers and an integer flag storage area and a floating point flag storage buffer. These buffers are not particularly pertinent to the iRAT as discussed within the present invention and therefore are not discussed in detail herein. In effect, they are not pertinent because they represent only the simplest renaming cases that do not have to deal with any size fields. It is appreciated, however, that the RAT may rename the registers of the temporary storage area analogously to the RAT discussions herein for the arithmetic registers.

The iRAT array 45 accommodates the renaming of partial width registers in two ways: 1) the size field 326 indicates the size (8-bit, 16-bit, or 32-bit) of the register that last wrote that entry and 2) the low bank 305 and high bank 310 allow independent renaming of high byte and low byte partial width 8-bit registers (such as ah and al). For 32-bit and 16-bit RAT accesses (such as eax and ax), data is read only from the low bank but data is written into both banks identically. For 8-bit RAT accesses (such as al or ah), however, only the appropriate high or low bank is read or written, according to whether it was a high byte or low byte access. When a register is written, the appropriate size bits 326 are also changed accordingly. For 32-bit and 16-bit writes, the corresponding high bank and low bank size bits are changed to the appropriate size. For 8-bit writes, only the appropriate high bank or low bank size bits are changed. Thus, the present invention provides renaming of partial width registers and independent renaming of 8-bit high byte and low byte registers.

Consider again the sequence of uops of the previous example:

```
uop0:    mov    eax, 0      ;eax gets value 0
uop1:    mov    al, 0xff    ;al register gets ff
uop2:    mov    ah, 0xb4    ;ah register gets b4
```

The PDest pointer for al of uop1 will be written into the entry 0 of the iRAT array 45 and the entry 0 size bits will be set to indicate a size of 8-bits. The PDest pointer for ah of uop2 will then be written into the entry 8 of the iRAT array 45 and the entry 8 size bits will be set to indicate a size of 8-bits. Later the PDest pointer for the al or ah registers can be read from entry 0 or entry 8, respectively, of the iRAT array 45 by the table read logic without causing any partial width stall because there are separate entries for each byte of the low word of the eax register. Any subsequent read to the al or ah registers will access the appropriate PDest from different entries of the iRAT table 45 thus avoiding a RAT stall in this common case.

It is appreciated that the partial width stall is recognized and generated by block 70 of FIG. 1. In general, using the size bits of each entry, if a register read operation is requested of an entry of the iRAT and the register read operation requires a larger size data than indicated by the size bits of the entry, then the block 70 will issue a partial width stall on the iRAT logic 10 and assert the RAStall signal 71 to stall the instruction decoder 40 and allocator 80. It is said that the uop causing the partial width stall is an over-read condition because it attempted to read more data than present within the iRAT entry. The partial width stall essentially stops renaming until the retirement of the last uop to write the register on which the stall occurred. The mechanism for detecting and causing a partial width stall will now be explained in more detail.

Figure 3A:
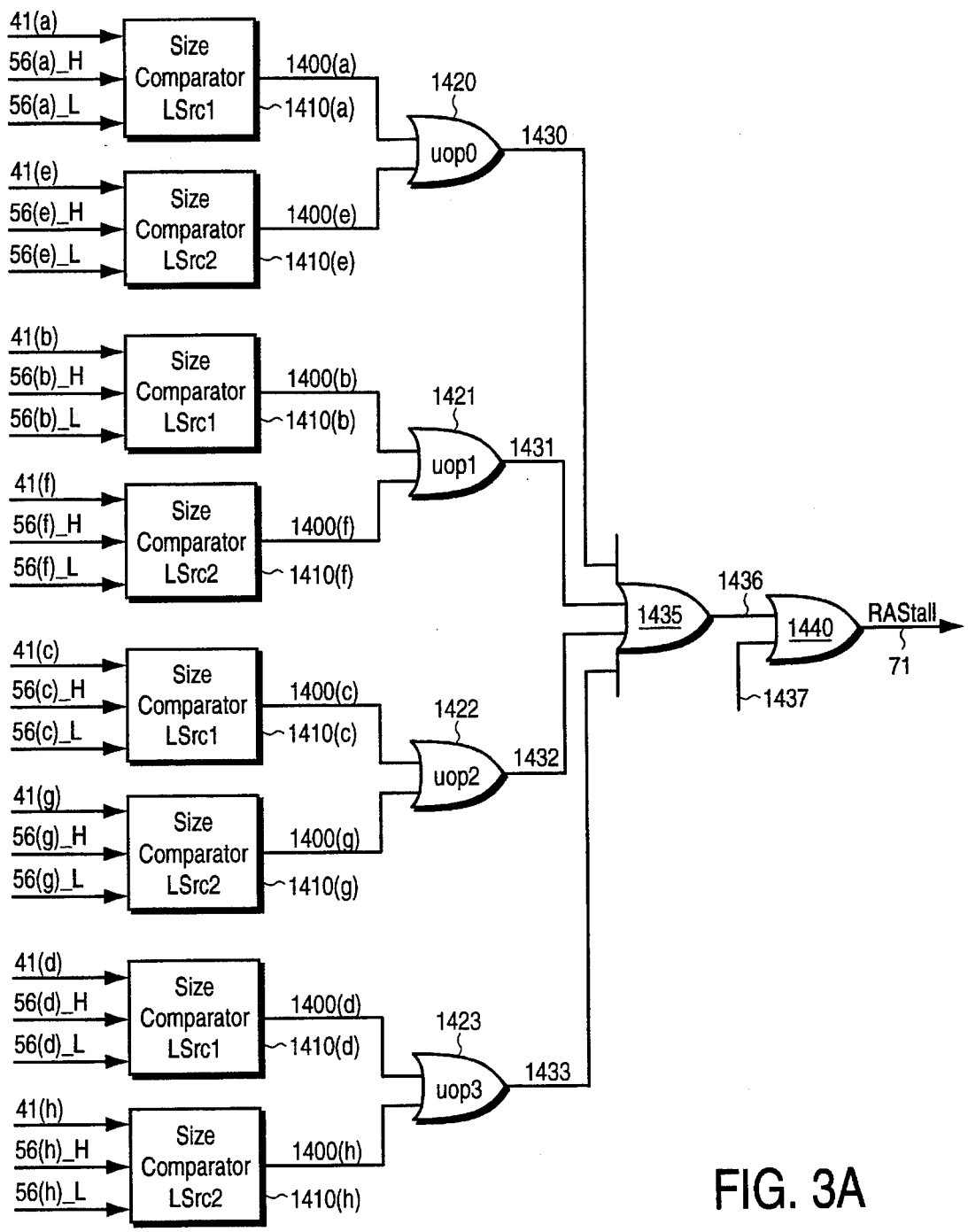
FIG. 3A illustrates the logic utilized by the present invention to detect and generate partial width stall.

Referring now to FIG. 3A, the logic utilized by the present invention to detect and generate partial width stalls is illustrated. The logic of FIG. 3A is a part of block 70 (FIG. 1). Size comparators 14 10(a)–1410(h) receive size bits of the corresponding logical source registers (of the four logical source1 and four logical source2 registers of a current set) over lines 41(a)–41(h) and high bank and low bank size bits of the corresponding physical source registers over lines 56(a)_H through 56(h)_H and 56(a)_L through 56(h)_L, respectively. The physical source register size bits compared are those selected after the retirement and new PDest overrides (explained below) have been performed. The size comparators 1410(a)–1410(h) determine whether the input logical source register size bits indicate a size greater than the high bank or low bank size bits of the corresponding high and low physical source registers and generate size mismatch signals 1400(a)–1400(h). A size mismatch signal is driven to a high logic state if the input logical source register is found to be larger than either the corresponding high or low physical source register; otherwise the size mismatch signal is driven low. For example, size comparator 1410(a) receives the size bits of logical source1 register (Lsrc1) of uop0 over line 41(a), the corresponding physical register high bank size bits over lines 56(a)_H, and the corresponding physical register low bank size bits over lines 56(a)_L and generates size mismatch signal 1400(a). The remaining size comparators 1410(b)–1410(h) are similarly configured. The high bank size bits of registers not having an entry in the high bank of the iRAT array (such as edi, di, esi, si, ebp, bp, esp, and sp) default to 32-bit size.

An OR gate 1420 logically ORs the size mismatch signals 1400(a) and 1400(e) of Lsrc 1 and Lsrc2, respectively, of uop0 to generate a partstall0 signal 1430. Likewise, an OR gate 1421 logically ORs the size mismatch signals 1400(b) and 1400(f) of Lsrc1 and Lsrc2, respectively, of uop1 to generate a partstall1 signal 1431. Likewise, an OR gate 1422 logically ORs the size mismatch signals 1400(c) and 1400(g) of Lsrc 1 and Lsrc2, respectively, of uop2 to generate a partstall2 signal 1432. Likewise, an OR gate 1423 logically ORs the size mismatch signals 1400(d) and 1400(h) of Lsrc 1 and Lsrc2, respectively, of uop3 to generate a partstall3 signal 1433. When in the high state, the partstall0–3 signals indicate that their corresponding uop0–3 caused a partial width stall.

An OR gate 1435 logically ORs the partstall0–3 signals 1430–1433 to generate a partial width stall signal 1436. In the high state, the partial stall signal 1436 indicates that a partial width stall condition has been detected and that the iRAT, the instruction decoder, and the allocator must be stalled. An OR gate 1440 logically ORs the partial width stall signal 1436 with another stall signal 1437 to generate the RAStall signal 71. The other stall signal 1437 is asserted to generate stalls for other conditions such as flag mismatches. The RAStall signal 71 is used to stall the instruction decoder and the allocator.

Figure 3B:
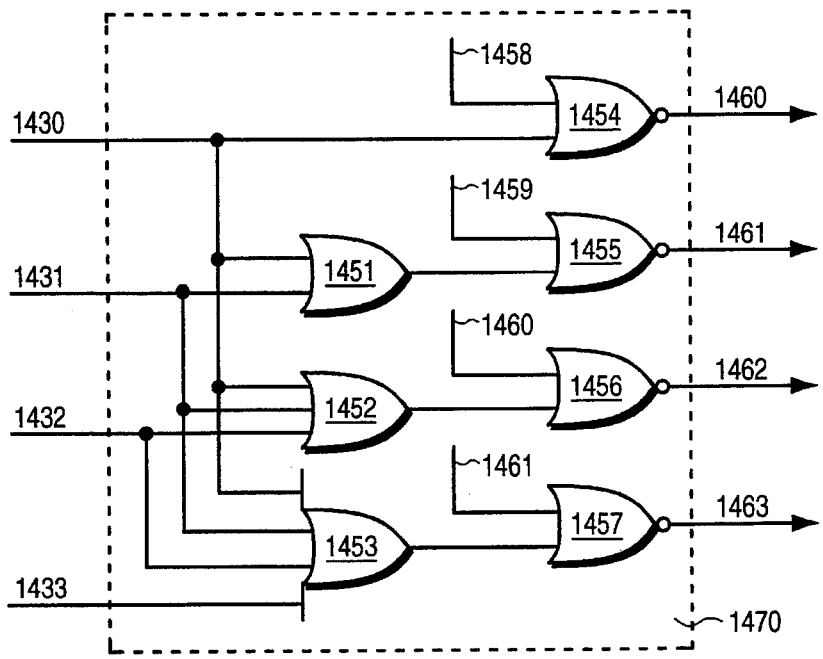
FIG. 3B illustrates the invalidating circuit utilized by the present invention to reset the valid bit of uops during a partial width stall.

Referring now to FIG. 3B, an invalidating circuit 1470 utilized by the present invention to reset the valid bit of selected uops during a partial width stall is illustrated. The logic of FIG. 3B is a part of block 70 (FIG. 1). This logic is used to effect the stall of the iRAT logic 10 of the present invention during a partial width stall. During a partial width stall, the overall renaming mechanism of the iRAT logic 10 is stalled. However, the table read, retirement override, and new PDest override functions are not stalled to allow the iRAT logic 10 to be updated on retirement of uops issued before the uop causing the stall such that the stall condition can be removed.

A NOR gate 1454 receives the partstall0 signal 1430 and a clear signal 1458 and generates a uop0_valid signal 1460. An OR gate 1451 receives the partstall0 signal 1430 and the partstall1 signal 1431. A NOR gate 1455 receives the output of OR gate 1451 and a clear signal 1459 and generates a uop1_valid signal 1461. An OR gate 1452 receives the partstall0 signal 1430, the partstall1 signal 1431, and the partstall2 signal 1432. A NOR gate 1456 receives the output of the OR gate 1452 and a clear signal 1460 and generates a uop2_valid signal 1462. An OR gate 1453 receives the partstall0 signal 1430, the partstall1 signal 1431, the partstall2 signal 1432, and the partstall3 signal 1433. A NOR gate 1457 receives the output of the OR gate 1453 and a clear signal 1461 and generates a uop3_valid signal 1463. The clear signals 1458–1461 are asserted to invalidate uops0–3 for other reasons not important to the partial width stall mechanism of the present invention. The uop0–3_valid signals 1460–1463 are coupled to the iRAT array 45 (FIG. 1).

The circuit of FIG. 3B is used to reset (invalidate) the valid bit corresponding to a uop that causes a partial width stall, as well as all valid bits of subsequent uops in the current set of uops. While a uop's valid bit is reset, the iRAT logic 10 (FIG. 1) will not rename the logical source registers of that uop. The table read, retirement override, and new PDest override functions are performed whether a uop's valid bit is set or reset. However, the table write function to complete the renaming of the logical source registers of a uop is performed only for those uops whose valid bits are set. For example, in a current set of uops there are, in program order, uop0, uop1, uop2, and uop3. If uop0 causes a partial width stall (i.e. partstall0 signal 1430 is high), the invalidating circuit 1470 drives the uop0_valid signal 1460, the uop1_valid signal 1461, the uop2_valid signal 1462, and the uop3_valid signal 1463 low to invalidate the valid bits of uops0–3, respectively. If uop1 causes a partial width stall (i.e. partstall1 signal 1431 is high), the invalidating circuit 1470 drives the uop0_valid signal 1460 high and drives the uop1_valid signal 1461, the uop2_valid signal 1462, and the uop3_valid signal 1463 low to leave uop0 valid but invalidate uops1–3, respectively. If uop2 causes a partial width stall (i.e. partstall2 signal 1432 is high), the invalidating circuit 1470 drives the uop0_valid signal 1460 and the uop1_valid signal 1461 high and drives the uop2_valid signal 1462 and the uop3_valid signal 1463 low to leave uop0 and uop1 valid but invalidate uop2 and uop3, respectively. If uop3 causes a partial width stall (i.e. partstall3 signal 1433 is high), the invalidating circuit 1470 drives the uop0_valid signal 1460, the uop1_valid signal 1461, and the uop2_valid signal 1462 high and drives the uop3_valid signal 1463 low to leave uops0–2 valid but invalidate uop3.

Figure 3C:
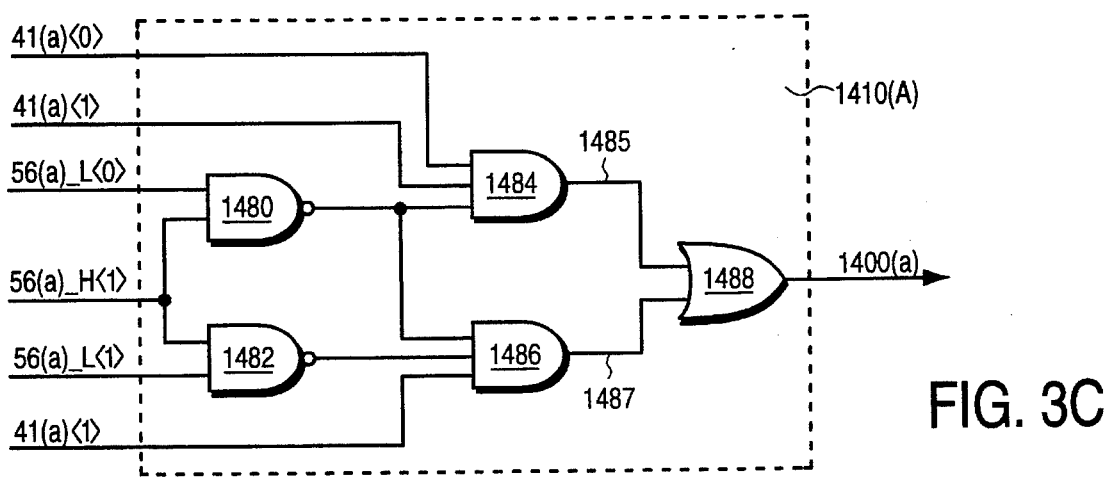
FIG. 3C illustrates the size comparator circuit utilized by the present invention to compare the size bits of the logical source registers and the physical source registers to detect a partial width stall condition. This logic does not include the partial width stall override function f the present invention.

Referring now to FIG. 3C, a representative size comparator circuit 1410(a) utilized by the present invention to compare the size bits of the logical source1 register of uop0 and the high bank and low bank size bits of the corresponding physical source register to detect a partial width stall condition is illustrated. This size comparator circuit may also be used for size comparators 1410(b)–1410(h). The size comparator circuit 1410(a) relies on the following definitions for the size bits:

| Size Bits: | <1> | <0> | Size Indication |
| --- | --- | --- | --- |
| | 0 | 0 | 8 bits |
| | 0 | 1 | not used |
| | 1 | 0 | 16 bits |

-continued

| Size Bits: | <1> | <0> | Size Indication |
|---|---|---|---|
| | 1 | 1 | 32 bits |

The combination of "0 1" for the size bits does not occur. The size comparator circuit 1410(*a*) receives bits 1 and 0 of the size bits of the logical source1 register of uop0 over lines 41(*a*)<1> and 41(*a*)<0>, bits 1 and 0 of the high bank and low bank size bits over lines 56(*a*)_H<1>, 56(*a*)_L<1>, and 56(*a*)_<sub>L</sub><0> of the corresponding physical source register, and outputs a size mismatch signal 1400(*a*). Note that bit 0 of the high bank size bits, (i.e. 56(*a*)_H<0>) is not used by the size comparator since it is redundant. Also note that the combination of "1 0" and "1 1" for the high bank and low bank size bits, respectively, does not occur for two reasons: 1) for integer registers that have high byte and low byte partial widths (such as ah and al), both the high bank and low bank size bits are written when a 16-bit or 32-bit write occur, and 2) integer registers that do not have high byte and low byte partial widths (such as edi, ebp, esp) reside in the low bank of the RAT array and the high bank size bits default to 32-bit, or 11.

Referring still to FIG. 3C, a NAND gate 1480 and a NAND gate 1482 act together to determine the smallest of the sizes indicated by the high bank and low bank size bits. The NAND gate 1480 receives the low bank size bit 0 over line 56_L<0> and the high bank size bit 1 over line 56_H<1 > and outputs the complement value of bit 0 of the smallest size (i.e. tmp#<0>). The NAND gate 1482 receives the low bank size bit 1 over line 56_L<1> and the high bank size bit 1 over line 56_H<1> and outputs the complement value of bit 1 of the smallest size (i.e. tmp#<1>). An AND gate 1484 receives the logical source1 register size bit 1 over line 41(*a*)<1>, the logical source1 register size bit 0 over line 41(*a*)<0>, and the output of the NAND gate 1480 and generates an output signal 1485. When high, the output signal 1485 indicates the size mismatch condition occurring when the logical source register size is 32-bit and the largest of the high bank and low bank physical register sizes is either 8-bit or 16-bit. An AND gate 1486 receives the output of the NAND gate 1480, the output of the NAND gate 1482 and the logical source1 register size bit 1 over line 41(*a*)<1>, and generates an output signal 1487. When high, the output signal 1487 indicates the size mismatch condition occurring when the largest of the high bank and low bank physical register sizes was 8-bit and that the logical source register size is either 16-bit or 32-bit. An OR gate 1488 logically ORs the output signals 1485 and 1487 to generate a size mismatch signal 1400(*a*). When high, the size mismatch signal 1400(*a*) indicates that the size of the logical source1 register for uop0 is larger than either the corresponding high bank or low bank physical source register. The present invention utilizes similar size comparator circuits to check for partial width stall conditions when reading iRAT array entries for the logical source1 and logical source2 registers of uops0–3 as shown by size comparator circuits 1410(*a*)–1410(*h*) of FIG. 3A.

It is appreciated that the size comparison of the present invention does not require the use of separate high bank and low bank entries for renaming logical registers. It is within the scope of the present invention to use a size comparator to detect a partial width stall condition with a single-bank iRAT array. It is also within the scope of the present invention to use other size bit definitions and other size comparator circuits to detect the over-read condition and generate a partial width stall. It is also appreciated that the present invention simultaneously renames eight logical registers corresponding to four uops. However it is within the scope and the spirit of the present invention to rename other numbers of logical registers. It is appreciated that the partial width stall mechanism simultaneously detects stall conditions for each of the eight registers and accordingly invalidates appropriate uops. The present invention is not, however, limited in its scope to the case of simultaneous detecting of partial width stalls. Within the scope of the present invention is that of detecting and implementing partial width stalls in a non-simultaneous fashion. It is within the scope of the present invention to adapt the present invention for such a purpose.

Refer again to FIG. 1. Thus far, the discussion has described the detection of a partial width stall condition using size comparators, the actual stalling of renaming by resetting valid bits of selected uops, and the stalling of the instruction decoder and allocator caused by asserting the RAStall signal 71. The discussion now turns to a description of how the present invention exits a partial width stall. The present invention exits a partial width stall when the condition causing the stall (i.e. the size mismatch) is removed. During each clock cycle the logic 70 checks the current set of uops for a partial width stall condition. If none is detected then renaming is completed. If a partial width stall condition is detected, then selected uops' valid bits are cleared to invalid, or "0", (by the logic of FIG. 3B) to prevent renaming of the logical source registers for those uops. When the stall condition affecting those uops is removed, their valid bits are set to valid, or "1" (by the logic of FIG. 3B) and renaming proceeds. When a size mismatch occurs during the renaming of a logical source register, a partial width stall is caused until the last uop that wrote the register retires. Upon retirement, the value of a uop's destination register is written in a 32-bit write to the appropriate register location in the RRF 90 and the corresponding RRF valid bit 324 in the iRAT array 45 (FIG. 3) is set, thereby indicating that the iRAT array 45 must now look to the RRF 90 when renaming that register. Also upon retirement, the destination register's corresponding size bits in the iRAT array 45 are set to 32-bit since all integer registers in the RRF 90 have 32-bits and are nonspeculative.

The entry and exit of partial width stalls is handled by the same circuitry. The partial width stall circuitry compares the logical source register and corresponding physical source register size bits during each clock cycle to determine whether a stall should occur for that clock cycle. The physical register size bits used are those of the physical registers selected after retirement overrides and new PDest overrides have taken place. Since the partial width stall circuitry must account for retirement overrides and new PDest overrides when selecting the size bits for comparison, the decision of whether to stall must occur after both overrides have occurred. Therefore, each clock cycle the partial width stall detection circuitry (FIG. 3A) decides whether a partial width stall should occur for that cycle. If a size mismatch is detected for a given clock cycle, a partial width stall is asserted for that clock cycle; otherwise, no partial width stall is asserted. The retirement override mechanism effectuates the exit of a partial width stall condition by retiring the last uop that wrote the register causing the stall, thereby changing the size bits of the physical source register to 32-bits and removing the partial width stall condition.

Refer now to FIG. 3D which illustrates a flow chart of the major processing tasks of the partial width stall mechanism of the present invention during a given clock cycle. As described above, during each clock cycle the partial width stall mechanism detects whether a partial width stall should occur for that clock cycle. At block 1505 the process begins at the point in the clock cycle where the logical source registers of a current set of uops have read the iRAT array to obtain a corresponding set of physical source registers. In addition, the retirement and new PDest override blocks have accounted for the PDests of retiring uops and intracycle data dependencies and selectively overridden the physical source register values from the iRAT array to provide a current set of physical source registers. Each of the logical source registers carries two size bits that indicate the size (8-bit, 16-bit, or 32-bit) of the register. Each of the selected physical source registers carries two high bank and two low bank size bits that indicate the size of that register's high bank and low bank register aliases. The size information for each logical source register and corresponding physical source register are input to the partial width stall logic in block 70 (FIG. 1).

At block 1510, a size comparator in the partial width stall logic receives the size bits of the logical source registers and the high bank and low bank size bits of the corresponding physical source registers. In one embodiment an individual size comparator circuit corresponds to each of the logical source registers of a current set of uops. In another embodiment a general size comparator receiving all size bits is utilized.

At block 1515, the size comparator circuit for each logical source register compares the size bits of the logical source register to the high bank and low bank size bits of the corresponding physical source register and generates a size mismatch signal corresponding to each logical source register. A logical source register's corresponding size mismatch signal is driven high by the size comparator circuit if the size bits of the logical source register indicate a size larger than either the high bank or the low bank size bits of the corresponding physical source register; otherwise the size mismatch signal is driven low by the size comparator circuit.

At blocks 1520 and 1525, the process checks the size mismatch signals corresponding to each of the logical source registers to determine whether the size bits of any logical source register indicate a size larger than either the high bank or the low bank size bits of the corresponding physical source register (i.e., if the corresponding size mismatch signal is high). If a size mismatch is detected, the process proceeds to block 1530; otherwise the process jumps to block 1545.

At block 1530, the process determines which uops of the current set of uops have caused a partial width stall condition. This is done by determining which of the Partstall0–3 signals 1430–1433 (FIG. 3A) are asserted during that clock cycle.

At block 1535, the valid bits of each uop causing a partial width stall condition as well as the valid bits of all subsequent uops of the current set are set to invalid. Invalidating a uop's valid bit prevents renaming of that uop's logical source registers. The invalidation of the uop's valid bits is accomplished by the circuit of FIG. 3B.

At block 1540, the allocator 80 and the instruction fetch and decode 40 units (FIG. 1) are stalled to prevent new uops from being presented to the iRAT for renaming. This is accomplished by asserting the RAStall signal 71 (FIG. 1). After block 1540, the process proceeds to block 1550.

Block 1545 is performed when blocks 1520 and 1525 did not detect any partial width stall conditions for the current set of uops. Block 1545 sets the valid bits of all uops0–3 to valid. This is accomplished by the circuit of FIG. 3B. After block 1545, the process proceeds to block 1550.

At block 1550, the logical sources of valid uops are renamed and issued to the reservation station and reorder buffer for later execution. After block 1550 the process returns to block 1505 to be repeated again during the next clock cycle.

Partial Width Stall Override Using Idiom Recognition

Implementation of the mechanism for overriding partial width stalls using idiom recognition in Intel architecture microprocessors is shown by way of example only. The present invention also applies to other microprocessor architectures having other register sets as well. More specifically, in Intel architecture microprocessors the register set comprises larger width registers having partial width registers, such as eax having partial widths ax, ah, and al or ax having partial widths ah and al. A partial width stall condition occurs during the renaming of logical source registers by the RAT when a smaller width write to a partial width register is followed by a read of a larger width register that includes that partial width register (such as a write to al followed by a read of ax or eax). The present invention provides an apparatus for overriding such partial width stall conditions in certain cases. However, it is within the scope and spirit of the present invention to apply the present invention to other microprocessor architectures having other types of partial width registers. In other words, the present invention generally addresses the problem of overriding partial width stall conditions by using an idiom recognition apparatus.

Given the renaming functions of the iRAT and the conditions that cause partial width stalls of the renaming function, there are cases where partial width stalls can be avoided if the iRAT is given additional information. For example, consider the below sequence of uops that exist within a set for a given cycle:

| uop0: | xor | eax, eax | ;eax is zero'ed by XOR function |
| uop1: | mov | ax, 0xff | ;ax gets value ff |
| uop2: | push | eax | ;store eax on top of stack, inc sp |

Referring now to FIG. 1. The renaming by the iRAT logic 10 of the present invention will produce the following results. (Note that the processing steps in generating these rename results are carried out in parallel in the iRAT of the present invention.) In processing uop0, the iRAT logic 10 of the present invention will treat the eax register of uop0 as a destination register and will write a vacant PDest (say PDest 1) to entry 0 and entry 8 of the iRAT table 45 and set the size bits of both entries to represent 32 bits. In processing uop1, the iRAT logic 10 will treat the ax register of uop1 as a destination register and will write a vacant PDest (say PDest 2) to entries 0 and 8 of the iRAT table 45 and set the size bits of entries 0 and 8 to represent 16 bits. In processing uop2, the iRAT logic 10 will treat the eax register of uop2 as a source register. During renaming, the partial width stall detection logic of block 70 will detect a partial width stall condition because the size of the logical source register eax is larger than the physical source register size indicated by the size bits of entry 0 of the iRAT table 45. The stall condition occurs because entry 0 of the iRAT table 45 only knows the whereabouts of the ax portion of the eax register that is being renamed; the iRAT table 45 lost track of the upper 16 bits of eax when it renamed the logical source register ax of uop1. However, the partial width stall condition can be overridden in this case because: 1) the upper 16 bits of eax were last written to zeros and 2) the PDest 2 register currently pointed to by entry 0 if the iRAT array 45 is zero-extended to make the upper 16 bits zeros. By providing each entry of the iRAT array 45 with zero bits that indicate which portions of the corresponding logical register contain zeros and zero-extending the physical source registers, the partial width stall condition can be overridden in many cases.

Refer now to FIG. 1. The present invention provides an apparatus for overriding partial width stalls that includes: 1) an idiom recognizer 53 for detecting "zero function" uops that write zeros to registers (such as eax, ax, or ah) and generating a set of SET/CLEAR# and ENABLE signals for setting and clearing the zero bits in the iRAT array 45 and 2) a partial width stall override mechanism (implemented in logic block 70) for comparing zero bit and size information for each logical source being renamed and overriding partial width stalls in certain cases.

Figure 3E:
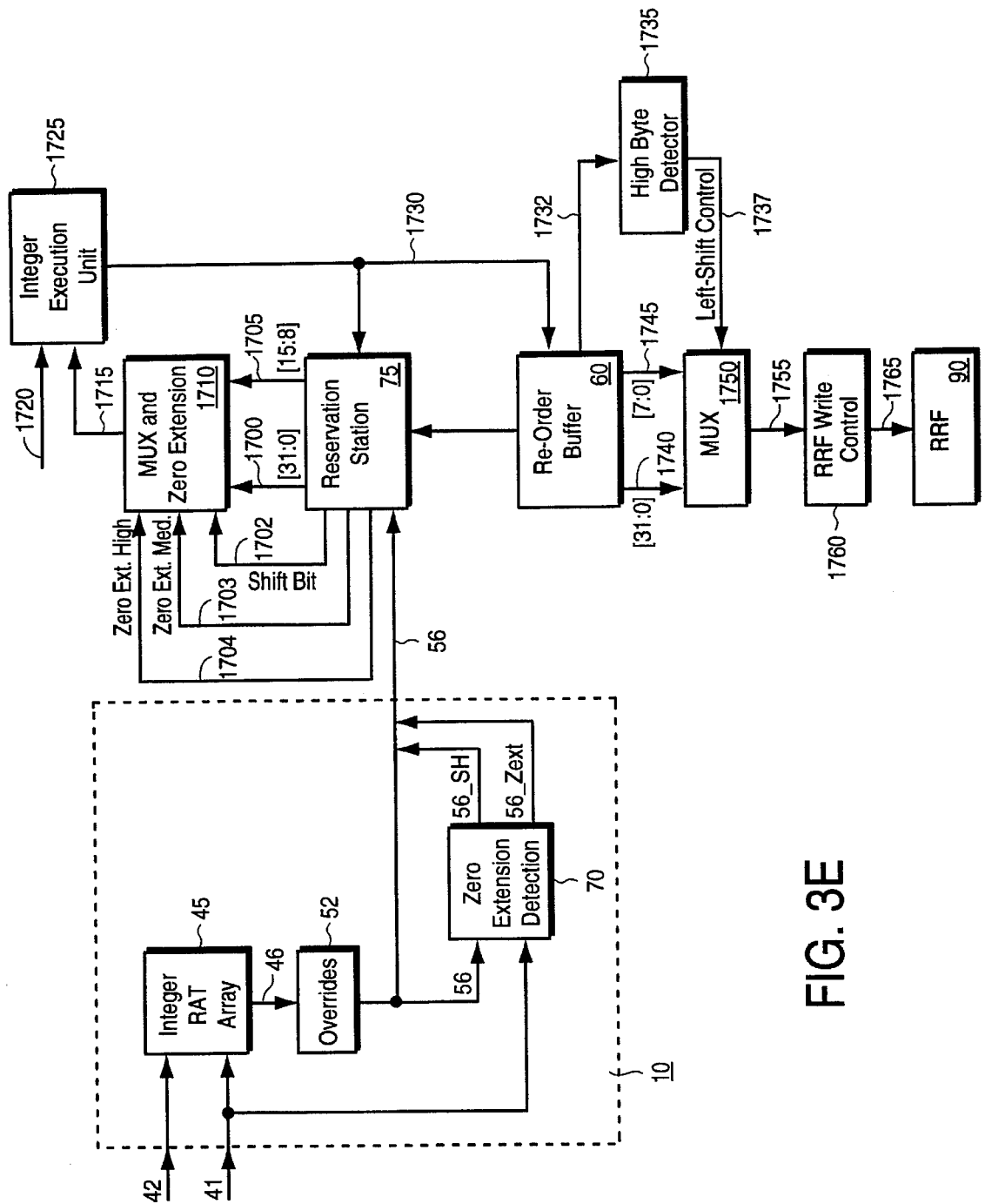
FIG. 3E illustrates an overall block diagram of the iRAT and the zero extension apparatus of the present invention.
Figure 3F:
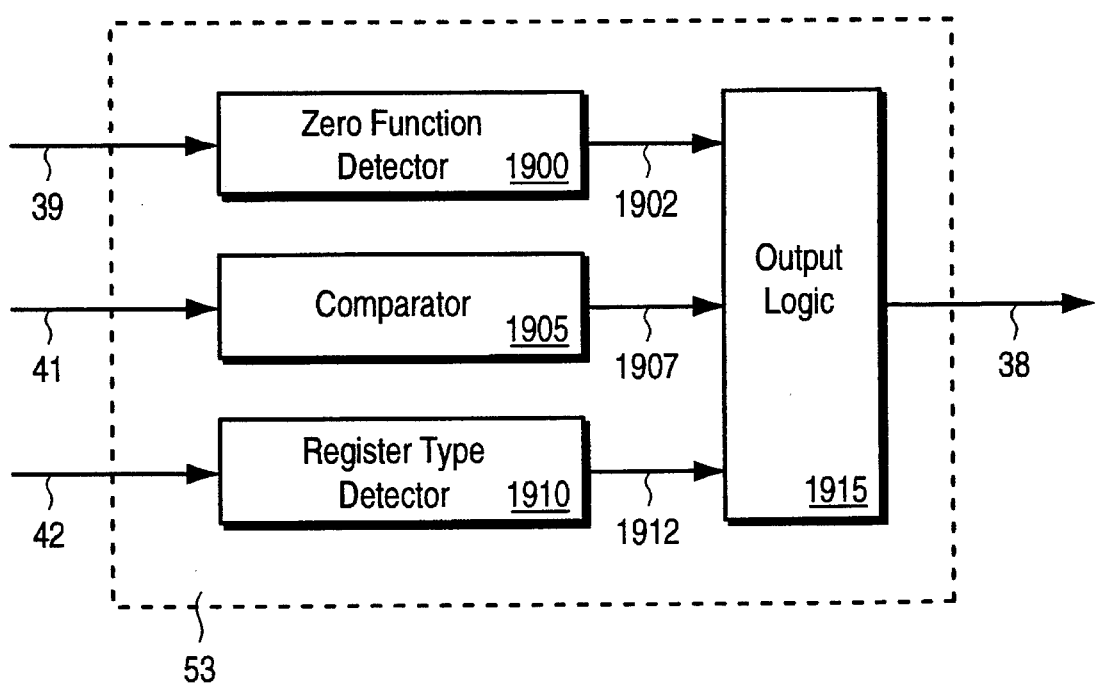
FIG. 3F illustrates a block diagram of the idiom recognizer for detecting zero function idioms and generating a set of zero bits.

Referring now to FIG. 3F, a block diagram of one embodiment of the idiom recognizer 53 is shown. This embodiment detects the following two types of "zero function" uops to set the zero bits in the iRAT array.

|  |  | Type 1 |  |
|---|---|---|---|
| 1) uop: | xor | eax, eax | ;zero register eax |
| 2) uop: | xor | ax, ax | ;zero register ax |
| 3) uop: | xor | ah, ah | ;zero register ah |
|  |  | Type 2 |  |
| 1) uop: | sub | eax, eax | ;zero register eax |
| 2) uop: | sub | ax, ax | ;zero register ax |
| 2) uop: | sub | ah, ah | ;zero register ax |

A "zero function" uop is a uop that causes the destination register to be written to zeros. A zero function detector 1900 receives uops0-3 on the bus 39, detects whether each uop is either an "xor" or a "sub" uop and generates signals 1902(a)-1902(d) on a bus 1902 accordingly. A high or low signal on the bus 1902 indicates that either an "xor" or a "sub" uop was or was not detected for the corresponding uop. A comparator 1905 receives the logical source registers of the current set of uops on a bus 41, determines whether each uop's logical source1 and logical source2 registers are identical, and generates signals 1907(a)-1907(d) on a bus 1907 accordingly. A high or low signal on the bus 1907 indicates that the logical source1 and logical source2 registers for the corresponding uop are or are not identical. A register type detector 1910 receives the logical destination registers of the current set of uops on the bus lines 42, determines whether each logical destination register is a 32 bit register (such as eax), a 16 bit register (such as ax), an 8 bit high byte register (such as ah), or an 8 bit low byte register (such as al), and generates signals 1912(a)-1912(d) on a bus 1912 to indicate the type of each logical destination register. The output logic 1915 receives the information from buses 1902, 1907, and 1912 and generates a pair of SET/CLEAR# and ENABLE signals on a bus 38 for each logical destination register. A high or low state on the SET/CLEAR# signal sets or clears the corresponding zero bit in the iRAT array if the ENABLE signal is also high. If the ENABLE signal is low then the corresponding zero bit is unchanged.

Refer now to FIG. 1. The zero bits in the iRAT array 45 are set and cleared during a prioritized write (explained below) of the physical destination registers according to the following rules:

1. If the following conditions are satisfied for the uop corresponding to the physical destination register: 1) the uop's logical destination register is a 32 bit register (such as eax), 2) the uop's logical source1 and logical source2 registers are identical, and 3) the uop is a "zero function" uop, then SET the high bank and low bank zero bits corresponding to that physical destination register.

2. If the following conditions are satisfied for the uop corresponding to the physical destination register: 1) the uop's logical destination register is either a 16 bit register (such as ax) or an 8 bit high byte register (such as ah), 2) the uop's logical source1 and logical source2 registers are identical, and 3) the uop is a "zero function" uop, then SET the high bank zero bit corresponding to that physical destination register.

3. If the following conditions are satisfied for the uop corresponding to the physical destination register: 1) the uop's logical destination register is either a 32 bit register or an 8 bit high byte register and either a) the uop's logical source1 and logical source2 registers are not identical or b) the uop is not a "zero function" uop, then CLEAR the low bank zero bit corresponding to that physical destination register.

4. If the following conditions are satisfied for the uop corresponding to the physical destination register: 1) the uop's logical destination register is either a 32 bit register, a 16 bit register, or an 8 bit high byte register and either a) the uop's logical source1 and logical source2 registers are not identical or b) the uop is not a "zero function" uop, then CLEAR the high bank zero bit corresponding to that physical destination register.

The high bank and low bank zero bits for each entry in the iRAT array have the following definition. The low bank zero bits mean that the upper 16 bits (bits [31:16]) of the physical source register are zero if the bit is set. The high bank zero bits mean that the high byte bits (bits [15:8]) of the physical source register are zero if the bit is set.

There are other "zero function" uops besides "xor eax, eax and sub eax, eax" that can be detected by an idiom recognizer. However, in order to detect some "zero function" uops, access to additional information of the microprocessor is sometimes required. For example, the "zero function" uop

| uop: | mov | eax, 0 | ;move immediate data 0 into eax | can be detected by detecting the "mov" uop and detecting data 0 on the immediate bus of the microprocessor.

Referring still to FIG. 1, the idiom recognizer 53 generates the pairs of SET/CLEAR# and ENABLE signals on the bus 38 to set and clear the zero bits in the iRAT array 45 according to the rules just described. The zero bit values corresponding to logical destination registers currently being renamed by the iRAT are output on a bus 46_Z to the new physical destination overrides block 55. In other words, for each of the physical destination registers output by the iRAT array 45 on buses 46(a)-46(h), the iRAT array 45 also outputs a corresponding pair of high bank and low bank zero bits on buses 46(a)_Z-46(h)_Z. The new physical destination overrides logic 55 overrides the zero bit values received on the bus 46_Z to reflect the intra-cycle data dependencies between the current set of physical destination registers (described further below) and generates a set of physical destination registers on the bus 56(a)–56(h), a set of high bank and low bank size bits on the buses 56(a)_H–56(h)_H and 56(a)_L–56(h)_L, respectively, and a set of zero on a bits bus 56(a)_Z–56(h)_Z. The size bits and zero bits are sent to the partial width stall detection and partial width stall override logic of block 70.

Referring now to FIG. 3E, a block diagram of the zero extension apparatus of the present invention is illustrated. Zero extension is necessary for overriding partial width stalls using "zero function" idiom recognition. As related to "zero function" idiom recognition, the zero extension logic effectively zeros the portions of the physical source register that the corresponding zero bits indicate to be zeros. In other words, the zero extension logic zeros the "missing" portions of the physical source register that are causing the partial width stall condition when the zero bits indicate that the "missing" portions are zeros. The zero extension detection logic of block 70 receives the eight logical sources from the bus 41 and the eight corresponding physical sources and size bits from the bus 56 and generates corresponding shift bit and zero extend signals on a shift bit bus 56_SH and a zero extend bus 56_Zext, respectively. The shift bit and zero extend signals cause the physical source register data to be appropriately right-shifted and zero-extended before being input to the execution units. The right-shifting function relates to other aspects of the iRAT operation discussed further below.

The zero extension detection logic of block 70 generates the zero extend high and zero extend medium signals based on the logical source register and physical source register sizes. A zero extend high bit being high causes zero extension of the upper 16 bits (bits [31:16]) of the corresponding 32 bit physical source register. A zero extend medium bit being high causes zero extension of the high byte (bits [15:8]) of the corresponding 32 bit physical source register. Therefore, a zero extend high/medium ("hm") of {00} causes no zero extension, a "hm" of {10} zero extends the upper 16 bits, and a "hm" of {11} zero extends the upper 24 bits. In one mode, the zero extend high and medium bit values to zero-extend for overriding partial width stalls are obtained by logically OR'ing the corresponding logical source and physical source zero extend values as shown in Table 2A.

TABLE 2A

| LSrc | hm | PSrc | hm | Zext | hm | Explanation of Differences |
|---|---|---|---|---|---|---|
| 1) EAX | 00 | EAX | 00 | | 00 | no stall condition |
| 2) EAX | 00 | AX | 10 | | 10 | Idiom: no stall, use PSrc size |
| 3) EAX | 00 | AL | 11 | | 11 | Idiom: no stall, use PSrc size |
| 4) EAX | 00 | AH | 11 | | 11 | NOT Idiom: stall |
| 5) AX | 10 | EAX | 00 | | 10 | no stall condition |
| 6) AX | 10 | AX | 10 | | 10 | no stall condition |
| 7) AX | 10 | AL | 11 | | 11 | Idiom: no stall, use PSrc size |
| 8) AX | 10 | AH | 11 | | 11 | NOT Idiom: stall |
| 9) AH | 11 | EAX | 00 | | 11 | AH and AL never stall and always need the Zext high and Zext medium and Zext medium signals. |
| 10) AH | 11 | AX | 10 | | 11 | AH and AL never stall and always need the Zext high and Zext medium and Zext medium signals. |
| 11) AH | 11 | AL | 11 | | 11 | AH and AL never stall and always need the Zext high and Zext medium and Zext medium signals. |
| 12) AH | 11 | AH | 11 | | 11 | AH and AL never stall and always need the Zext high and Zext medium and Zext medium signals. |
| 13) AL | 11 | EAX | 00 | | 11 | AH and AL never stall and always need the Zext high and Zext medium and Zext medium signals. |
| 14) AL | 11 | AX | 10 | | 11 | AH and AL never stall and always need the Zext high and Zext medium and Zext medium signals. |
| 15) AL | 11 | AL | 11 | | 11 | AH and AL never stall and always need the Zext high and Zext medium and Zext medium signals. |
| 16) AL | 11 | AH | 11 | | 11 | AH and AL never stall and always need the Zext high and Zext medium and Zext medium signals. |

The values of Table 2A presuppose that the appropriate zero bits are set in the "Idiom" cases (2, 3, and 7). If the correct zero bits are not set for those cases, then the zero extend high and medium values are wrong. However, since a partial width stall will occur when the correct zero bits are not set, the zero extend values will not be used and the incorrect value does not matter.

For further clarity, an explanation of some of the values in Table 2A is provided. In case #1, no zero extension is necessary because the logical source register (LSrc) requested is EAX and the physical source register (PSrc) represents EAX. In case #2, the upper 16 bits are zero extended by the Zext high bit because the LSrc requested is EAX and the PSrc represents AX. This is a possible Idiom case. If the low bank zero bit is set (indicating that the upper 16 bits of EAX are zero) then the partial width stall condition can be overridden because the upper 16 bits of the physical source register are made identical to the upper 16 bits of EAX through the zero extension. If the low bank zero bit is cleared then a partial width stall will occur and the zero extension bits are effectively ignored. In case #3, the upper 24 bits are zero extended by the Zext high and medium bits because the LSrc requested is EAX and the PSrc represents AL. This is another possible Idiom case. If the low and high bank zero bits are set (indicating that the upper 24 bits of EAX are zero) then the partial width stall condition can be overridden. If the high bank or low bank zero bit is cleared then a partial width stall will occur and the zero extension bits are ignored. In case #4, the zero extend bits are ignored because this is a partial width stall condition that is not overridden in this embodiment of the present invention. A partial width stall condition caused by a high byte register is not overridden because a mechanism to zero extend the upper 16 bits and lower byte is not implemented in this embodiment of the present invention. In case #5, the upper 16 bits are zero extended by the Zext high bit because the LSrc requested is AX and the PSrc represents EAX. In this case the AX portion of the data in the PSrc is used and the upper 16 bits are zero extended because the execution units expect 32 bits of input data. In case #7, the upper 24 bits are zero extended by the Zext high and medium bits because the LSrc requested is AX and the PSrc represents AL. This is another possible Idiom case. If the high bank zero bit is set (indicating that the high byte bits of AX are zero) then the partial width stall condition can be overridden because the upper 8 bits of the physical source register are made identical to the upper 8 bits of AX by the zero extension. Note that the Zext high signal also causes bits [31:16] to be zero extended because the execution units required 32 bit of input data. In cases 9–16, the upper 24 bits are zero extended by the Zext high and medium bits. High byte and low byte LSrcs (such as AH and AL) never cause partial width stalls and the upper 24 bits must always be zero extended before the data is provided to the execution unit. In the case of a high byte register, such as AH, the high byte data (bits [15:8]) is right-shifted to the low byte position (bits [7:0]) before the zero extension of the upper 24 bits is performed. This is done because the execution units assume right-adjusted, zero-extended input data.

The generation of the Zext high and medium bits has been described. The mechanism for performing the actual zero-extending and right-shifting of the physical source register data will now be explained.

The reservation station 75 receives from bus 56 the uops and their associated physical sources, physical destinations, shift bits, and zero extend medium and high bits, stores them in the reservation station 75, and queues the uops for execution to the integer execution unit 1725 and other execution units (not shown) of the microprocessor. The reservation station 75 retrieves the register data for the physical sources that it stores from the ROB 60. When all of the information required to execute a uop is present in the reservation station 75 and the required execution unit is free, for physical source1 of that uop, the reservation station 75 outputs the following corresponding information: bits [31:0] of the physical source1 register data on bus 1700, bits [15:8] of the physical source1 register data on bus 1705, a shift bit signal 1702, a zero extend high signal 1704, and a zero extend medium signal 1703. MUX and Zero extension logic (Mux/Zero logic) 1710 receives bits [31:0] of the physical source1 register data on bus 1700, bits [15:8] of the physical source1 register data on bus 1705, shift bit signal 1702, zero extend high signal 1704, and zero extend medium signal 1703 and generates a 32-bit right-adjusted, zero-extended input value on bus 1715 for input to the integer execution unit 1725. FIG. 3E shows only the control signals and Mux/Zero logic for the physical source1 of the uop. Since the reservation station provides up to two physical sources (it could provide more) to the integer execution unit 1725, identical control signals and Mux/Zero logic are implemented (but not shown) to generate a second right-adjusted, zero-extended input on bus 1720 to the integer execution unit 1725 for the physical source2 of the uop as needed.

The shift bit and zero extend control signals control the right-shifting and zero-extending functions of the Mux/Zero logic 1710 as defined in Table 2B.

TABLE 2B

| Shift | Zext High | Zext Medium | LSrc type and Mux/Zero Logic functions |
|---|---|---|---|
| 0 | 0 | 0 | EAX type reg; pass [31:0], no shift, no zero-ing |
| 0 | 1 | 0 | AX type reg; pass [31:0], no shift, zero [31:16] |
| 0 | 1 | 1 | AL type reg; pass [31:0], no shift, zero bits [31:8] |
| 1 | 1 | 1 | AH type reg; pass [15:8] to [7:0], zero bits [31:8] |

In Table 2B, EAX, AX, AL, and AH represent all 32-bit, low word, low byte, and high byte registers, respectively, in the intel microarchitecture. The first combination of control signals, {0 0 0}, indicates that the logical source was a 32-bit register such as eax. In this case the Mux/Zero logic 1710 passes bus 1700 carrying bits [31:0] of the physical source data to bits [31:0] of bus 1715 without zero-ing any bits. The second combination of control signals, {0 1 0}, indicates that the logical source was a 16-bit low word register such as ax. In this case the Mux/Zero logic 1710 passes bus 1700 carrying bits [31:0] of the physical source data to bits [31:0] of bus 1715 but zeros bits [31:16]. The third combination of control signals, {0 1 1}, indicates that the logical source was an 8-bit low byte register such as al. In this case the Mux/Zero logic 1710 passes bus 1700 carrying bits [31:0] of the physical source data to bits [31:0] of bus 1715 but zeros bits [31:8]. The fourth combination of control signals, {1 1 1}, indicates that the logical source was an 8-bit high byte register such as ah. In this case the Mux/Zero logic 1710 passes bus 1705 carrying bits [15:8] of the physical source data to bits [7:0] of bus 1715 and zeros bits [31:8] of bus 1715. In this manner the Mux/Zero logic 1710 right-adjusts the high byte register value for input to the integer execution unit 1725. In one mode, the above defined functionality of the Mux/Zero logic 1710 is implemented using combinational logic. In another mode a shift register is used.

The integer execution unit 1725 is a 32-bit arithmetic unit that assumes 32 bits of right-adjusted, zero-extended input data on the two input buses 1715 and 1720. The integer execution unit performs arithmetic functions such as addition and subtraction as well as logical functions such as AND, OR, XNOR on the input data and generates a 32-bit right-adjusted result on the output bus 1730. Other types of execution units that assume right-adjusted, zero-extended input data are also advantageously coupled to the Mux/Zero logic 1710.

Figure 3G:
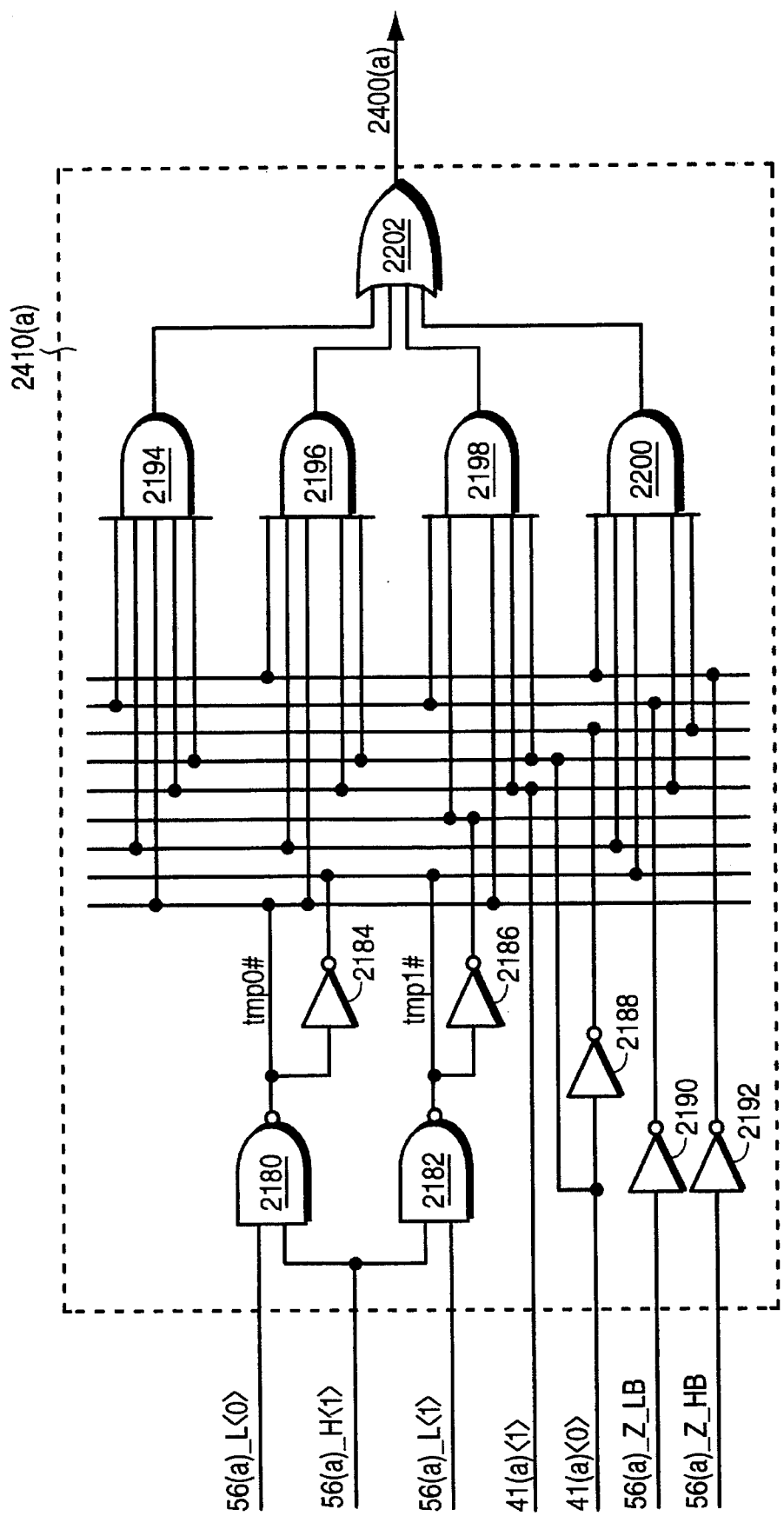
FIG. 3D represents a flow chart of the major processing tasks of the partial width stall mechanism of the present invention during a given clock cycle. The partial width stall override function is not included.
FIG. 3H represents a flow chart of the major processing tasks of partial width stall detection and partial width stall override mechanisms of the present invention.

Referring now to FIG. 3G, a logic implementation of the partial width stall detection and partial width stall override function is illustrated. The functionality of the logic of FIG. 3G is described in Table 2C.

TABLE 2C

Partial Width Stall Conditions that Cannot be Overridden

| LSrc | PSrc | Zero Bits — H/L | Comment |
|---|---|---|---|
| 32 bit | 8 bit | NOT Zbit_LB | Stall because bits [31:16] are not zero |
| 32 bit | 8 bit | NOT Zbit_HB | Stall because bits [15:8] are not zero |
| 32 bit | 16 bit | NOT Zbit_LB | Stall because bits [31:16] are not zero |
| 16 bit | 8 bit | NOT Zbit_HB | Stall because bits [15:8] are not zero |

Table 2C defines the following four conditions under which the logic of FIG. 3G will not override a partial width stall condition: 1) when a logical source register (LSrc) is a 32 bit register, the corresponding size bits of the iRAT array entry indicate an 8 bit physical source register (PSrc) size, and the low bank zero bit is CLEAR, indicating that bits [31:16] of the PSrc pointed to by the iRAT are not zero, 2) when a LSrc is a 32 bit register, the corresponding size bits of the iRAT array entry indicate a 8 bit PSrc size, and the high bank zero bit is CLEAR, indicating that bits [15:8] of the PSrc pointed to by the iRAT are not zero, 3) when a LSrc is a 32 bit register, the corresponding size bits of the iRAT array entry indicate a 16 bit PSrc size, ,and the low bank zero bit is CLEAR, indicating that bits [31: 16] of the PSrc pointed to by the iRAT are not zero, and 4) when a LSrc is a 16 bit register, the corresponding size bits of the iRAT array entry indicate an 8 bit PSrc size, and the high bank zero bit is CLEAR, indicating that bits [15:8] of the PSrc pointed to by the iRAT are not zero. For other combinations of LSrc size, PSrc size, and zero bits values the logic of FIG. 3G will not cause a partial width stall, either because a partial width stall condition is not detected or the partial width stall condition can be overridden.

In other words, the logic of FIG. 3G as functionally described in Table 2C detects a partial width stall condition in three cases: 1) 32 bit LSrc and 8 bit PSrc, 2) 32 bit LSrc and 16 bit PSrc, 1) 16 bit LSrc and 8 bit PSrc. These partial width stall condition are overridden in case #1 if both the high bank and low bank zero bits are set, in case 412 if the low bank zero bit is set, and in case #3 if the high bank zero bit is set.

Referring again to FIG. 3G, the partial width stall detect and override circuit 2410(a) receives size bits 1 and 0 of the logical source1 register of uop0 over lines 41(a)<1> and 41(a)<0>, high bank size bit 1 and low bank size bits 1 and 0 of the corresponding physical source register over lines 56(a)_H<1>, 56(a)_L<1>, and 56(a)_L<0>, respectively, and the high bank and low bank zero bits of the corresponding physical source register over lines 56_Z_HB and 56_Z_LB, respectively, and outputs a stall condition signal 2400(a). The partial width stall detection and override logic 2410(a) is utilized in the present invention by replacing the size comparator block 1410(a) of FIG. 3A with the partial width stall detection and override logic 2410(a), and likewise for the size comparator blocks 1410(b)–1410(h). By this replacement the signals 1400(a)–1400(h) of FIG. 3A becomes signals 2400(a)–2400(h), respectively.

Referring still to FIG. 3G, a NAND gate 2180 and a NAND gate 2182 act together to determine the smallest of the sizes indicated by the high bank and low bank size bits. The NAND gate 2180 receives the low bank size bit 0 over line 56_L<0> and the high bank size bit 1 over line 56_H<1 > and outputs the complement of bit 0 of the smallest size (i.e. tmp0#). The NAND gate 2182 receives the low bank size bit 1 over line 56_L<1> and the high bank size bit 1 over line 56_H<1> and outputs the complement of bit 1 of the smallest size (i.e. tmp1#). An inverter 2184 receives the output of the NAND gate 2180 and generates bit 0 of the smallest size (i.e., tmp0). An inverter 2186 receives the output of the NAND gate 2182 and generates bit 1 of the smallest size (i.e., tmp1). An inverter 2188 receives line 41(a)<0> and generates the complement value. An inverter 2190 receives the low bank zero bit of line 56(a)_Z_LB and generates the complement value. An inverter 2192 receives the high bank zero bit of line 56(a)_Z_HB and generates the complement value.

Four AND gates 2194, 2196, 2198, and 2200 detect the partial width stall conditions corresponding to rows 1–4 of Table 2C, respectively. To detect the partial width stall conditions, the four AND gates receive size information about the logical source and physical source registers along with zero bit information. The AND gate 2194 receives the output of the inverter 2190, the output of the NAND gate 2182, the output of the NAND gate 2180, the line 41(a)<1>, and the line 41(a)<0>. The AND gate 2196 receives the output of the inverter 2192, the output of the NAND gate 2182, the output of the NAND gate 2180, the line 41(a)<1>, and the line 41(a)<0>. The AND gate 2198 receives the output of the inverter 2190, the output of the inverter 2186, the output of the NAND gate 2180, the line 41(a)<1>, and the line 41(a)<0>. The AND gate 2200 receives the output of the inverter 2192, the output of the inverter 2186, the output of the inverter 2184, the line 41(a)<1>, and the output of the inverter 2188. An OR gate 2202 logically ORs the output signals of AND gates 2194, 2196, 2198 to generate a stall condition signal 2400(a). When high, the stall condition signal 2400(a) indicates that a partial width stall condition that could not be overridden was detected.

It is appreciated that the partial width stall detection and override mechanism of the present invention does not require the use of separate high bank and low bank entries for renaming logical registers. It is within the scope of the present invention to use a partial width stall detection and override mechanism to detect and override a partial width stall condition with a single-bank iRAT array. It is also within the scope of the present invention to use other size bit definitions and other partial width stall override mechanisms to override partial width stall conditions. It is also appreciated that the present invention simultaneously renames eight logical registers corresponding to four uops. However it is within the scope and the spirit of the present invention to rename other numbers of logical registers. It is appreciated that the partial width stall detection and override mechanism simultaneously detects stall conditions for each of the eight registers and accordingly invalidates appropriate uops. The present invention is not, however, limited in its scope to the case of simultaneous detecting of partial width stalls. Within the scope of the present invention is that of detecting and implementing partial width stalls in a non-simultaneous fashion. It is within the scope of the present invention to adapt the present invention for such a purpose.

Figure 3H:
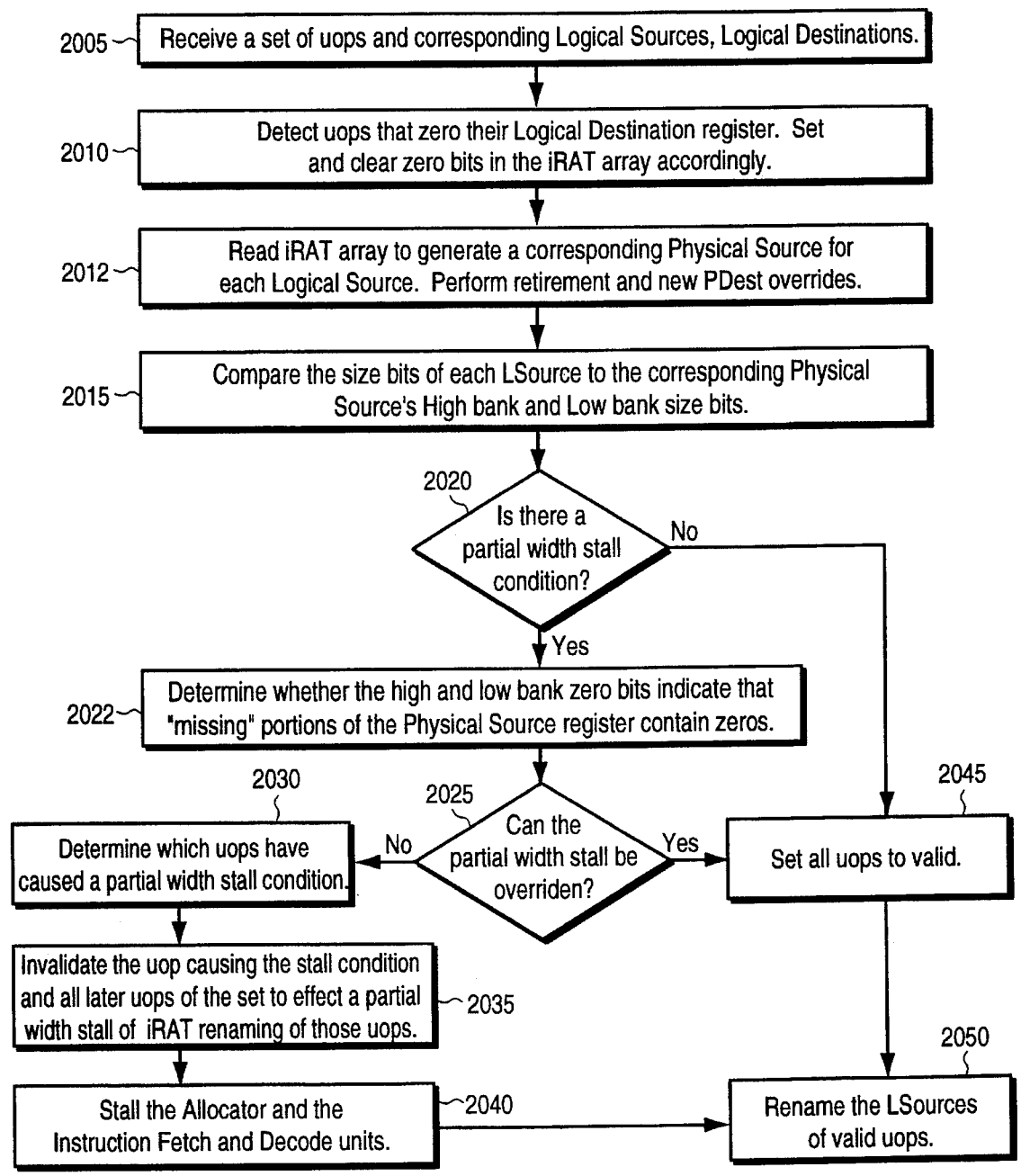

Referring now to FIG. 3H, a flow chart of the major processing tasks of the idiom recognition and partial width stall override mechanism of the present invention during a given clock cycle is illustrated. As described above, during each clock cycle the partial width stall detect logic determines whether there is a partial width stall condition and the partial width stall override logic determines whether the partial width stall condition can be overridden.

At block 2005, a set of uops and corresponding logical sources and logical destinations (generated by an instruction fetch and decode unit) are received by the iRAT, and specifically by the idiom recognizer.

At block 2010, the idiom recognizer detects whether each uop zeros its logical destination register and generates a set of signals to set and clear corresponding zero bits in the iRAT array accordingly. The zero bits for each entry in the iRAT array indicate the portions of that entry's logical source register that are known to contain zeros. In one embodiment, low bank and high bank zero bits in the iRAT array indicate that bits [31:16] and bits [15:8] are zero, respectively.

At block 2012, the iRAT array is read to generate corresponding physical sources corresponding to each logical source register. The physical sources point to physical source registers in a reorder buffer. Physical sources and corresponding high bank and low bank size bits and high bank and low bank zero bits are read out of the iRAT array. Retirement overrides are performed on the physical sources and size bits to account for uops that are retiring during the current clock cycle. New physical destination overrides are performed on the physical sources, the size bits and the zero bits to account for intra-cycle data dependencies.

At this point each of the logical sources carries two corresponding size bits that indicate the size (8-bit, 16-bit, or 32-bit) of the register. Each of the physical sources carries two high bank and two low bank size bits that indicate the size of the corresponding high bank and low bank register aliases. In addition, each of the physical source registers carries a low bank and a high bank zero bit that indicate whether bits [31:16] and [15:8], respectively, of the physical source register are zeros. The size bits and zero bits for the logical sources and physical sources are sent to the partial width stall detect and partial width stall override logic of block 70 (FIG. 1).

At block 2015, the partial width stall detection logic compares the size bits of each logical source register to the high bank and low bank size bits of the corresponding physical source register and determines whether a partial width stall condition exists. A partial width stall condition exists if the size bits of the logical source register indicate a size larger than either the high bank or the low bank size bits of the corresponding physical source register.

At blocks 2020, the process checks determines whether any partial width stall conditions were detected in block 2015. If a partial width stall condition is detected, the process proceeds to block 2022 to determine if a partial width stall override is possible; otherwise the process jumps to block 2045 to continue the renaming process.

At block 2022, the partial width stall override logic determines whether the high and low bank zero bits of any physical source registers causing a stall condition indicate that the "missing" portion(s) of that physical source register contains zeros. The "missing" portion(s) of a physical register are those bits of the register that, if available would negate the stall condition. For example, if an LSrc is EAX and its PSrc is AX then the "missing" portion is bits [31:15]. If an LSrc is AX and its PSrc is AL then the "missing" portion is bits [15:8]. If an LSrc is EAX and its PSrc is AL then the "missing" portion is bits [31:8]. A physical source register's low and high bank zero bits indicate that bits [31:16] and [15:8] are zeros, respectively. Zero extension of the physical source registers according to the zero extend high and medium bits is performed to assure that the "missing" portions of the physical source registers are zero'ed as indicated by the zero bits.

At block 2025, the partial width stall override logic determines whether the partial width stall condition can be overridden. If the high bank and low bank zero bits of each physical source register causing a stall condition indicate that the "missing" portions of the physical source register are zeros, then the partial width stall can be overridden and the process jumps to step 2045; otherwise the process proceeds to step 2030.

At block 2030, the process determines which uops of the current set of uops have caused a partial width stall. This is done by determining which of the Partstall0–3 signals 1430–1433 (FIG. 3A) are asserted during that clock cycle.

At block 2035, the valid bits of each uop causing a partial width stall as well as the valid bits of all subsequent uops of the current set are set to invalid. Invalidating a uop's valid bit prevents renaming of that uop's logical source registers. The invalidation of the uop's valid bits is accomplished by the circuit of FIG. 3B.

At block 2040, the allocator 80 and the instruction fetch and decode 40 units (FIG. 1) are stalled to prevent new uops from being presented to the iRAT for renaming. This is accomplished by asserting the RAStall signal 71 (FIG. 1). After block 2040, the process proceeds to block 2050.

Block 2045 is performed either when no partial width stall was detected in block 2020 or when the partial width stall can be overridden in block 2025. Block 2045 sets the valid bits of all uops0–3 to valid. This is accomplished by the circuit of FIG. 3B. After block 2045, the process proceeds to block 2050.

At block 2050, the logical sources of valid uops are renamed and issued to the reservation station and reorder buffer for later execution. After block 2050 the process returns to block 2005 to be repeated again during the next clock cycle.

iRAT Retirement Override Block 50

Retirement is the act of removing a completed uop from the ROB 60 and committing its state to the appropriate permanent architectural state in the microprocessor. The ROB 60 informs the iRAT logic 10 that the retiring uop's destination is no longer located in the ROB 60 but must be taken from the RRF 90. If the retiring PDest is found in the iRAT array 45, the matching entry (or entries) is reset to point to the RRF. However, if a current uop being translated happens to use the same logical registers as a source as one that is retiring, the data currently in the array is not valid and must be overridden with the entry's reset value. The retirement of uops takes precedence over the initial table read output values.

Figure 4A:
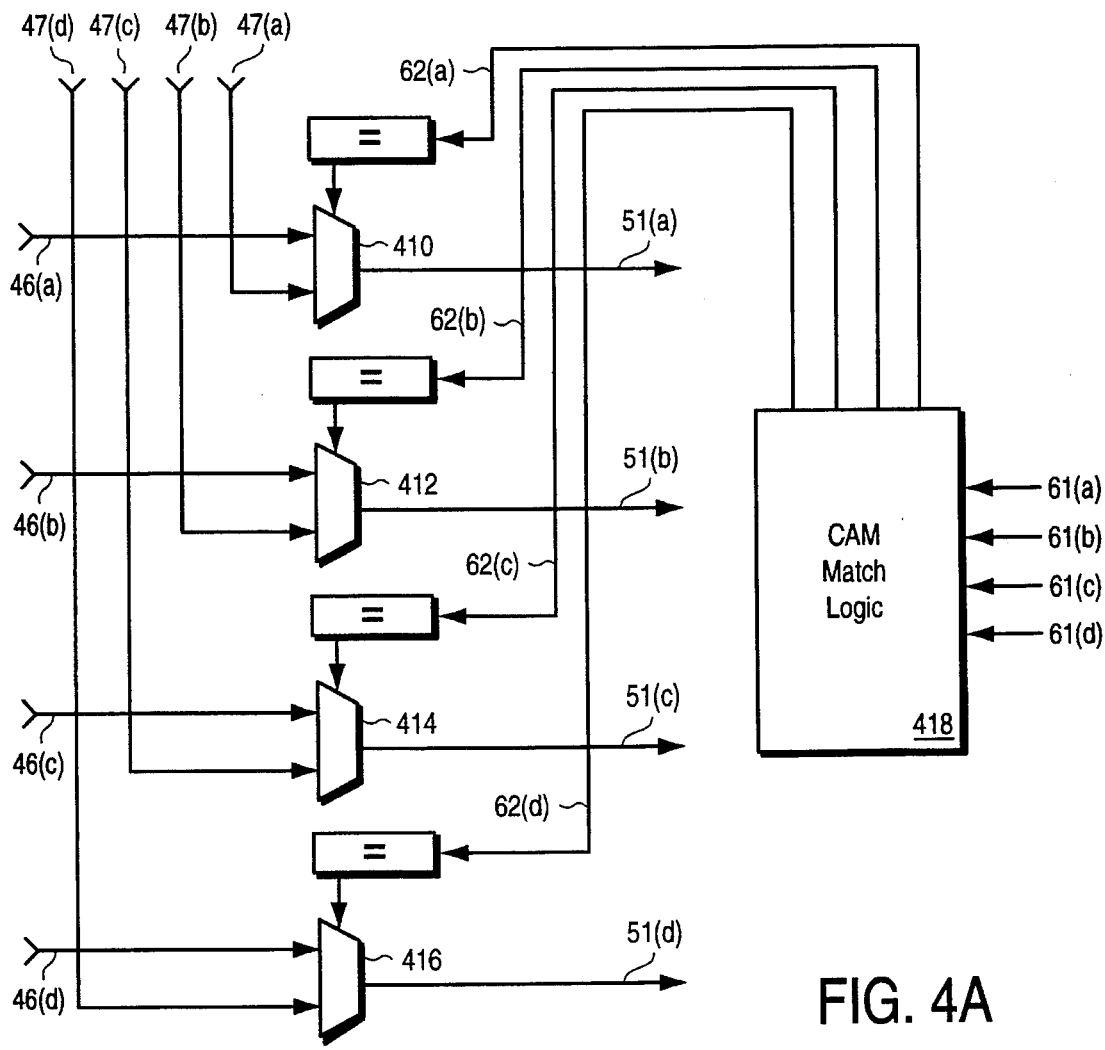
FIG. 4A illustrates the retirement override logic for the four possible logical source1 input values of a current set of uops processed by the iRAT logic of the present invention.

Refer to FIG. 4A which illustrates in block diagram form circuitry of the retirement override block 50. It is appreciated that up to four possible uops may retire during a clock cycle while the current set of uops are being processed by the table read and table write circuitry of the iRAT 45. Each retiring uop may have only one physical destination register (PDest) that retires. Therefore, there may be four possible retiring destination registers per clock cycle. These retiring destination registers (PDests) must be compared to those PDests of the source entries of the iRAT that are being indexed with respect to the current uop set by the retirement override block 50 in order to generate the proper values for the complete table read operation. The below list illustrates a sample retiring set of uops:

|         | Source1 | Source2 | PDest Retire |
|---------|---------|---------|--------------|
| uop_r0: | PSource | PSource | PDestRx      |
| uop_r1: | PSource | PSource | PDestRy      |
| uop_r2: | PSource | PSource | PDestRz      |
| uop_r3: | PSource | PSource | PDestRq      |

Within the same cycle as the current set of uops being processed, a retiring set of uops may retire as shown above. This retiring set comprises eight physical source operands (which are not of concern herein) and importantly, four possible physical destination registers "pointers" that retire (PDestRx, PDestRy, PDestRz, and PDestRq). These retiring physical destination pointers will be compared against the physical source pointers output from the iRAT array during the initial read operation of the iRAT array 45 which are output over buses 46(a)–46(h). The below discussion illustrates in detail how and why such is accomplished.

Figure 4B:
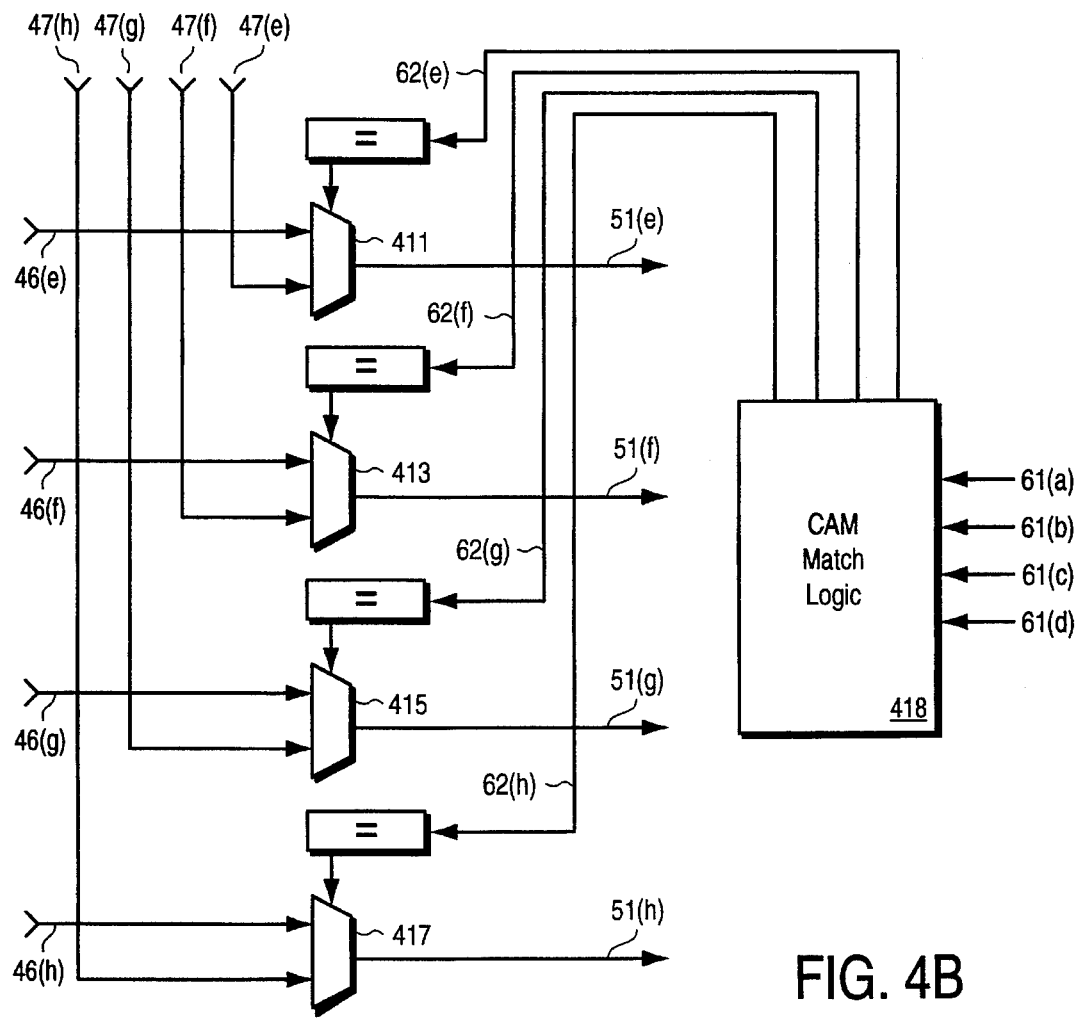
FIG. 4B illustrates the retirement override logic for the four possible logical source2 input values of a current set of uops processed by the iRAT logic of the present invention.

For clarity of presentation, the logic utilized by the present invention retirement override block for the source1 values of the current set of uops (i.e., for buses 46(a)–46(d)) is illustrated in FIG. 4A while the logic required for the source2 of each uop of the current set is (i.e., for buses 46(e)–46(h)) illustrated in FIG. 4B. It is appreciated that logic used to realize the retirement override functions for each source2 of the current set is analogous to the case for the source1 values and where different will be explained in detail. The basic object of the retirement override block 50 is to account for the true location of the source operands that are associated with the current set of uops (i.e., those received from block 40) and that may also have just retired within the same clock cycle. In other words, the data associated with these sources may not be found within the ROB, as the iRAT table may indicate, but rather within the RRF 90 at a known designated place for each integer logical register.

FIG. 4A illustrates four separate multiplexer devices 410, 412, 414, and 416. Each multiplexer corresponds to the source1 operand for a separate retiring uop. Input to one port of each multiplexer is the physical source register output from the iRAT array 45 for each uop of the current set by buses 46(a) to 46(d) for uop0 to uop3, respectively. For instance, bus 46(a) carries the pointer of the physical source register pointer output from iRAT 45 for the logical source1 input to the iRAT for uop0; this bus is input to mux 410. Line 46(b) carries the physical source register pointer output from the iRAT 45 for the logical source1 input to the iRAT for uop1; this bus is input to mux 412. Line 46(d) is the physical source pointer corresponding to the logical source register of source1 of uop3 of the current set and is fed to mux 416.

Also input to each port of the multiplexers is the pointer value of the logical source1 for each uop that points to the retirement register file (RRF) 90 entry for that uop; these are input as buses 47(a)–47(d) for uop0 to uop3, respectively. These pointers are generated based on the logical source inputs 41(a)–41(d). For each logical source input there is a unique location within the RRF corresponding to that logical source register. For instance, bus 47(a) is the pointer value that indicates the location within the RRF 90 of the data associated with the logical source1 register for uop0 of the current set; this bus is input to mux 410. Line 47(b) is the pointer value that indicates the location within the RRF 90 of the data associated with the logical source1 register for uop1 of the current set; this bus is input to mux 412. These buses are generated by the retirement override circuit 50 once the four input logical register source1 values are known (i.e., lines 41(a)–41(d)). It is appreciated that for a given logical register, its location (i.e., offset) within the RRF 90 is always constant. Therefore, the circuitry to generate the pointers over buses 47(a) to 47(d) needs only to output the proper pointer value to index the RRF 90 based on the given source1 values (buses 41(a)–41(d)) for each uop of the set.

Refer still to FIG. 4A. Input to each of the select line inputs of the multiplexers 410, 412, 414, and 416 are lines 62(a)–62(d), respectively. These are the match lines for each of the four retiring PDests against the physical source1 values. When asserted, each line indicates that the associated physical source1 value for a given uop is associated with a retiring PDest pointer. If this is the case, then the proper place to look for the data of the source1 is not from the physical register entry of the iRAT 45, but rather from the RRF 90 entry associated with that logical source1. For example, if line 62(a) is asserted, the output bus 51(a) will output the pointer value associated with bus 47(a) which is the pointer into the RRF 90 associated with the source1 of uop0, otherwise bus 51(a) will output the pointer of bus 46(a) which is the physical source register pointer of the iRAT 45 array associated with the logical source1 of uop0. Likewise, if line 62(b) is asserted, the output 51(b) will output the signal associated with bus 47(b) which is the pointer into the RRF 90 associated with the logical source1 of uop1, otherwise bus 51(b) will output the pointer of bus 46(b) which is the physical source pointer of the iRAT 45 array associated with the logical source1 of uop1. Therefore, the output buses 51(a)–51(d) indicate the true location of where the data is for each source operand of the logical source1 values of each uop of a given set of uops. These outputs 51(a)–51(d) are pointers that will be used to index the ROB 60 or the RRF 90 to locate the data for the source1 operand values of each uop.

Input to the CAM match logic 418 of FIG. 4A are four signal buses 61(a) to 61(d) that indicate the PDests of the four retiring uops. For instance, bus 61(a) indicates the retirement pointer of the PDest for the retiring uop0. Line 61(b) indicates the retirement pointer of the PDest for the retiring uop1. Line 61(d) indicates the retirement pointer of the PDest for the retiring uop3. The CAM match logic 418 compares the PDest pointers of the retiring uops against all physical register entries of the iRAT to determine if any entry (or entries) of the iRAT retired. Then the CAM match logic 418 determines if one of the retiring PDests is also used as a physical source by one of the uops of the current set within this clock cycle. If so, the source of data output by the retirement override logic 50 for the uop of the current set will be the RRF entry and not the ROB entry. In such way, the retirement overrides block 45 determines if any of the four physical sources1 associated with the current set of uops for a given cycle are associated with any of the retiring PDests of the retiring uops as indicated over bus 61. If this is the case then a match line is asserted for each source1 for each uop so that the retirement pointer to the RRF can be supplied instead of the PDest pointer to the ROB, as discussed above. It is noted that the CAM match logic 418 is executed during the first half clock cycle 207 (of FIG. 2) which is the "high" period. The CAM match logic 418 will be explained in detail to follow.

FIG. 4B illustrates the circuitry required to generate pointer values over 51(e)–51(h) which represents the output source pointer values for the source2 values for a separate retiring uop. The logic is similar to that of FIG. 4A. There are four mux devices 411, 413, 415, and 417 for routing the source2 pointer for uop0, uop1, uop2 and uop3. Input to one port of each mux is the pointer corresponding to the physical source pointer to the ROB 60 output from the iRAT array for the source2 value for each uop; these are buses 46(e)–46(h) for uop0 to uop3, respectively. For instance, bus 46(e) carries the pointer of the physical source register pointer output from iRAT 45 for the logical source2 that was input to the iRAT for uop0; this bus is input to mux 411. Line 46(f) carries the physical source register pointer output from the iRAT 45 for the logical source2 input to the iRAT for uop1; this bus is input to mux 413. Line 46(h) carries the physical source register pointer output from the iRAT 45 for the logical source2 input to the iRAT for uop3; this bus is input to mux 417.

Also input to each port of the multiplexers is the pointer of the logical source2 for each uop that point to the retirement register file (RRF) 90 entry for that uop; these are buses 47(e)–47(h) for uop0 to uop3, respectively. These pointers are generated based on the logical source inputs 41(e)–41(h), respectively. Bus 47(e) is the pointer value that indicates the location within the RRF 90 of the data associated with the logical source2 register for uop0 of the current set; this bus is input to mux 411. Line 47(f) is the pointer value that indicates the location within the RRF 90 of the data associated with the logical source2 register for uop1 of the current set; this bus is input to mux 413. These buses are generated by the retirement override circuit 50 once the four input logical register source2 values are known (i.e., lines 41(e)–41(h)). It is appreciated that for a given logical register, its location (i.e., offset) within the RRF 90 is always constant. Therefore, the circuitry to generate the pointers over buses 47(e) to 47(h) needs only to output the proper pointer value to index the RRF 90 based on the given source1 values (buses 41(e)–41(h)) for each uop of the set.

Refer still to FIG. 4B. Input to each of the select line inputs of the multiplexers 411, 413, 415, and 417 are lines 62(e)–62(h), respectively. These are the match lines for each of the four retiring PDests against the physical source2 values. When asserted, each line indicates that the associated physical source2 value for a given uop is associated with a retiring PDest pointer. If this is the case, then the proper place to look for the data of the source2 is not from the physical register entry of the iRAT 45, but rather from the RRF 90 entry associated with that logical source1. For example, if line 62(*e*) is asserted, the output bus 51(*e*) will output the pointer value associated with bus 47(*e*) which is the pointer into the RRF 90 associated with the source2 of uop0, otherwise bus 51(*e*) will output the pointer of bus 46(*e*) which is the physical source register pointer of the iRAT 45 array associated with the logical source2 of uop0. Likewise, if line 62(*f*) is asserted, the output 51(*f*) will output the signal associated with bus 47(*f*) which is the pointer into the RRF 90 associated with the logical source2 of uop1, otherwise bus 51(*f*) will output the pointer of bus 46(*f*) which is the physical source pointer of the iRAT 45 array associated with the logical source2 of uop1. Therefore, the output buses 51(*e*)–51(*h*) indicate the true location of where the data is for each source operand of the logical source2 values of each uop of a given set of uops. These outputs 51(*e*)–51(*h*) are pointers that will be used to index the ROB 60 or the RRF 90 to locate the data for the source2 operand values of each uop.

Input to the CAM match logic 418 of FIG. 4B are four signal buses 61(*a*) to 61(*d*) (which are the same four signals as for FIG. 4A) that indicate the PDests of the four retiring uops. For instance, bus 61(*a*) indicates the retirement pointer of the PDest for the retiring uop0. Line 61(*b*) indicates the retirement pointer of the PDest for the retiring uop1. Line 61(*d*) indicates the retirement pointer of the PDest for the retiring uop3. The CAM match logic 418 compares the PDest pointers of the retiring uops against all physical register entries of the iRAT to determine if an entry (or entries) of the iRAT retired. Then the CAM match logic 418 determines if one of the retiring PDests is also used as a physical source by one of the uops of the current set within this clock cycle. If so, the source of data output by the retirement override logic 50 for the uop of the current set will be the RRF entry and not the ROB entry. In such way, the retirement overrides block 45 determines if any of the four physical sources2 associated with the current set of uops for a given cycle are associated with any of the retiring PDests of the retiring uops as indicated over bus 61. If this is the case then a match line is asserted for each source2 for each uop so that the retirement pointer to the RRF can be supplied instead of the PDest pointer to the ROB, as discussed above. It is noted that the CAM match logic 418 is executed during the first half clock cycle 207 (of FIG. 2) which is the "high" period. The CAM match logic 418 will be explained in detail to follow.

CAM Match Logic 418

Figure 4C:
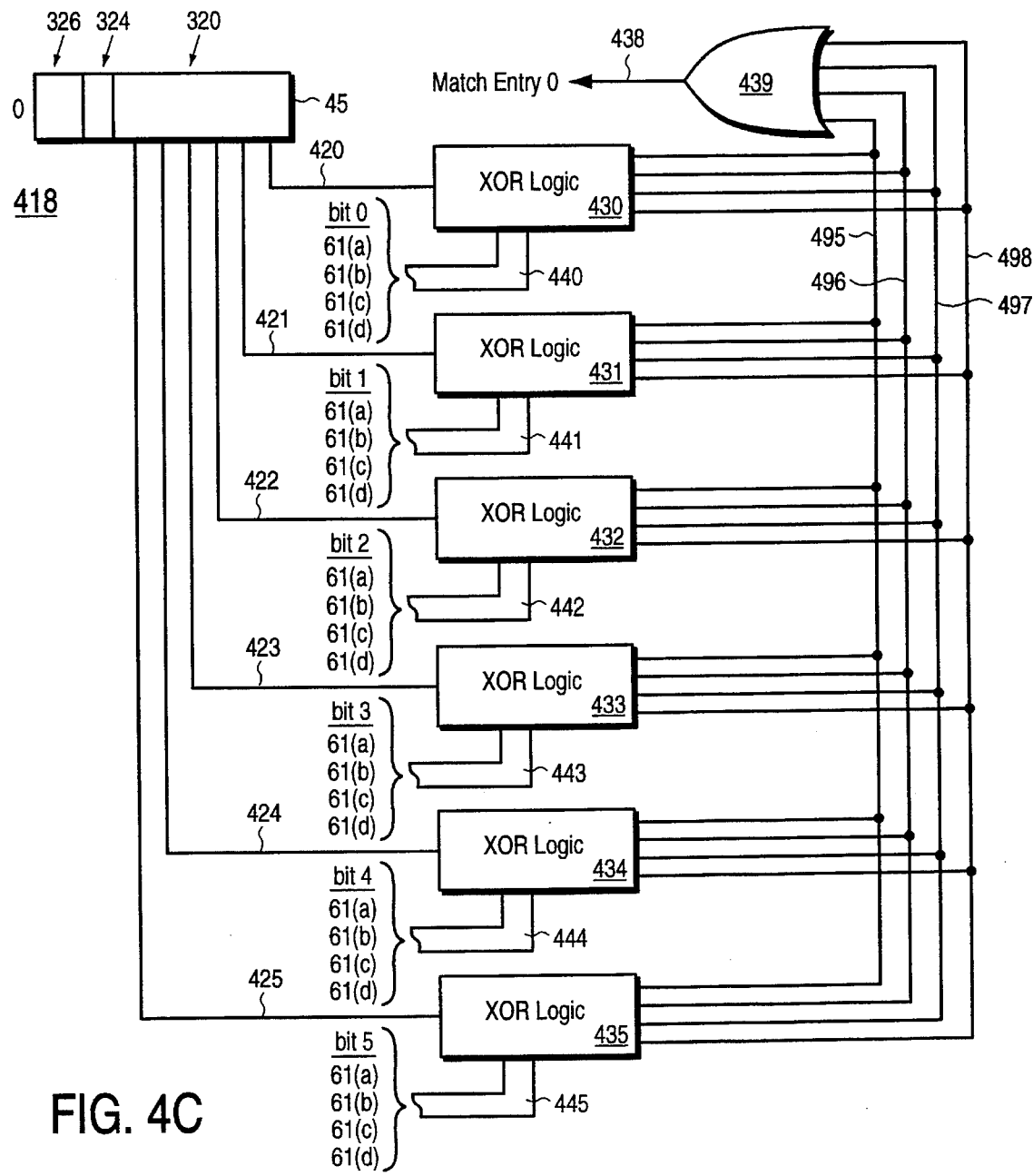
FIG. 4C illustrates a portion of the CAM match logic utilized by the present invention to generate the match signal for entry zero of the iRAT array.

The CAM match logic 418 is illustrated in more detail in FIG. 4C. The match logic 418 is implemented using standard CAM match techniques. FIG. 4C illustrates the logic required to match the four retirement PDest pointers supplied from the ROB over buses 61(*a*)–61(*d*) against the zero entry of the iRAT array 45. It is appreciated that the below logic is replicated within the present invention for every entry (0–11) of the iRAT array 45.

In order to perform the matching of all four retiring PDests (PDestRx, PDestRy, PDestRz, PDestRq) at the same instant, the following logic technique is utilized. Each bit of the 6 bit physical register pointer value 320 for entry zero of the iRAT is output over a separate line which am lines 420–425, respectively. Each line is fed to an XOR logic circuit which are numbered 430 to 435, respectively. Also fed to each of the XOR logic device are the corresponding bits for each retirement PDest pointer of buses 61(*a*)–61(*d*). For example, fed to XOR logic block 430 via bus 440 are the bits of bit position 0 of each retirement PDest pointer of buses 61(*a*)–61(*d*). Fed to XOR logic block 431 via bus 441 are the bits of bit position 1 of buses 61(*a*)–61(*d*). Lastly, fed to XOR logic 435 via bus 445 are the bits of bit position 5 for buses 61(*a*)–61(*d*). The match lines 495, 496, 497, and 498 (corresponding to uop0–uop3) are precharged high at the start of each clock cycle. If any bits of the signals from the retirement PDest pointer do not equal the corresponding bit supplied from the iRAT entry, then the corresponding match line for that uop is brought low. Logically, for XOR device 430, line 420 is XNOR'd with bit0 of line 61(*a*), PDestRx, and the result output over line 495, line 420 is XNOR'd with bit0 of line 61(*b*), PDestRy, and the result output over line 496, line 420 is XNOR'd with bit0 of line 61(*c*), PDestRz, and the result output over line 497, and line 420 is XNOR'd with bit0 of line 61(*d*), PDestRq, and the result output over line 498.

If line 495 is high then PDestRx matched with entry zero of the iRAT. If line 496 is high then PDestRy matched with entry zero of the iRAT. If line 497 is high then PDestRz matched with entry zero of the iRAT. If line 498 is high then PDestRq matched with entry zero of the iRAT. When line 438 is high then one of the above four PDests matched with entry zero of the iRAT array 45.

For example, if the zero bit position of bus 61(*a*) does not match bit zero of the zero entry (i.e., line 420) then line 495 is brought low. If the zero bit position of bus 61(*b*) does not match line 420 then line 496 is brought low. If the zero bit position of bus 61(*c*) does not match line 420 then line 497 is brought low. If the zero bit position of bus 61(*d*) does not match line 420 then line 498 is brought low. The same is true for each of the other XOR logic blocks except block 431 processes the bit 1 positions, block 432 processes the bit 2 positions, block 433 processes the bit 3 positions, block 434 processes the bit 4 positions and block 435 processes the bit 5 positions; each block operates simultaneously. Therefore, if any match line should be left asserted after each XOR logic block has processed, then that match line indicates a match between the physical register pointer of entry zero of the iRAT table 45 and the PDest value of a particular retiring uop.

If match line 495 is asserted, the match was with respect to the PDest (PDestRx) of retiring uop0 and the physical register of entry zero. If match line 496 is asserted, the match was with respect to the PDest (PDestRy) of retiring uop1 and the physical register of entry zero. If match line 497 is asserted, the match was with respect to the PDest (PDestRz) of retiring uop2 and the physical register of entry zero. Or, if match line 498 is asserted, the match was with respect to the PDest (PDestRq) of retiring uop3 and the physical register of entry zero. All the match lines (495–498) are fed to OR gate 439 and the output 438 signifies that a match occurred for the zero entry of the iRAT for one of the PDests of the four retiring uops. It is appreciated that the logic of FIG. 4C is replicated for each entry of the iRAT 45 so that each entry of the iRAT array 45 generates its own OR'd match signal signifying, when asserted, that a match for that particular entry occurred with one of the retiring PDest values of the retiring uops for a given cycle. For each replicated circuit for each entry, the difference is that the bits of each entry (of column 320) replace the input lines 420–425 of entry zero. Since there are 12 entries in the iRAT 45 of FIG. 3, there are twelve separate OR'd match signals generated by the present invention which individually indicate whether nor a particular entry's physical destination matched a retiring PDest pointer.

Figure 4D:
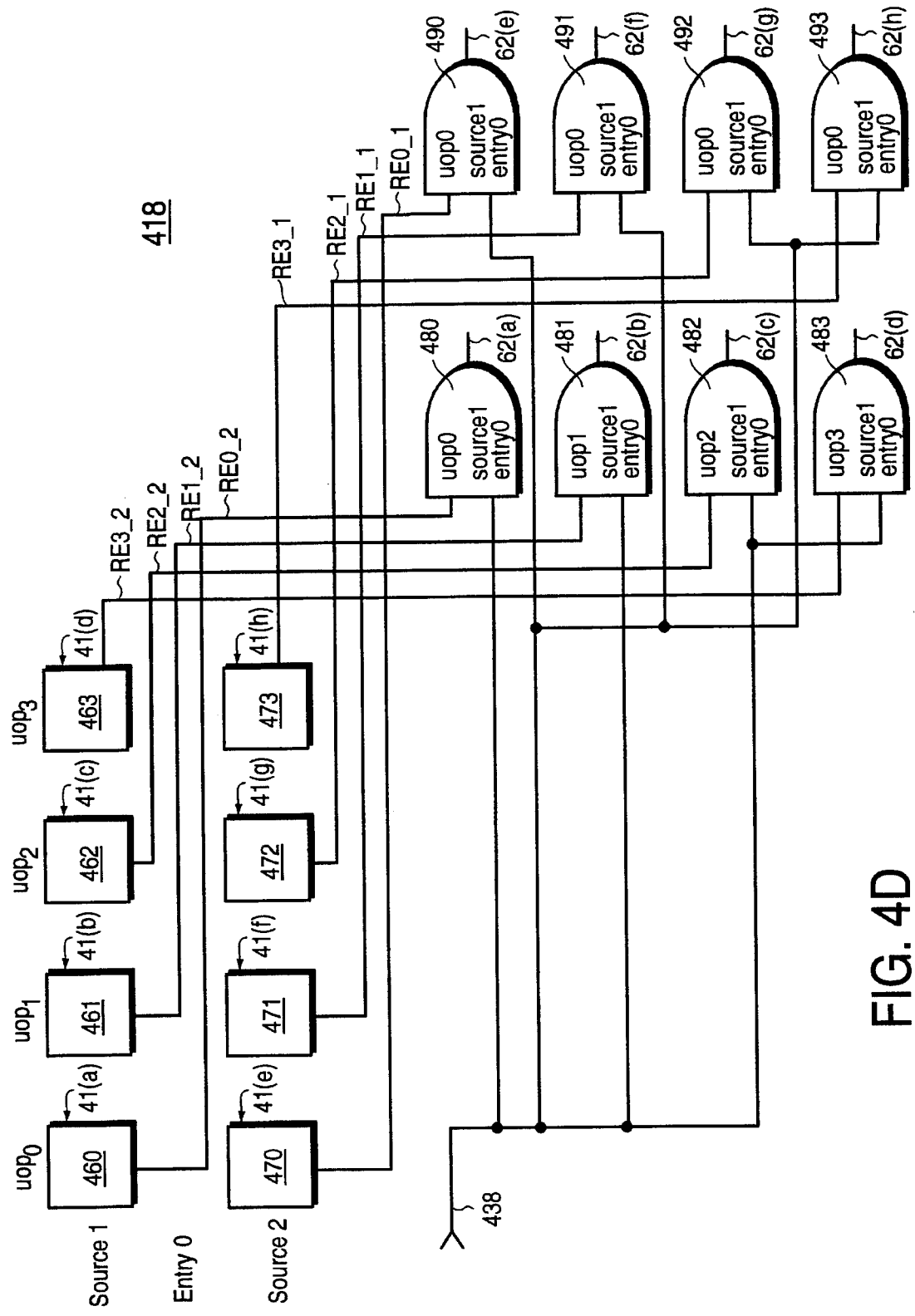
FIG. 4D illustrates a portion of the CAM match logic utilized by the present invention to generate the eight output signals (for entry zero of the iRAT array) used to control the mux logic of FIG. 4A and FIG. 4B.

Refer to FIG. 4D which illustrates the generation of the signals used to supply the select lines of the mux devices of FIG. 4A and FIG. 4B which originate from the CAM match logic 418 of the present invention for entry zero of the iRAT array 45. The circuitry of FIG. 4D illustrates the logic required to route the OR'd match signal for a given iRAT entry (here line 438 for entry zero) to the appropriate mux of FIG. 4A and FIG. 4B. FIG. 4D illustrates the eight read decoders associated with entry 0 of the iRAT 45 table. These are the read enable decoders 460–463 for source1 and 470–473 for source2. For respective uops (uop0 to uop3) and for respective sources (source1 to source2) the eight decoder units will output a signal corresponding to which of the eight sources read entry zero of the iRAT for the current set of uops. The logical source pointers of the current set are input to the read decoders via lines 41(a)–41(h) as shown.

It is noted that this circuitry of FIG. 4D is replicated within the present invention for each entry of the iRAT 45 and the logic for entry zero is shown for illustration. Match signal 438, when asserted, indicates that the physical source pointer of entry zero of the iRAT column 320 matched one of the retiring PDests for the set of retiring uops. Read decoders 460 to 463 generate the read enables for uop0 to uop3 for source1 (i.e., if source1 of uop0–uop3 read entry 0) and input signals from buses 41(a) to 41(d) while read decoders 470 to 473 generate the read enables for uop0 to uop3 for source2 (i.e., if source2 of uop0–uop3 read entry 0) and input signals from buses 41(e) to 41(h). It is appreciated that all eight read decoders for a given entry could output a valid read signal simultaneously if each source of each uop of a given set read that entry. For instance, read enable signal RE3_1 means that it is the read signal for the zero entry, for the source1 value of the third uop of the current set. Signal RE2_2 is the read signal for the zero entry of the iRAT for the source2 of the uop2.

There are eight AND gates which AND the match signal 438 for a given entry of the iRAT with the read enables to indicate if a particular source for a particular uop was: (1) read by a uop of the current source; and (2) also associated with a retiring PDest. For illustration, AND gate 481 receives RE2_1 and also signal 438. If the output 62(b) of AND gate 481 goes high, then uop1 of the current set refers to a physical source pointer has source1 that just retired. Also, AND gate 492 receives RE2_2 and also signal 438. If the output 62(g) of AND gate 492 goes high, then uop2 of the current set refers to a physical source having an associated source2 that just retired within the current clock cycle. It is appreciated that the match line 438 is common to the zero entry of the iRAT and therefore is fed to all AND gates of the logic of FIG. 4D.

For any given entry of the iRAT only one AND gate for a given uop and for a given source can be asserted at any one time. It is appreciated that for each entry of the iRAT the AND gate outputs for a given uop and a given source are all OR'd together and this OR'd result makes up the signals over buses 62(a)–62(h). For instance, consider the signal over line 62(h), output from AND gate 493, which corresponds to the source2 of uop3 for entry zero. Each AND gate output for all of the entries of the iRAT (0–11) for source2 of uop3 are all OR'd together to create the result signal over line 62(h). Also, the output of the AND gate associated with source I and uop2 for entry 1 of the iRAT (not shown in FIG. 4D) is OR'd with the output of the AND gate 481 which is for source1, uop2, for entry 0 of the iRAT. The same is true for all AND gates of FIG. 4D across all entries of the iRAT. Using the above circuitry, the present invention generates signals over lines 62(a)–62(h) as output to the mux devices of FIG. 4A and 4B. The Table 3 below illustrates the meaning of these signals when asserted.

TABLE 3

| Signal | Meaning |
|---|---|
| 62(a) | uop0 source1 of the current set retired in this cycle |
| 62(b) | uop1 source1 of the current set retired in this cycle |
| 62(c) | uop2 source1 of the current set retired in this cycle |
| 62(d) | uop3 source1 of the current set retired in this cycle |
| 62(e) | uop0 source2 of the current set retired in this cycle |
| 62(f) | uop1 source2 of the current set retired in this cycle |
| 62(g) | uop2 source2 of the current set retired in this cycle |
| 62(h) | uop3 source2 of the current set retired in this cycle |

As stated above, the mux devices of FIG. 4A and FIG. 4B utilize the signals of Table 3 to determine which pointer value to forward over bus 51 for each of the eight possible source values. Either the physical register pointer to the ROB 60 (i.e., from iRAT) will be forwarded or the pointer to the RRF 90 will be forwarded. It is appreciated that there are alternative ways in which to achieve the above functionality with much different circuitry. It is appreciated further that the spirit and scope of the present invention is not limited by the above circuitry.

New PDest Overrides Block 55

Figure 5A:
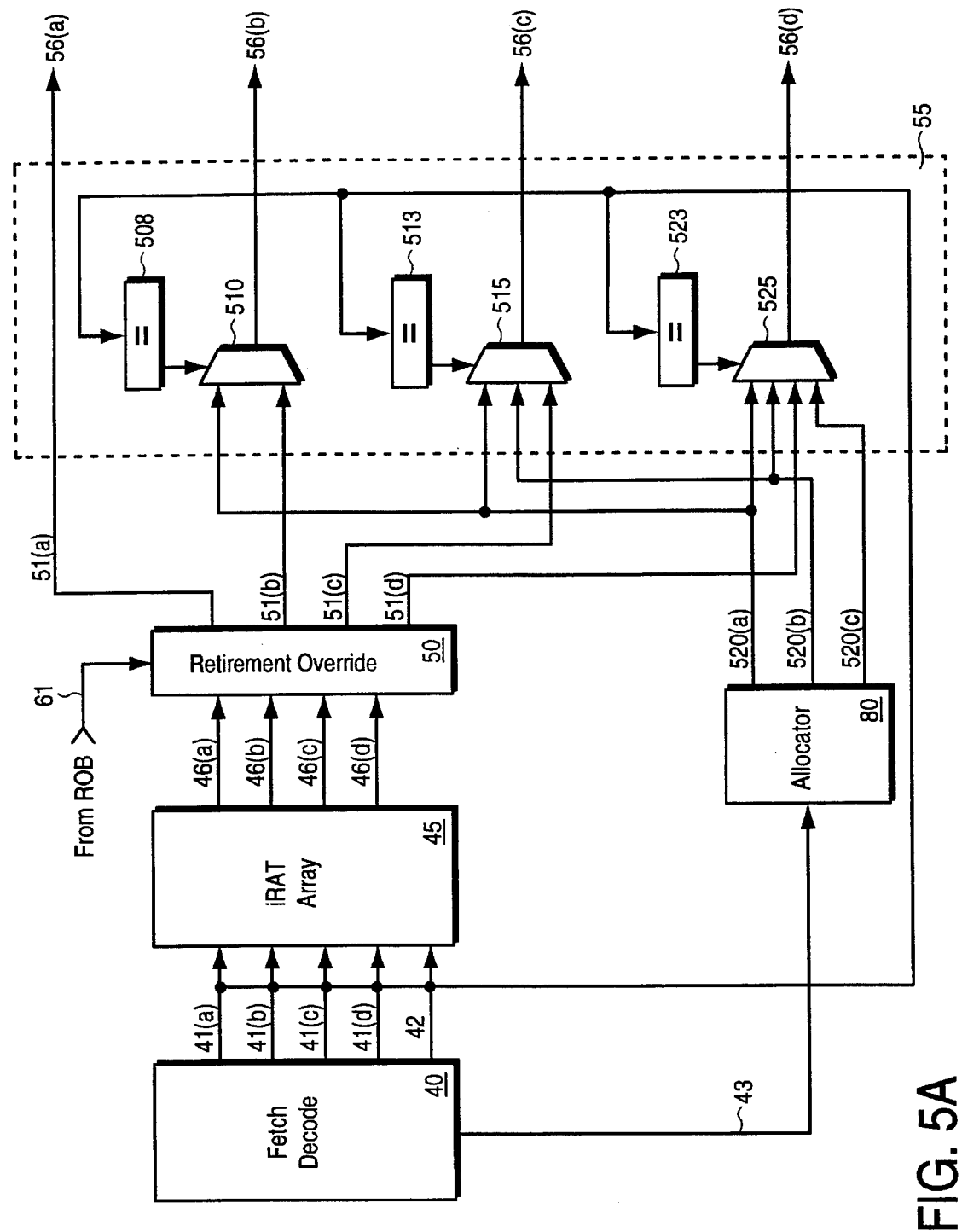
FIG. 5A illustrates the new PDest override logic of the present invention for processing the conditions when intracycle data dependencies occur between logical sources of a given uop and a logical destination of a prior uop for the logical source1 values of the current uop set.

Refer to FIG. 5A. The new PDest overrides block 55 of the present invention (shown by FIG. 5A and 5B) handles the case where a logical source of a given uop of a set is also the logical destination of a previous (preceding) uop of the same given set of uops for the current cycle. The new PDest Override Block 55 is also called the N-wide bypass because physical sources output from the iRAT array 45 during the initial read operation may be bypassed, under direction of the present invention, by certain physical destination registers. The processing of the block 55 of the present invention takes place during the period 220 of the current clock cycle (as shown in FIG. 2). For instance consider the following set of uops:

|  |  |  | Log. src1 | Logical src2 | Logical dest |
|---|---|---|---|---|---|
| uop0: | add | eax, ebx | eax | ebx | eax |
| uop1: | add | ecx, eax | ecx | eax | ecx |
| uop2: | inc | ecx | ecx |  | ecx |
| uop3: | mov | [memory], ecx | ecx |  | [memory] |

The logical source registers of the add operation of uop1 are ecx and eax, the logical destination of uop1 is the ecx register. However, the logical destination of uop0 is the eax register, which is also the logical source of the uop1 register. If the iRAT write operations into the iRAT and the iRAT read operations were done in sequence (i.e., one uop at a time), then the physical register value read from the iRAT table for the eax source register of uop1 would be the same value as the PDest value written into the iRAT (by the priority write operation) for the eax register of uop0; this the desired result. However, since all of the physical source pointer values for each of the logical sources of a given set of operations are read from the iRAT at once, the physical register value initially read from the iRAT for the eax source of uop1 is not the PDest value assigned for the eax destination of uop0 because the table write operations do not occur until after the table read operations are complete for a given set of operations within the present invention.

Therefore, the new PDest overrides block 55 is provided within the present invention to allow a bypass operation when naming logical sources to account for the above intra-cycle data dependencies between logical source registers of an operation and logical destination registers of a preceding operation. Using the bypass logic, the physical source register value output by the iRAT logic 10 for the eax source of uop1 will be that same PDest pointer assigned for the eax destination of uop0 which is supplied from the allocator 80 and written into the iRAT array 45 by the priority write logic (below). Similarly, the physical source register value supplied by logic 10 for source ecx of uop2 will be the PDest pointer assigned for the ecx destination of uop1 that is supplied by the allocator 80. It is appreciated that if there were no intra-cycle data dependencies between sources of uops and destinations of preceding uops then the new PDest overrides block 55 of the present invention would not be required. It is further appreciated that the PDest overrides block 55 of the present invention is also required because the operations of a given set are processed simultaneously and, with respect to a given set of uops, an iRAT read operation for a given uop will take place before the occurrence of a relevant iRAT write operation.

Refer to FIG. 5A which illustrates the logic of the PDest overrides block 55 of the present invention required to implement the bypass functions for the source1 values. In operation, the fetch and decode unit 40 generates four logical source1 values 41(a) to 41(d) which index the iRAT array 45. In response, the iRAT array 45 initially outputs four physical source registers over the four buses 46(a)–46(d), one for each logical source1 value. The retirement override block 50 then determines if one of these physical register values of 46(a)–46(d) is also a PDest that retires within the current clock cycle. In effect, the retirement override block 50 decides, for each logical source1, if the pointer given from the iRAT table should be used or if the pointer to the RRF 90 for that logical source1 should be used. Once decided, the retirement override block 50 outputs the proper pointer over buses 51(a)–51(d) for the logical source1 values of the uops (uop0 to uop3) of the current set. It is appreciated that the four logical destination registers for each uop of the set of uops are transmitted via bus 42 to the new PDest override block 55. Bus 42(a) carries the logical destination register for uop0, bus 42(b) for uop1, bus 42(c) for uop2 and bus 42(d) carries the logical destination register for uop3.

At about the same time of the initial read operation of the iRAT array 45 and of the processing of the retirement override block 50, the allocator block 80 examines the state of the physical registers within the ROB to determine which are available for use and allocates them for new use by the iRAT logic 10. After a uop has retired and its results written into the RRF 90 (and the appropriate RRF valid bit set within the iRAT array 45), the retired PDest associated with the retired uop will be free for further use by the ROB. The allocator 80 will generate a list of at least four PDest pointers that are vacant for the iRAT logic 10 to assign (by the table write operation) to the logical destination registers of the current set of uops. For sake of terminology, the PDest values output by the allocator for a given cycle are: PDesta; PDestb; PDestc; and PDestd for uop0, uop1, uop2 and uop3, respectively. The pointer value for PDesta is output over bus 520(a), for PDestb over bus 520(b) and for PDestc over bus 520(c) and for PDestd over line 520(d). The bus 520(d) is not utilized in the new PDest override block 55 of the present invention.

The three mux devices 510, 515, and 525 of FIG. 5A create the bypass logic required for intra-cycle data dependencies such as the case shown above when a logical destination of one uop is used as a logical source of a subsequent uop within a given set of uops. The input pointer values 51(a)–51(d) will either point to registers in the ROB 60 or the RRF 90, as discussed above, for each uop of the set. The pointer value 51(a) supplied from block 50 is associated with uop0 and since there are no preceding uops to uop0 within a given set, that signal goes straight out of block 55 and becomes signal 56(a). In other words, there can be no intracycle data dependency for the first uop of a given set. Therefore, signal 56(a) represents the register pointer to a register that holds or will eventually hold the actual data for logical source1 for uop0 that will be used by the other portions of the microprocessor to execute and retire this uop.

The next signal, signal 51(b), is fed to mux 510 which represents the register pointer for source1 for uop1 supplied by block 50. Signal over bus 51(b) is a pointer either to the ROB 60 or to the RRF 90. The value of pointer PDesta is also fed to mux 510 over bus 520(a). A select circuit 508 for controlling the selection lines for mux 510 receives both the logical source1 register value for uop1 (signal 41(b)) and also the logical destination register value for uop0 via bus 42(a). These registers are compared by a comparison circuit and if these register values match, then the select logic 508 causes the mux 510 to route the pointer value PDesta from bus 520(a) to bus 56(b), otherwise mux 510 routes the signal from bus 51(b) to bus 56(b). If the values match, then the logical source1 for the uop1 is the same as the logical destination of the uop0 and the value renamed for source1 should be the same as that assigned by the iRAT array 45 for the destination of uop0 which is the PDesta from the allocator 80. The terms match and equals as used above will be further described below.

The signal 51(c) frown block 50 is the next signal for uop2 and is fed to mux 515 of FIG. 5A. This signal represents the register pointer associated with source1 for uop2 (a pointer either to the ROB or to the RRF). The PDesta and PDestb values are also fed to mux 515 over buses 520(a) and 520(b), respectively. A select circuit 513 for controlling mux 515 receives the logical source1 value for uop2 (signal 41(c)) and also receives the logical destination values for both uop0 and uop1 from bus 42(a) and 42(b), respectively. The selection logic 513 compares, simultaneously, the signal over bus 41(c) with both values over buses 42(a) and 42(b) via two separate comparison circuits. According to the select logic 513 for mux 515, if the logical source1 for uop2 (the signal over 41(c))equals the logical destination for uop1 (bus 42(b)) then the signal for PDestb is output over bus 56(c) irrespective of the value of the logical destination of uop0. If the logical source1 for uop2 (bus 41(c)) equals the logical destination for uop0 (bus 42(a)) and the logical source1 for uop2 does not equal the logical destination for uop1 (bus 42(b)), then the signal for PDesta is output over bus 56(c). If neither of the above is true, then the signal from bus 51(c) from block 50 is output over bus 56(c). The circuitry for this select logic 513 for mux 515 may be devised from a number of well known techniques according to the above logical description.

The next signal, signal 51(d) of FIG. 5A, is fed to mux 525 from block 50 which represents the register pointer associated with source1 for uop3 (a pointer either to the ROB or to the RRF). The PDesta, PDestb, and PDestc values are also fed to mux 525 over buses 520(a), 520(b), and 520(c), respectively. A select circuit 523 for controlling mux 525 receives the logical source1 value for uop3 (signal 41(d)) and also receives the logical destination values for uop0, uop1, and uop2 over buses 42(a), 42(b), and 42(c), respectively. Comparison circuits of block 523 compare the register pointer of bus 41(*d*) to each of the signals over buses 42(*a*), 42(*b*), and 42(*c*) simultaneously. According to the select circuit 523 for mux 525, if the logical source for uop3 (bus 41(*d*)) equals the logical destination for uop2 then bus 56(*d*) outputs PDestc (line 520(*c*)) irrespective of the logical destinations of uop1 or uop0. If the signal over 41(*d*) equals the logical destination for uop1 and 41(*d*) does not equal the logical destination of uop2 and 41(*d*) does not equal the logical destination of uop0 then bus 56(*d*) outputs PDestb. If the signal over 41(*d*) equals the logical destination for uop0 and 41(*d*) does not equal either the logical destination for uop1 and 41(*d*) does not equal the logical destination for uop2 then bus 56(*d*) outputs PDesta. If none of the above is the case, the bus 56(*d*) outputs the signal over bus 51(*d*) directly. The circuitry for this select logic 523 for mux 525 of the present invention may be devised from a number of well known techniques according to the above logical description. The outputs 56(*a*) to 56(*d*) are fed to the reservation station and represent the final renamed physical registers that have been assigned to each of the source1 values for the current uop set. When the uops are executed, the data to execute the uops will be obtained from these physical source registers as renamed.

Figure 5B:
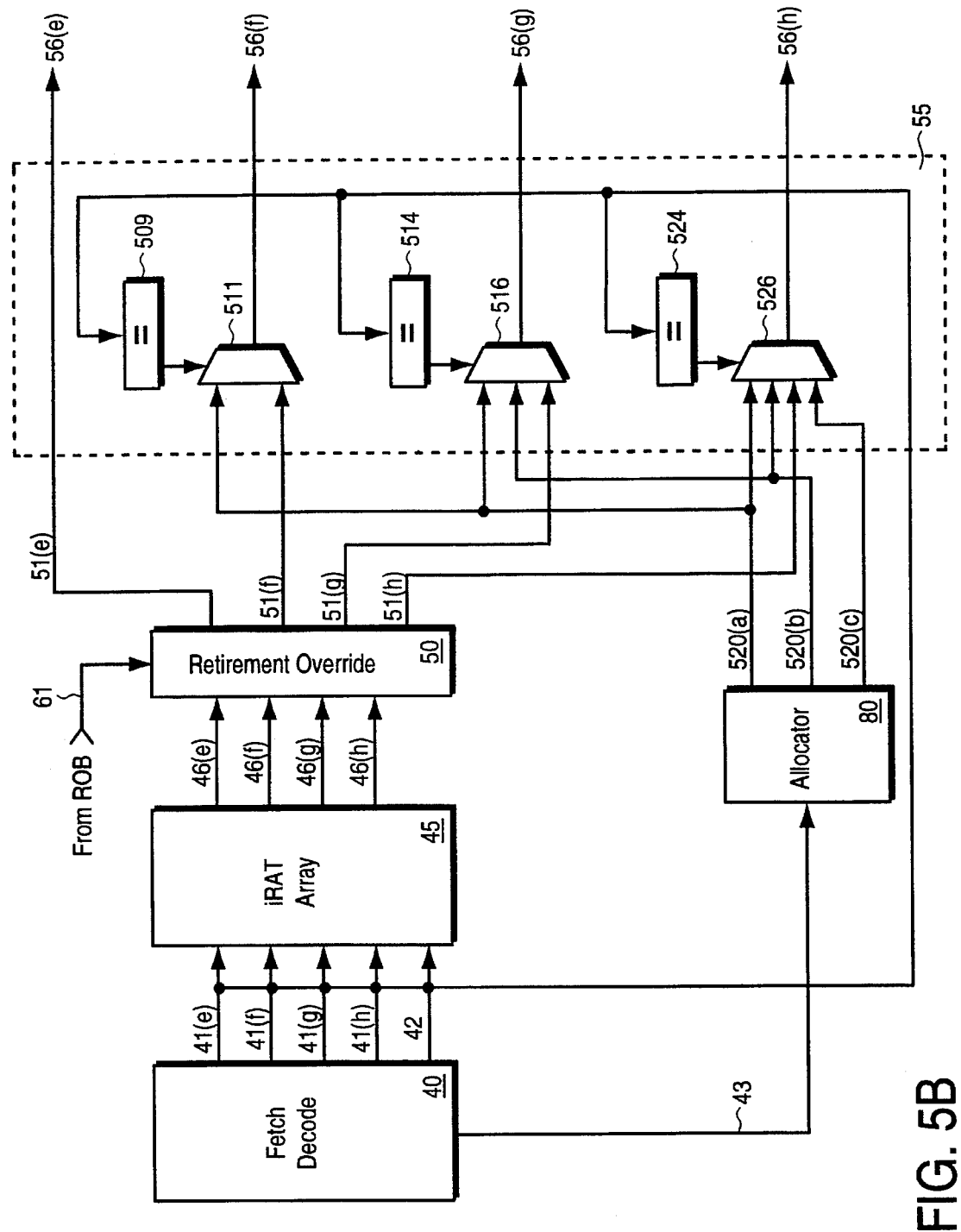
FIG. 5B illustrates the new PDest override logic of the present invention for processing the conditions when intracycle data dependencies occur between logical sources of a given uop and a logical destination of a prior uop for the logical source2 values of the current uop set.

Recall that each uop may contain two source registers; the above logic is for source1 and the below logic is for source2. FIG. 5B illustrates the new PDest override circuitry 55 of the present invention for the source2 registers for each uop of the current set. The allocator 80 outputs are the same as for FIG. 5A, the PDest values output by the allocator for a given cycle are: PDesta; PDestb; PDestc; and PDestd. The pointer for PDesta is output over bus 520(*a*), for PDestb over bus 520(*b*) and for PDestc over bus 520(*c*) and for PDestd over line 520(*d*); however line 520(*d*) is not used by block 55.

The three mux devices 511, 516, and 526 of FIG. 5B create the bypass logic required for intra-cycle data dependencies for the cases when a destination register of one uop of a given set is used as a source2 of a subsequent uop of the given set. The pointer value 51(*e*) supplied from block 50 points to the location where data is or will be stored corresponding to the source2 register of uop0 and since there are no uops previous to uop0 within a given set, that signal goes straight out of block 55 and becomes signal 56(*e*). Signal 56(*e*) represents the register pointer to the data associated with source2 for uop0 that will be used by the other portions of the microprocessor to execute and retire this uop. The next signal, signal 51(*f*), is fed to mux 511 and represents the register pointer associated with source2 for uop1 and is supplied by block 50. Signal 51(*f*) is a pointer either to the ROB or to the RRF. The PDesta pointer is also fed to mux 511 over bus 520(*a*). A select circuit 509 for controlling mux 511 receives the logical source2 value for uop1 (signal 41(*f*)) and also receives the logical destination value for uop0 via bus 42(*a*). A comparison circuit within 509 compares the signal over bus 42(*a*) to the signal over bus 41(*f*). If these values match, then the select logic 509 causes mux 511 to route the pointer value PDesta from bus 520(*a*) to bus 56(*f*), otherwise the mux 511 routes the signal from 51(*f*) to bus 56(*f*). If the values match, then the logical source2 for the uop1 is the same as the logical destination of the uop0 and the value output from block 55 for source2 should be the same as that assigned by the iRAT for the destination of uop0, which is PDesta.

The signal 51(*g*) from block 50 is fed to mux 516 of the present invention which represents the register pointer associated with source2 for uop2 and is a pointer either to the ROB or to the RRF. The PDesta and PDestb values are also fed to mux 516 over bus 520(*a*) and 520(*b*) respectively. A select circuit 514 for controlling mux 516 receives the logical source2 value for uop2 (signal 41(*g*)) and also receives the logical destination values for both uop0 and uop1 from bus 42(*a*) and 42(*b*), respectively. Select logic 514 contains a comparison circuit to compare bus 41(*g*) with 42(*a*) and another comparison circuit to compare bus 41(*g*) with 42(*b*). The above comparisons are done simultaneously. According to the select logic 514 for mux 516, if the logical source2 for uop2 (the signal over 41(*g*)) equals the logical destination for uop1 then the signal for PDestb is output over bus 56(*g*) irrespective of the logical destination of uop0. If the signal for 41(*g*) equals the logical destination for uop0 and the signal for 41(*g*) does not equal the logical destination for uop1, then the signal for PDesta is output over bus 56(*g*). If neither of the above is the case, then the signal frown bus 51(*g*) from block 50 is output over bus 56(*g*). The circuitry for this select logic 514 for mux 516 may be devised from a number of well known techniques according to the logical discussion above.

The signal 51(*h*) is fed to mux 526 of FIG. 5B from block 50 and represents the register pointer associated with source2 for uop3 and is a pointer either to the ROB or to the RRF. The PDesta, PDestb, and PDestc values are also fed to mux 526 over bus 520(*a*), 520(*b*), and 520(*c*), respectively. A select circuit 524 for controlling mux 526 receives the logical source2 value for uop3 (signal 41(*h*)) and also receives the logical destination values for uop0, uop1, and uop2 over buses 42(*a*), 42(*b*), and 42(*c*), respectively. The select circuit 524 contains three comparison circuits to simultaneously compare bus 41(*h*) to bus 42(*a*), bus 41(*h*) to bus 42(*b*) and bus 41(*h*) to bus 42(*c*). According to the select circuit 524 for mux 526, if the logical source2 for uop3 (the signal over 41(*h*)) equals the logical destination for uop2 then bus 56(*h*) outputs the PDestc pointer (from bus 520(*c*)) irrespective of the logical destinations of uop1 or uop0. If the signal over 41(*h*) equals the logical destination for uop1 and 41(*h*) does not equal the logical destination of uop2 and 41(*h*) does not equal the logical destination of uop0 then bus 56(*h*) outputs the PDestb pointer. If the signal over 41(*h*) equals the logical destination for uop0 and 41(*h*) does not equal either the logical destination for uop1 or the logical destination for uop2 then bus 56(*h*) outputs the PDesta pointer. If none of the above is the case, bus 56(*h*) outputs its signal from bus 51(*h*). The circuitry for this select logic 524 for mux 526 of the present invention may be devised from a number of well known techniques according to the above logical descriptions.

It is appreciated that within the select logic for the mux circuits of FIG. 5A and FIG. 5B the circuitry is configured such that a logical source such as ax will match a logical destination of the same register of a larger width, such as eax. That is, a logical source of smaller width will match a logical destination of larger width of the same logical register. Therefore al, ah, and ax as logical sources match to ax as a logical destination while al, ah, ax, and eax as logical sources match to eax as a logical destination. However, the reverse situation is not true. If a subsequent uop utilizes a source of a larger width register than a destination register of a preceding uop of the same set, a partial write RAT stall may occur. In addition, it is appreciated that an additional special matching condition on all source2's exists, in that regardless of the logical destination, a uop may also write the flags register. If source2 is the flags register, it must be overridden by a previous uop that writes flags which is signaled by a separate bus.

The following is an example of the bypass circuitry 55 of the present invention. Assume the allocator 80 generated PDesta, PDestb, PDestc, and PDestd. Assume also that no retirement overrides are implicated with respect to these sources.

|      |     | Src1   | Src2 | Dest |        |
|------|-----|--------|------|------|--------|
| uop0 | mov | ax, bx |      | ax   | PDesta |
| uop1 | add | ax, bx | ax   | ax   | PDestb |
| uop2 | add | ax, bx | ax   | ax   | PDestc |
| uop3 | add | ax, cx | ax   | ax   | PDestd |

The example above illustrates that PDcsta is assigned for the destination of uop0, PDestb for the destination of uop1, PDestc for the destination of uop2, and PDestd for the destination of uop3 by the allocator 80. The source1, bx, for uop0 (bus 56(a)) will output the iRAT physical register pointer output by the iRAT for the bx entry because them are no previous uops to consider. The logical source1, ax, of uop1 (bus 56(b)) will not output the iRAT physical register pointer for the ax entry because the logical destination of uop0 is also ax. The logical source1, ax, of uop1 is assigned PDesta and bus 56(b) will output the PDesta value. The logical source2 of uop1 (bx), bus 56(f), outputs the physical register pointer of the iRAT corresponding to the bx entry because there am no previous bx logical destinations used by uop0.

The logical source1, ax, of uop2, bus 56(c), does not take the iRAT physical register pointer for the ax entry because uop1 has a destination ax. The value assigned for source1 ax of uop2 is PDestb and this value is over bus 56(c), not PDesta because the uop1 takes priority over uop0. The source2 of uop2 (bx), bus 56(g), outputs the physical register pointer of the iRAT corresponding to the bx entry because there are no preceding bx destinations used by uop0 or by uop1. Lastly, the source1 ax of uop3, bus 56(d), does not take the iRAT pointer for the ax entry because uop2 has a logical destination ax. The value assigned for source1, ax, of uop3 is PDestc not PDesta nor PDestb because the uop2 takes priority over uop0 and uop1. The source2 of uop3 (cx), output over bus 56(h), outputs the physical register pointer of the iRAT corresponding to the bx entry because there are no preceding bx logical destinations used by uop0, by uop1 or uop2. The new PDest override block 55 output for the above example is presented below and represents the values that would be available over bus buses 56(a) through 56(h) as shown:

|      | Source1          | Source2          |
|------|------------------|------------------|
| uop0 | 56(a)=PDest of iRAT | 56(e)=n/a        |
| uop1 | 56(b)=PDesta     | 56(f)=PDest of iRAT |
| uop2 | 56(c)=PDestb     | 56(g)=PDest of iRAT |
| uop3 | 56(d)=PDestc     | 56(h)=PDest of iRAT |

It is appreciated that the output pointers 56(a) to 56(h) are sent to the ROB 60 and also to the reservation station 75. The uops of a given set are sent to the reservation station when the location of their respective source operands are known. Although the data for these source operands may not be ready as of the time these signals become asserted, at this time the location of where the data is to be placed will be known by the present invention. The assignments of the physical destinations for these registers will be discussed below with respect to the table write logic 65 of the present invention. Within the reservation station 75 the uops wait until their source data is ready and then the uops will be executed and eventually retired. When retired, the value of the destination PDest is returned from the ROB 60 to the retirement override logic and also the priority write block 65 (see FIG. 1) which will be used by a subsequent set of uops.

The above discussion is a complete discussion of the integer PDest override mechanism 55. Note, however, that a given uop set can be a mixture of both integer and floating point operations having integer and floating point registers. This does not pose a problem. It is quite naturally the case that only like-types of sources and destinations can override each other, i.e., integer to integer and floating point to floating point. For example, a floating point destination cannot override an integer source. Therefore, any difference in the floating point mechanism (as described below) can be processed independently of the integer PDest override mechanism 55.

Example Case.

Consider the following uops of a current set presented to the iRAT logic 10 for a given cycle:

| uop0: | mov eax to ecx |
| uop1: | mov ecx to ebx |

The below chart illustrates the state of the iRAT array before these two uops are processed:

|     | SZ | RRF | PSrc |
|-----|----|----|------|
| EAX | 11 | 0  | 21   |
| EBX | 11 | 0  | 18   |
| ECX | 11 | 1  | 02   |

The initial contents of the iRAT for entry EAX is PSrc 21 and for ECX is PSrc 02. The D logical sources and destinations are presented in time to be latched on the rising edge of the clock at the start of the current clock cycle. The iRAT array outputs are pre-charged high during the first clock phase and the logical sources are presented to the iRAT array 45 input. On the second clock phase, the contents of the array are output, around the same time that the allocator physical destinations (PDesta=22 and PDestb=23) become available. Finally, the array outputs pass through the override logic 55 to determine intra-cycle dependencies. Uop0 is never overridden, as it is the first of the current uops. However, uop1 uses uop0's result (ecx) as a source. Therefore, uop1's source for cx (PSrc 02) is overridden by the allocator PDest for uop0 (PDest 22). The renamed sources are available over buses 56(a) and 56(b) late in the clock cycle. The below chart illustrates the output of the new PDests override circuitry for the given source registers after these two uops are processed by the override and priority write logic of the present invention:

|     | SZ | RRF | PSrc |           |
|-----|----|----|------|-----------|
| EAX | 11 | 0  | 21   |           |
| ECX | 11 | 0  | 22   | ;Override |

Priority Write Logic 65

The mechanism of the present invention that updates the entries of the iRAT array 45 is the priority write logic block

65. This functions during the second half of the clock cycle during period 230 (as shown in FIG. 2). This block 65 retrieves the PDests allocated by allocator 80 (PDesta, PDestb, PDestc, and PDestd) and will place all or some into the entries of the iRAT array 45 that correspond to the logical destination registers of the current set of uops.

Figure 6:
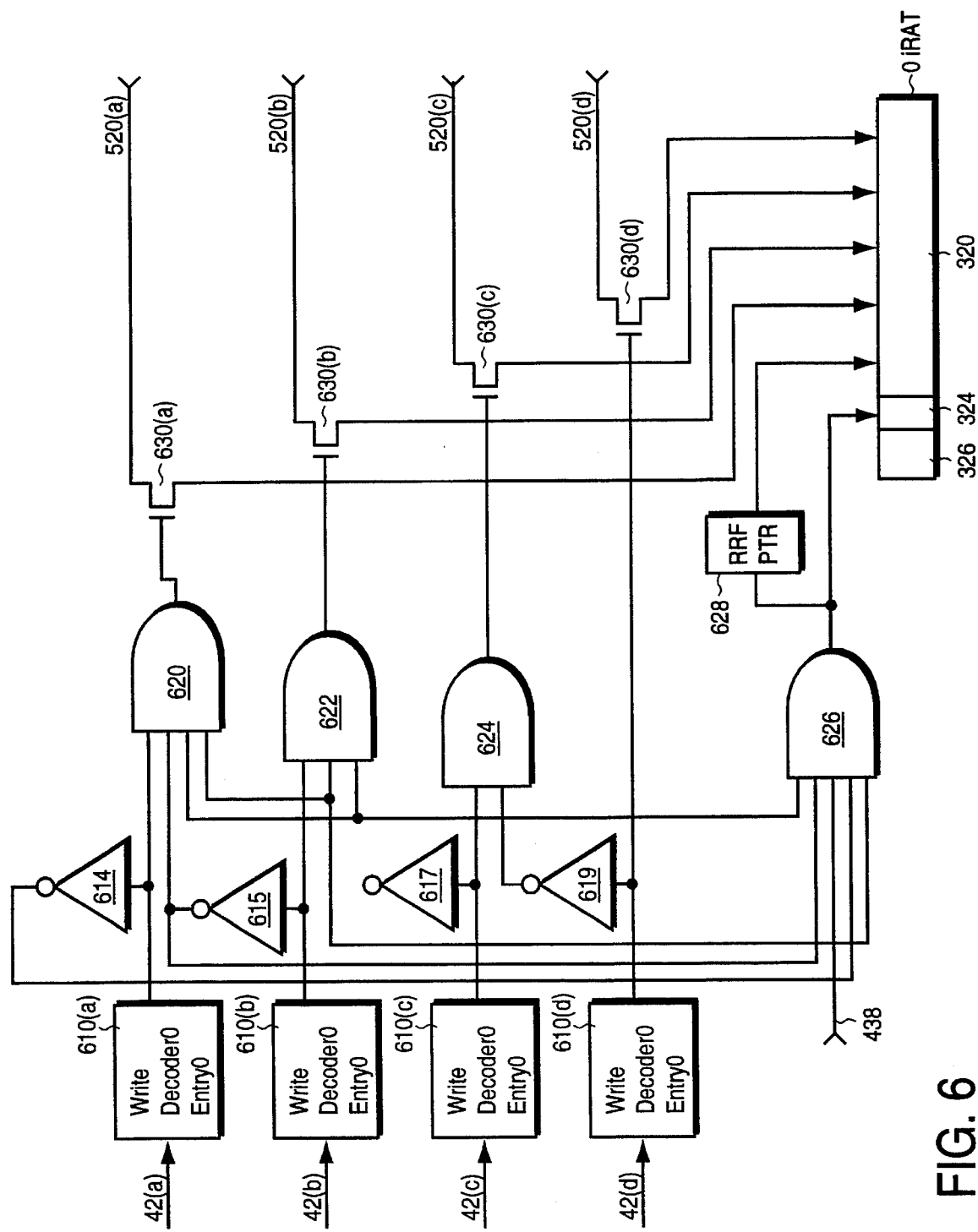
FIG. 6 illustrates the priority write logic utilized by the present invention to write the PDests supplied by the allocator into the proper entries of the iRAT array according to possible logical destination conflicts between uops of the current set.

The priority write logic 65 of the present invention is illustrated for entry 0 of the iRAT with reference to FIG. 6. The priority write logic performs the iRAT array update function by assigning allocated PDests to their appropriate entry within the iRAT corresponding to the appropriate logical destination register. Because of intra-cycle logical destination conflicts, the priority write logic must determine which allocated PDest to assign to which entry of the iRAT. Further, information regarding retiring operands supplied from the ROB must also be updated into the iRAT so that appropriate entries of the iRAT point to the RRF 90 instead of the ROB 60. For write operations that target the same entry of the iRAT, the priority write logic adopts the following priority scheme from highest priority write to lowest priority: current uop's physical destination, current uop2's physical destination, current uop1's physical destination, current uop0's physical destination and lastly, any of the retiring uops' PDests. FIG. 6 illustrates the portion of the priority write logic for a particular entry of the iRAT for clarity. It is appreciated that this logic is replicated for each separate entry of the iRAT.

The priority logic for the integer mechanism of the present invention deals with the problem of several uops having the same logical destination register. For example:

|  |  |  | LSource1 | LSource2 | LDest | PDest |
|---|---|---|---|---|---|---|
| uop0 | add | ax, bx | ax | bx | ax | PDesta |
| uop1 | add | ax, bx | ax | bx | ax | PDestb |
| uop2 | inc | ax | ax |  | ax | PDestc |

As shown above, each uop has the register ax as the logical destination. A separate PDest pointer is assigned for each uop and they are located on the far right column. The write operations into the iRAT must occur simultaneously for all uops. Therefore, the priority write logic of the present invention must accomplish in parallel that which would have been accomplished if each destination was written sequentially. For instance, the iRAT logic 10 for each logical destination, must assign a PDest supplied from the allocator. This is the renaming (or writeback) process wherein logical destination array entries are written with physical destination registers of the ROB ("PDests"). However, if more than one uop within a set targets the same logical destination register, the entry in the iRAT for that logical destination register would receive more than one PDest writeback. Since the uops of a given set are supplied to the iRAT in sequential order, the last received uop (of program code order) has highest priority to write to the iRAT and should be the uop used for writeback to a particular logical destination if two or more uop conflict. Consider the example above, if processed sequentially, uop0 would rename the ax entry to PDesta, then uop1 would rename the ax entry to PDestb, and finally, uop2 would rename the entry to PDestc. The iRAT always points to the latest location for a given logical register. Thus, into the iRAT array entry for the ax logical register.

The present invention priority write logic must perform the above in parallel therefore a priority scheme is adopted and used. For the integer case, the priority write logic is closely associated with the write decoders of the iRAT array 45 and may be considered, in effect, a part of the iRAT array 45. FIG. 6 illustrates the priority logic associated with the 0 entry of the iRAT. Input to the priority write logic are four pointers over buses 42(*a*)–42(*d*) which represent the logical destinations of the four uops of a given set for uop0–uop3, respectively. Each pointer is fed into a separate decoder 610(*a*)–610(*d*) respectively. The decoder is programmed to output an asserted signal if the input logical destination pointer matches the pointer associated with the logical register of the zero entry (which is eax, ax, and ah in this discussion). Since the processing for uops of a set is done simultaneously and since all four possible uops of the current set may each address the same logical destination register, there needs to be four separate decoders for each iRAT entry (610(*a*)–610(*d*)). Also input is the match signal 438 that was generated during the first half clock cycle of the iRAT process that correspond to entry zero of the iRAT and when asserted indicates that one of the retiring PDests matches entry zero.

The iRAT array is a multi-ported RAM having multiple write ports for each entry. The priority write logic will determine, for each entry, the proper source of data to route to the entry, if any. The write port logic for entry zero of the iRAT array is shown. Therefore, also supplied to the ports of each entry of the iRAT are the values of the allocated PDests that originate from the allocator 80 of the present invention. PDesta arrives over bus 520(*a*), PDestb over bus 520(*b*), PDestc over bus 520(*c*) and PDestd over bus 520(*d*). The RRF pointer value is generated from unit 628. As discussed, the priority logic will determine which PDest pointer will be loaded into the associated entry of the iRAT, if any.

Refer still to FIG. 6. Since uop3 is the last received uop of a given set, it has the highest priority write of the set. Therefore, if bus 42(*d*) (the logical destination for uop3) indicates entry zero for its write operation then decoder 610(*d*) will assert and the write port 630(*d*) for uop3 will open and PDestd will be written into the column 320 for the zero entry of the iRAT array 45. Only one of the four ports 610(*a*)–610(*d*) can be open for any given set at a time for any given entry. If uop3 has priority then all other write operations to entry zero of all other uops are overridden. If bus 42(*c*) (the logical destination for uop2) indicates entry zero for its write operation then decoder 610(*c*) will assert and this will cause port 630(*c*) to open only if the output of inverter 619 is high which means that decoder 610(*d*) is also not asserted; port 630(*c*) is open via the output of AND gate 624. When port 630(*c*) is open, the pointer PDestc will be loaded into the zero entry of the iRAT array. Therefore, the destination of uop2 takes priority only when the destination for uop3 is not asserted. If uop2 has priority then all other write operations to entry zero of uop0 and uop1 are overridden.

Refer still to FIG. 6. If bus 42(*b*) (the logical destination for uop1) indicates the zero entry then decoder 610(*b*) will become asserted. However, the port 630(*b*) will not open if either of uop3 or uop2 targeted the zero entry. The outputs of inverters 617 and 619 are fed into the AND gate 622 along with the decoder output from decoder 610(*b*). When port 630(*b*) opens, the pointer for PDestb is loaded into entry zero of the iRAT 45. This will happen only if bus 42(*b*) indicates entry zero and bus 42(*c*) and 42(*d*) do not. If uop1 has priority then a write operation to entry zero of uop0 will be overridden. If bus 42(*a*) (the logical destination for uop0) indicates the zero entry then decoder 610(*a*) will become asserted. However, the port 630(*a*) will not open if either of uop3, uop2, or uop1 targeted the zero entry. The outputs of inverter 617, 619 and 615 are fed into the AND gate 620 along with the decoder output frown decoder 610(*a*). Port 630(*a*) will open to load the zero entry of the iRAT with PDesta pointer only if uop0 is the only uop to target entry zero of the iRAT with its logical destination. Uop0 does not override any other uop write operation.

The priority write logic also updates the entries of the iRAT array 45 to indicate that certain entries of the iRAT array retired and the data is therefore available in the RRF 90. If none of the uops of the given set target entry zero of the iRAT, then the retirement reset circuit may reset the entry if that entry retired; this is the last priority. The signal 438 was generated at the first half of the iRAT clock cycle and its indicates that one of the uops that retired during this clock cycle contained a destination operand (PDest) that matched the PDest of the zero entry. In such a case, the zero entry must be reset to indicate that the data for the zero entry is now located in the RRF and not in the ROB. However, this reset function is only allowed assuming another uop of the given set does not use a logical destination that targets the zero entry of the iRAT. The AND gate 626 receives input from inverters 614, 615, 617, and 619. When all of these inputs are high then no uop of the given set has a logical destination register that targets the zero entry of the iRAT (i.e., eax, ax, and ah). If line 438 is also asserted, then the RRF pointer register 628 will output a pointer indicating the location of the eax register for the RRF 90. This pointer is then loaded into the iRAT zero entry at column 320. Also, the RRF valid bit 324 for the zero entry is also set to indicate the data for entry zero is now located in the RRF 90 and not the ROB 60. It is appreciated that an RRF valid bit for a particular entry of the iRAT will only be set if the PDest associated with that entry also is a retiring PDest within the same clock cycle. Therefore, the priority write logic sets each RRF valid bit for each retiring PDest located in an iRAT array entry, as long as that entry is not currently being written to by the other logic of the priority write function for the current uop set.

It is appreciated that after a particular PDest from the allocator 80 has been assigned to a logical register and written into the entry of the iRAT corresponding to that logical register, the logical register designation for which the physical register corresponds is also forwarded to the ROB 60 and is written into a ROB entry associated with the PDest. This is done so that at retirement the PDest entry will know which register of the RRF 90 to update.

Although shown for entry zero, the logic of FIG. 6 is replicated for each and every entry of the iRAT array 45. As discussed above there are 12 separate entries in the sample iRAT array 45. Also as discussed above, there are 12 unique match lines generated for the iRAT array, one for each entry. Each entry of the iRAT contains four separate write decoder blocks. Each match line of each entry and the outputs of the decoders for each entry are fed to the write priority logic for each iRAT entry. The values for PDesta over line 520(*a*), PDestb over line 520(*b*), PDestc over line 520(*c*), and PDestd over line 520(*d*) are common to all of the priority write logic blocks for each iRAT entry. Since each iRAT entry has five write ports they will individually allow any of the four PDests or the reset value to be written into them according to the outcome of the priority logic of the associated entry. The present invention will utilize the above logic to perform four priority write operations into the iRAT array simultaneously during the clock cycle time allotted.

Allocator 80 Stalls

If the reservation station 75 or the ROB 60 are full, the allocator 80 will be unable to provide enough PDests to satisfy the current set of uops. When this table overflow condition occurs, the allocator 80 must stall the iRAT logic 10 until the ROB or reservation station releases the required set of resources. This stall will cause the iRAT logic 10 to clear all current uops' outgoing valid bits and cease the acceptance of new uops from the fetch and decode unit 50. While a uop's valid bit is reset, the iRAT logic 10 will not process the uop. When the valid bits are cleared for the current set of uops, then their iRAT processing will proceed. When enough uops retire to allow the allocator 80 to allocate enough PDests, the stall is released. The uop valid bits are restored and the in-order uop issue continues.

Integer Recovery from Misprediction

When the front end of the microprocessor discovers that the branch target buffer mispredicted a program pathway, the microprocessor generates a clear signal which informs the iRAT logic 10 that any speculative data it processed must be discarded. Upon receiving the clear signal, the iRAT logic 10 ceases from actively processing the uops associated with the speculative program code. The microprocessor then allows all instructions along the proper pathway to retire in order to update the RRF array 90. In other words, all instructions previous to the mispredicted branch instruction are allowed to retire in order to update the RRF array 90. Once the RRF array 90 is updated with all properly retired instructions, the iRAT logic 10 is instructed to point to the RRF for all integer entries. In an alternative embodiment, the iRAT logic 10 then copies the data of the RRF array 90 into the corresponding entries of the iRAT array 45. After the RRF array 90 entries are copied into the iRAT array 45, for the alternative embodiment, the present invention sets all RRF valid bits of the iRAT array 45 to designate the RRF array entries as the data locations for all integer registers. The microprocessor then begins reading and decoding instructions along the proper program pathway and the iRAT logic 10 again operates normally to rename the logical integer registers to physical integer registers. By copying the RRF data into the iRAT array, the present invention is able to effectively purge the speculative data from the iRAT array 45.

iRAT Summary of Operation

Figure 7:
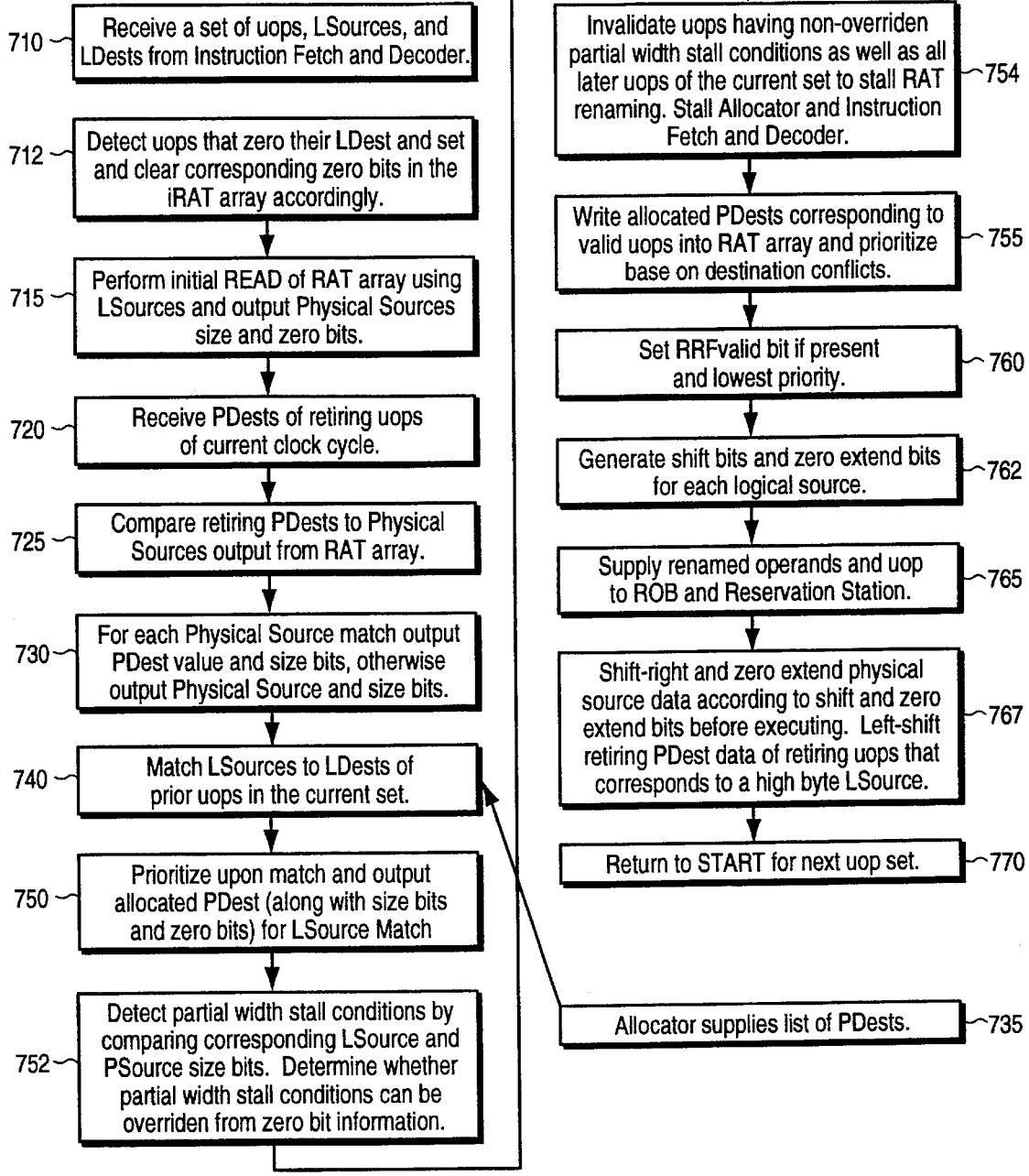
FIG. 7 represents a flow chart of major processing tasks of the iRAT logic of the present invention.

The major processing tasks 700 of the present invention iRAT logic 10 is illustrated in the flow chart of FIG. 7 and is summarized with respect to a current clock cycle and current set of uops. At block 710 the current clock cycle begins. Also in block 7 10 at the start of the first half of the clock cycle four uops of a current set are presented to the iRAT array from the instruction fetch and decode unit 40. Also during block 710 four logical destination registers are supplied to the iRAT logic 10. During block 712 uops that zero their logical destination register are detected by the idiom recognizer 53. The idiom recognizer generates signals to set and clear the corresponding zero bits in the iRAT array 45. At block 715, the eight logical sources are used to initially read the entries of the iRAT array 45 and eight physical source registers are output from the array in response. At block 720, early in the current clock cycle, the ROB 60 supplies a list of the PDests associated with the retiring set of uops. Still during the first half clock cycle, the retirement override logic 50 is performed at blocks 725 and 730. The iRAT logic compares the four retiring PDests associated with a retiring set of uops, that retires within the current clock cycle, against the physical register entries of the iRAT at block 725. For each match to a physical entry, the present invention iRAT logic then compares if this matched entry was also read by the set of uops during the initial read operation. If a matched entry was also read by a given uop and source value, then the present invention outputs the reset value of the corresponding iRAT array entry (along with size bits), instead of the iRAT physical source entry; this occurs at block 730. At this point there are eight output buses and each bus carries a pointer associated with each logical source register of the current uop set. Individual output buses, 51(*a*)–51(*h*), either indicate a register location within the ROB or within the RRF for each logical source of the current uop set.

Referring still to FIG. 7, the output buses, 51(*a*)–51(*h*), are then fed to the new PDest override logic 55 which functions during the second half of the current clock cycle during the same time as a portion of the priority write logic (described below). The new PDest override logic is represented by blocks 740 and 750. The second half of the current clock cycle begins at the start of block 740. The new PDest override logic 55 examines the logical sources for uop1–uop3 and compares them against the logical destinations for uops that came previously in order within the given uop set at block 740. The new PDest override logic also receives a list of the new PDest pointers supplied by the allocator 80 from block 735. If a match is found between a logical source value and an earlier logical destination then there is an intra-cycle data dependency; the new PDest override logic will output one of the newly received PDest values for the matched logical source register instead of outputting the pointer that was received from bus 51; this occurs at block 740 using the PDest data from block 735. The new PDest override logic outputs eight individual buses over 56(*a*)–56(*h*). These signals are fed to the ROB and also to the reservation station and indicate the true locations within the ROB or the RRF where the data will be placed for each renamed logical source of the current set. Each of the eight buses 56(*a*)–56(*h*) carries a pointer to a physical source register, size bits indicating the size of the physical source register, and zero bits.

During blocks 752 and 754 partial width stall conditions are detected and overridden if possible. At block 752 the sizes of the logical source registers and corresponding physical source registers (after overrides) are compared to determine if any partial width stall conditions (size mismatches) exist for the current set of uops. A partial width stall condition is overridden if the appropriate size bits indicate that the "missing" portion of the corresponding register contains zeros. At block 754 the valid bits of uops having non-overridden partial width stall conditions, as well as all subsequent uops of the current set, are set to invalid to prevent iRAT renaming of those uops. In addition, the allocator 80 and instruction fetch and decode unit 40 are stalled to prevent new uops from being presented to the iRAT 45 for renaming until the stall condition is removed.

Also during the second half of the current clock cycle, the priority write logic 65 is performed during blocks 755 and 760. The priority write logic 65 receives four PDests from the allocator 80 for writing into the iRAT array for the four logical destination registers of the current set; there is one PDest for each logical register. The priority write logic examines the four logical destinations of the current set to determine if there are logical destination conflicts between uops. The highest priority (i.e., the last in order) will write its PDest into the logical register entry of the iRAT; this is performed by block 755. If there are not intra-cycle logical destination conflicts then all four PDests will be written into different locations of the iRAT. However, only PDests corresponding to valid uops will be written into the iRAT. In other words, if a uops valid bit is set to invalid a PDest will not be written into the iRAT for that uop. For a particular iRAT entry, if no logical source writes to the location by block 755 and the physical register pointer within that location also retired, then the present invention sets the RRF valid bit and points to the RRF 90 for that entry; this is done by block 760.

At block 762, shift bits and zero extend bits (for right-adjusting) are generated for each logical source by determining whether each logical source is a high byte register and whether the corresponding high bank size bits indicate a size greater than eight (i.e., that the required data needs to be right-adjusted). The information corresponding each PDest to a particular logical destination of a uop along with size, shift, and zero extend bits are then transferred to the ROB 60 and reservation station 75 as well as the renamed source information at the end of the clock cycle; this is done by block 765. It is appreciated for each used physical register of the ROB 60 the corresponding logical register represented by the physical register is also recorded for retirement use.

When the source data required to execute a particular uop is present within the identified physical register sources, the uop may be executed by execution units of the microprocessor. At block 767 the physical source data of the uops selected for execution are right-shifted and zero-extended according to their shift and zero extend bits stored in the reservation station. This is done because the execution unit assumes right-adjusted input data. After execution, the result data will be placed in the physical destination registers (in the ROB) associated with the executed uops. Upon retirement of a uop, the high byte detector determines whether the retiring uop's logical destination is a high byte register. If so, the data from the physical destination register in the ROB is left-shifted to the high byte position before being stored (or retired) into the RRF. The retired uop is then forwarded among other places, to the iRAT logic 10 where the retirement override and priority write logic utilize the retirement data. If the PDest of the retiring register is still present in the iRAT, then its RRF valid bit will be set so that subsequent uops will access the RRF for the data.

At block 770, a new clock cycle bring new uops for processing from the instruction fetch and decode unit 40 and also a new set of retiring uops. The process 700 is then repeated by returning to block 710. It is appreciated that if the allocator 80 does not have enough free PDests, block 735 may cause process 700 of the present invention to stall. It is appreciated that within any given cycle the microprocessor may generate a clear signal indicating a branch misprediction. According to the above flow, when the clear signal is detected the present invention waits until all instructions previous to the mispredicted branch retire. The physical source pointers of the iRAT array are reset to point to their corresponding RRF entries and all RRF valid bits of the iRAT array are set to designate the RRF 90.

Maximum Uops of the Current Set

As discussed above, the maximum number of uops processed by the iRAT logic of the present invention for a given clock cycle is four. However, according to the description and circuitry as described above, the present invention may be implemented in an embodiment that processes a maximum of three uops for a given set. Such an embodiment would allow a reduction in the amount of logic required to realize the iRAT logic 10. Similar embodiments of the present invention may be realized according to this disclosure for executing a maximum of two uops within a current set. The disclosure of the present invention may be extended to cover embodiments where more than four uops may be executed within a given clock cycle. Specifically, one skilled in the art can extend the logic disclosed herein to realize an embodiment of the present invention that may process a maximum of five or more uops per clock cycle. All such embodiments are considered within the scope and spirit of the present invention.

Microprocessor

The iRAT logic 10 of the present invention is implemented within a superscalar pipelined microprocessor. By increasing the size of the effective register set and by eliminating false data dependencies from program code, a high performance microprocessor 101 having increased execution throughput may be constructed utilizing the present invention RAT units. An example microprocessor 101 of the present invention is illustrated with respect to FIG. 8. It is appreciated that the present invention RAT units may operate advantageously within a number of well known superscalar microprocessor architectures. Therefore, the present invention should not be considered limited to a particular microprocessor architecture as a result of the following discussion.

Figure 9:
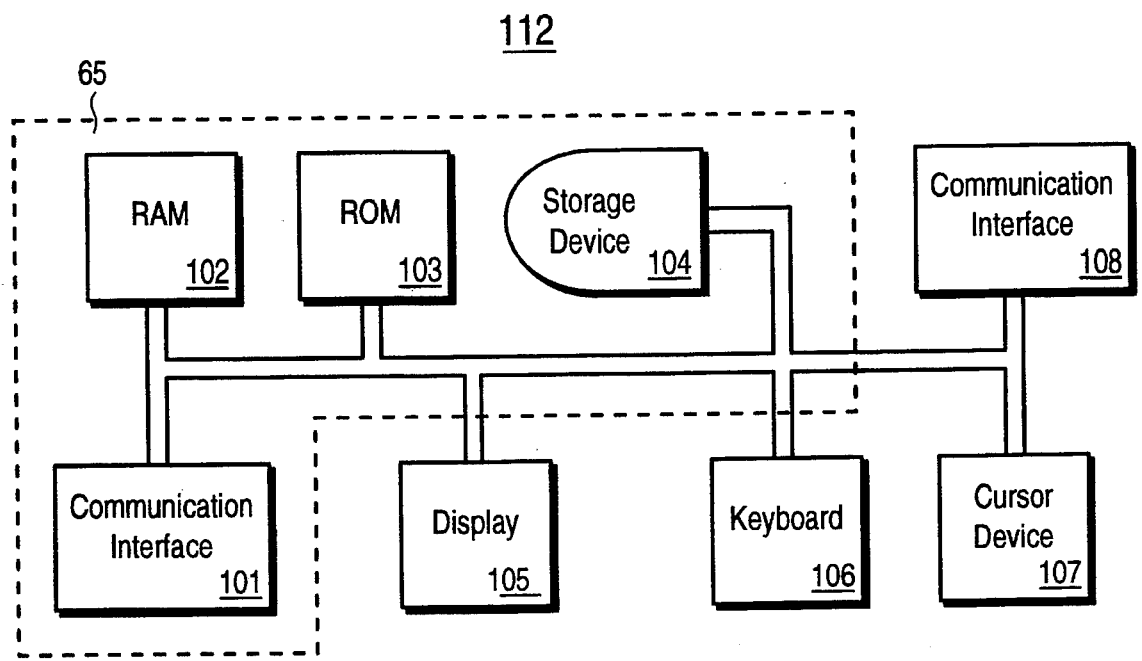
FIG. 9 is an illustration of a general purpose computer system utilizing a high performance processor of the present invention.

FIG. 8 illustrates major component blocks of a microprocessor 101 of the present invention. Instructions to be executed and data for processing are supplied (via a RAM and ROM of FIG. 9) over line 100 to a bus interface unit or BIU 1305 which may or may not contain a data cache and instruction cache unit. Instructions are fed to the fetch and decode unit 40 which decodes the instructions and fetches them from the RAM in program code order. Since the microprocessor is superscalar, several instructions may be processed simultaneously. The unit 40 also arranges the logical sources and logical destinations for a current set of instructions. The fetch and decode unit 40 is coupled to the iRAT logic 10. Instructions interpreted by the fetch and decode unit 40 are based on a logical set of registers as sources and destinations. This logical set is typically of a limited size. A branch target buffer (BTB) 1350 is utilized by the microprocessor for branch prediction. The BTB 1350 may contain data indicating a program pathway actually taken in response to an individual branch instruction. The BTB uses this information for predicting the pathway to take when encountering the branch again, however, other algorithms may also be used. When it is detected that the front end of the microprocessor mispredicted a branch, the microprocessor asserts a clear signal and the speculative data from the mispredicted code is purged front the system and the iRAT array 45 and the fRAT array 800 are reset. The fetch and decode unit 40 and the BTB, as well as other components, may be collectively called an instruction fetch cluster.

The iRAT unit 10 renames the logical registers into a larger set of physical registers that are used by the execution units 1315 and 1310. After the execution units are complete, the data stored in the physical destination registers will become transformed back into logical registers when placed into the retirement register file 90 which is located within the retirement block 1320. The iRAT logic 10 and fRAT logic 895 are both coupled to a reorder buffer (ROB) which holds the physical registers and also to a reservation station 75. Once the operands for a given uop have been properly renamed to physical registers, the uop is placed into the reservation station 75. The reservation station 75 will then dispatch a particular uop to an appropriate execution unit (i.e., integer execution unit 1315 or floating point execution unit 1310) when the uop is ready to execute and when an execution unit is available for use. It is appreciated that the microprocessor 101 does not necessarily execute uops in program code order, however, executed uops are retired in program code order. Once a uop has retired, the data is written into an appropriate entry of the retirement register file 90 (within the retirement unit 1320). Also at retirement, the retirement unit 1320 informs the ROB 60 that certain physical registers are no longer being used. The ROB 60 is then read by an allocator which determines the free physical registers for use in the renaming of other logical registers. Also during retirement, the RAT logic units are informed of physical register retirement so that particular entries within the iRAT 45 array can be updated. Processed data may then be fed back via bus 100 out of the microprocessor.

The iRAT logic 10 and the additional functions logic 70 for detecting and generating partial width stalls are illustrated. A memory cluster unit 1322 is also supplied to perform memory interface functions. It is appreciated that superscalar and pipelined microprocessors are well known in the art and may be advantageously utilized in conjunction with the iRAT logic 10 of the present invention.

Computer System

The high performance microprocessor 101 of the present invention may be added to a general purpose computer system in order to increase processing speed of the computer system. Generally, the computer system 112 of the present invention of FIG. 9 comprises a bus 100 for communicating information, a central processor 101 coupled with the bus for processing information (such as image data and acquired counts) and command instructions, a random access memory 102 coupled with the bus 100 for storing information and instructions for the central processor 101, a read only memory 103 coupled with the bus 100 for storing static information and command instructions for the processor 101. Also available for interface with the computer system 112 of the present invention is a data storage device 104 such as a magnetic disk or optical disk drive which may be communicatively coupled with the bus 100 for storing information and command instructions.

The display device 105 utilized with the computer system of the present invention may be a liquid crystal device, cathode ray tube, or other display device suitable for creating graphic images and alphanumeric characters recognizable to the user. The computer system 112 may also contain an alphanumeric input device 106 including alphanumeric and function keys coupled to the bus 100 for communicating information and command selections to the central processor 101 (such as an input target source address), a cursor control device 107 coupled to the bus for communicating user input information and command selections to the central processor 101 based on a user's hand movement. The cursor control device 107 allowing the network user to dynamically signal the two dimensional movement of a visible symbol (pointer) on a display screen of the display device 105 which may be used to select a particular station as a target address. Many implementations of the cursor control device are known in the art including a trackball, mouse, joystick or special keys on the alphanumeric input device 105 capable of signaling movement of a given direction or manner of displacement.

The computer system 112 also contains an input and output device 108 coupled to the bus 100 for communicating information to and from the computer system. The communication device 108 may be composed of a serial or parallel communication port or may be a communication modem. It is appreciated that such communication device 108 may provide an interface between the bus 100 and the user interface devices (keyboard 106, cursor 107, display 105) of the computer system. In this case, the user interface devices will reside within a terminal device this is coupled to the communication device 108 so that the processor 101, the RAM 102, the ROM 103 and the storage device 104 may communicate to the terminal and vice-versa. Components 101, 102, 103, 104, may be implemented on a single board or computer chassis 65 which is then coupled, via bus 100, the other components of the computer system, such as units 105, 106, 107 and 108.

The preferred embodiment of the present invention, an apparatus and method for recognizing idioms to allow overriding of partial width stall conditions of a register alias table unit (RAT) within a microprocessor is described. While the present invention has been described in particular embodiments, it should be appreciated that the present invention should not be construed as limited by such embodiments, but rather construed according to the below claims.

What is claimed is:

1. In a mechanism for renaming a current set of logical registers to a current set of physical registers of an extended register set, said current set of logical registers being associated with a current set of operations, an apparatus for selectively overriding partial width stalls of said renaming mechanism, said apparatus comprising:

array means for renaming said current set of logical registers to said current set of physical registers, wherein said logical registers and said physical registers have partial width registers, wherein said logical registers have logical register sizes and said physical registers have physical register sizes, wherein each of said physical registers has a corresponding set of zero bits for indicating whether predetermined portions of said logical registers contain zeros;

size comparison means, coupled to said array means, for comparing said logical register sizes to said physical register sizes;

partial width stall means, coupled to said size comparison means and said array means, for stalling renaming of a first logical register by said array means when said first logical register is of larger size than a corresponding first partial width register to which said first logical register would otherwise be renamed by said array means, said first logical register being one of said current set of logical registers, said first partial width register being part of a first physical register, said first physical register being one of said current set of physical registers, wherein said first logical register has a first and second contiguous portions, said first partial width register corresponds to said first contiguous portion, said first physical register has a third portion contiguous with said first partial width register, and said third portion corresponds to said second portion; and partial width stall override means, coupled to said partial width stall means, for overriding said stalling of said array means when a first set of zero bits corresponding to said first logical register indicates that said second contiguous portion of said first logical register contains zeros.

2. The apparatus of claim 1 further comprising:

zero extension means, coupled to said array means and said physical registers, for zeroing said third contiguous portion of said first physical register when said first set of zero bits indicates that said second contiguous portion of said first logical register contains zeros.

3. The apparatus of claim 2 further comprising:

idiom recognizer means, coupled to said array means, for detecting operations that zero either all or partial widths of said logical registers and setting and clearing said zero bits to indicate which portions of said logical registers contain zeros.

4. The apparatus of claim 3 further comprising:

invalidating means, coupled to said array means and said partial width stall means, for selectively setting to an invalid state a current set of valid bits associated with said logical registers in response to said partial width stall means, said array means only renaming individual logical registers of the current set of logical registers whose associated valid bits are in a valid state.

5. The apparatus of claim 4 wherein operations of said current set of operations are issued simultaneously but maintain program code order and wherein said array means renames said current set of logical registers simultaneously.

6. The apparatus of claim 5 wherein said current set of logical registers are integer registers.

7. The apparatus of claim 6 wherein said array means also for independently renaming high byte and low byte partial widths of said logical registers.

8. In a mechanism for renaming a current set of logical registers to a current set of physical registers of an extended register set, said current set of logical registers being associated with a current set of operations, an apparatus for selectively overriding partial width stalls of said renaming mechanism, said apparatus comprising:

low bank array means for renaming said logical registers that are either low byte logical registers or logical registers that are larger than byte size, said low bank array means also for providing a low bank physical register size and a low bank zero bit for each of said physical registers, wherein said logical registers have logical register sizes and said low bank zero bits for indicating whether a most significant portion of said logical registers contains zeros;

high bank array means, coupled to said low bank array means, for renaming said logical registers that are high byte logical registers to said physical registers, said high bank array means also for providing a high bank physical register size and a high bank zero bit for each of said physical registers, wherein said high bank zero bits for indicating whether a high byte of said logical registers contain zeros;

size comparison means, coupled to said high bank array means and said low bank array means, for comparing said logical register sizes to said high bank physical register sizes and said low bank physical register sizes;

partial width stall means, coupled to said size comparison means, said high bank array means, and said low bank array means, for stalling renaming of a first logical register by said low bank array means when a first logical register size is larger than either a first high bank physical register size or a first low bank physical register size, wherein the smaller of said first high bank physical register size and said first low bank physical register size corresponds to a first partial width register to which said first logical register would otherwise be renamed, said first logical register being one of said current set of logical registers, said first partial width register being part of a first physical register, said first physical register being one of said current set of physical registers, wherein said first logical register has a first and second contiguous portions, said first partial width register corresponds to said first contiguous portion, said first physical register has a third portion contiguous with said first partial width register, and said third portion corresponds to said second portion; and partial width stall override means, coupled to said partial width stall means, for overriding said stalling of said array means when a first set of zero bits corresponding to said first logical register indicates that said second contiguous portion of said first logical register contains zeros.

9. The apparatus of claim 8 further comprising:

zero extension means, coupled to said high bank and low bank array means and said physical registers, for zeroing said third contiguous portion of said first physical register when said first set of zero bits indicates that said second contiguous portion of said first logical register contains zeros.

10. The apparatus of claim 9 further comprising:

idiom recognizer means, coupled to said array means, for detecting operations that zero either all or partial widths of said logical registers and setting and clearing said zero bits to indicate which portions of said logical registers contain zeros.

11. The apparatus of claim 10 further comprising:

invalidating means, coupled to said high bank array means, said low bank array means, and said partial width stall means, for selectively setting to an invalid state a current set of valid bits associated with said logical registers in response to said partial width stall means, said high bank array means and said low bank array means only renaming individual logical registers of said current set of logical registers whose associated valid bits are in a valid state.

12. The apparatus of claim 11 wherein operations of said current set of operations are issued simultaneously but maintain program code order and wherein said high bank array means and said low bank array means rename said current set of logical registers simultaneously.

13. The apparatus of claim 12 wherein said current set of logical registers are integer registers.

14. In a mechanism for renaming a current set of logical registers to a current set of physical registers of an extended register set, said current set of logical registers being associated with a current set of operations, an apparatus for selectively overriding partial width stalls of said renaming mechanism, said apparatus comprising:

an array for renaming said current set of logical registers to said current set of physical registers by storing rename values corresponding to said physical registers in array locations associated with said logical registers, wherein said logical registers and said physical registers have partial width registers, wherein said logical registers have logical register sizes and said physical registers have physical register sizes, wherein each of said physical registers has a corresponding set of zero bits for indicating whether predetermined portions of said logical registers contain zeros;

a size comparator, coupled to said array, for comparing said logical register sizes to said physical register sizes;

a partial width stall detector, coupled to said size comparator and said array, for stalling renaming of a first logical register by said array when said first logical register is of larger size than a corresponding first partial width register to which said first logical register would otherwise be renamed by said array, said first logical register being one of said current set of logical registers, said first partial width register being part of a first physical register, said first physical register being one of said current set of physical registers, wherein said first logical register has a first and second contiguous portions, said first partial width register corresponds to said first contiguous portion, said first physical register has a third portion contiguous with said first partial width register, and said third portion corresponds to said second portion; and a partial width stall overrider, coupled to said partial width stall detector, for overriding said stalling of said array when a first set of zero bits corresponding to said first logical register indicates that said second contiguous portion contains of said first logical register zeros.

15. The apparatus of claim 14 further comprising:

a zero extender, coupled to said array and said physical registers, for zeroing said third contiguous portion of said first physical register when said first set of zero bits indicates that said second contiguous portion of said first logical register contains zeros.

16. The apparatus of claim 15 further comprising:

an idiom recognizer, coupled to said array, for detecting operations that zero either all or partial widths of said logical registers and setting and clearing said zero bits to indicate which portions of said logical registers contain zeros.

17. The apparatus of claim 16 further comprising:

an invalidating circuit, coupled to said array and said partial width stall detector, for selectively setting to an invalid state a current set of valid bits associated with said logical registers in response to said partial width stall detector, said array only renaming individual logical registers of the current set of logical registers whose associated valid bits are in a valid state.

18. The apparatus of claim 17 wherein operations of said current set of operations are issued simultaneously but maintain program code order and wherein said array means renames said current set of logical registers simultaneously.

19. The apparatus of claim 18 wherein said current set of logical registers are integer registers.

20. The apparatus of claim 19 wherein said array also for independently renaming high byte and low byte partial widths of said logical registers.

21. In a mechanism for renaming a current set of logical registers to a current set of physical registers of an extended register set, said current set of logical registers being associated with a current set of operations, an apparatus for selectively overriding partial width stalls of said renaming mechanism, said apparatus comprising:

a low bank array for renaming said logical registers that are either low byte logical registers or logical registers that are larger than byte size, said low bank array renaming by storing rename values corresponding to said physical registers in low bank array locations associated with said logical registers, said low bank array also for providing a low bank physical register size and a low bank zero bit for each of said physical registers, wherein said logical registers have logical register sizes and said low bank zero bits for indicating whether a most significant portion of said logical registers contains zeros;

a high bank array, coupled to said low bank array, for renaming said logical registers that are high byte logical registers to said physical registers, said high bank array renaming by storing rename values corresponding to said physical registers in high bank array locations associated with said high byte logical registers, said high bank array also for providing a high bank physical register size and a high bank zero bit for each of said physical registers, wherein said high bank zero bits for indicating whether a high byte of said logical registers contain zeros;

a size comparator, coupled to said high bank array and said low bank array, for comparing said logical register sizes to said high bank physical register sizes and said low bank physical register sizes;

a partial width stall detector, coupled to said size comparator, said high bank array, and said low bank array, for stalling renaming of a first logical register by said low bank array when a first logical register size is larger than either a first high bank physical register size or a first low bank physical register size, wherein the smaller of said first high bank physical register size and said first low bank physical register size corresponds to a first partial width register to which said first logical register would otherwise be renamed, said first logical register being one of said current set of logical registers, said first partial width register being part of a first physical register, said first physical register being one of said current set of physical registers, wherein said first logical register has a first and second contiguous portions, said first partial width register corresponds to said first contiguous portion, said first physical register has a third portion contiguous with said first partial width register, and said third portion corresponds to said second portion; and a partial width stall overrider, coupled to said partial width stall detector, for overriding said stalling of said array means when a first set of zero bits corresponding to said first logical register indicates that said second contiguous portion of said first logical register contains zeros.

22. The apparatus of claim 21 further comprising:

a zero extender, coupled to said high bank and low bank arrays and said physical registers, for zeroing said third contiguous portion of said first physical register when said first set of zero bits indicates that said second contiguous portion of said first logical register contains zeros.

23. The apparatus of claim 22 further comprising:

an idiom recognizer, coupled to said high bank and low bank arrays, for detecting operations that zero either all or partial widths of said logical registers and setting and clearing said zero bits to indicate which portions of said logical registers contain zeros.

24. The apparatus of claim 23 further comprising:

an invalidating circuit, coupled to said high bank array, said low bank array, and said partial width stall detector, for selectively setting to an invalid state a current set of valid bits associated with said logical registers in response to said partial width stall detector, said high bank array and said low bank array only renaming individual logical registers of said current set of logical registers whose associated valid bits are in a valid state.

25. The apparatus of claim 24 wherein operations of said current set of operations are issued simultaneously but maintain program code order and wherein said high bank array and said low bank array rename said current set of logical registers simultaneously.

26. The apparatus of claim 25 wherein said current set of logical registers are integer registers.

27. A microprocessor comprising:

a bus interface unit for interfacing with a bus;

an instruction decode and fetch unit coupled to said bus interface unit for decoding a current set of operations for a given cycle;

a plurality of execution units coupled to said instruction decode and fetch means for simultaneously executing the decoded operations; and means for renaming a current set of logical registers to a current set of physical registers of an extended register set, said current set of logical registers being specified by a current set of operations, said renaming means including, array means for renaming said current set of logical registers to said current set of physical registers, wherein said logical registers and said physical registers have partial width registers, wherein said logical registers have logical register sizes and said physical registers have physical register sizes, wherein each of said physical registers has a corresponding set of zero bits for indicating whether predetermined portions of said logical registers contain zeros;

size comparison means, coupled to said array means, for comparing said logical register sizes to said physical register sizes;

partial width stall means, coupled to said size comparison means and said array means, for stalling renaming of a first logical register by said array means when said first logical register is of larger size than a corresponding first partial width register to which said first logical register would otherwise be renamed by said array means, said first logical register being one of said current set of logical registers, said first partial width register being part of a first physical register, said first physical register being one of said current set of physical registers, wherein said first logical register has a first and second contiguous portions, said first partial width register corresponds to said first contiguous portion, said first physical register has a third portion contiguous with said first partial width register, and said third portion corresponds to said second portion; and partial width stall override means, coupled to said partial width stall means, for overriding said stalling of said array means when a first set of zero bits corresponding to said first logical register indicates that said second contiguous portion of said first logical register contains zeros.

28. The microprocessor of claim 27 further comprising:

zero extension means, coupled to said array means and said physical registers, for zeroing said third contiguous portion of said first physical register when said first set of zero bits indicates that said second contiguous portion of said first logical register contains zeros.

29. The microprocessor of claim 28 further comprising:

idiom recognizer means, coupled to said array means, for detecting operations that zero either all or partial widths of said logical registers and setting and clearing said zero bits to indicate which portions of said logical registers contain zeros.

30. The microprocessor of claim 29 further comprising:

invalidating means, coupled to said array means and said partial width stall means, for selectively setting to an invalid state a current set of valid bits associated with said logical registers in response to said partial width stall means, said array means only renaming individual logical registers of the current set of logical registers whose associated valid bits are in a valid state.

31. The microprocessor of claim 30 wherein operations of said current set of operations are issued simultaneously but maintain program code order and wherein said array means renames said current set of logical registers simultaneously.

32. The microprocessor of claim 31 wherein said current set of logical registers are integer registers.

33. The microprocessor of claim 32 wherein said array means also for independently renaming high byte and low byte partial widths of said logical registers.

34. A microprocessor comprising:

a bus interface unit for interfacing with a bus;

an instruction decode and fetch unit coupled to said bus interface unit for decoding a current set of operations for a given cycle;

a plurality of execution units coupled to the instruction decode and fetch unit for simultaneously executing the decoded operations; and a renaming circuit coupled to said instruction decode and fetch unit, said renaming circuit for renaming a current set of logical registers to a current set of physical registers of an extended register set, said current set of logical registers being specified by a current set of operations, said renaming circuit including, an array for renaming said current set of logical registers to said current set of physical registers by storing rename values corresponding to said physical registers in array locations associated with said logical registers, wherein said logical registers and said physical registers have partial width registers, wherein said logical registers have logical register sizes and said physical registers have physical register sizes, wherein each of said physical registers has a corresponding set of zero bits for indicating whether predetermined portions of said logical registers contain zeros;

a size comparator, coupled to said array, for comparing said logical register sizes to said physical register sizes;

a partial width stall detector, coupled to said size comparator and said array, for stalling renaming of a first logical register by said array when said first logical register is of larger size than a corresponding first partial width register to which said first logical register would otherwise be renamed by said array, said first logical register being one of said current set of logical registers, said first partial width register being part of a first physical register, said first physical register being one of said current set of physical registers, wherein said first logical register has a first and second contiguous portions, said first partial width register corresponds to said first contiguous portion, said first physical register has a third portion contiguous with said first partial width register, and said third portion corresponds to said second portion; and a partial width stall overrider, coupled to said partial width stall detector, for overriding said stalling of said array when a first set of zero bits corresponding to said first logical register indicates that said second contiguous portion of said first logical register contains zeros.

35. The microprocessor of claim 34 further comprising:

a zero extender, coupled to said array and said physical registers, for zeroing said third contiguous portion of said first physical register when said first set of zero bits indicates that said second contiguous portion of said first logical register contains zeros.

36. The microprocessor of claim 35 further comprising:

an idiom recognizer, coupled to said array, for detecting operations that zero either all or partial widths of said logical registers and setting and clearing said zero bits to indicate which portions of said logical registers contain zeros.

37. The microprocessor of claim 36 further comprising:

an invalidating circuit, coupled to said array and said partial width stall detector, for selectively setting to an invalid state a current set of valid bits associated with said logical registers in response to said partial width stall detector, said array only renaming individual logical registers of the current set of logical registers whose associated valid bits are in a valid state.

38. The microprocessor of claim 37 wherein operations of said current set of operations are issued simultaneously but maintain program code order and wherein said array means renames said current set of logical registers simultaneously.

39. The microprocessor of claim 38 wherein said current set of logical registers are integer registers.

40. The microprocessor of claim 39 wherein said array also for independently renaming high byte and low byte partial widths of said logical registers.

41. A computer system comprising:

bus means for providing a communication interface;

memory means coupled to said bus means for storing instructions and computer data;

interface means coupled to said bus means for providing data input and data output to interface with a user; and microprocessor means coupled to said bus means for executing said instructions and processing said computer data, said microprocessor means having a means for renaming a current set of logical registers to a current set of physical registers, said current set of logical registers being associated with a current set of operations, said renaming means including, array means for renaming said current set of logical registers to said current set of physical registers, wherein said logical registers and said physical registers have partial width registers, wherein said logical registers have logical register sizes and said physical registers have physical register sizes, wherein each of said physical registers has a corresponding set of zero bits for indicating whether predetermined portions of said logical registers contain zeros;

size comparison means, coupled to said array means, for comparing said logical register sizes to said physical register sizes;

partial width stall means, coupled to said size comparison means and said array means, for stalling renaming of a first logical register by said array means when said first logical register is of larger size than a corresponding first partial width register to which said first logical register would otherwise be renamed by said array means, said first logical register being one of said current set of logical registers, said first partial width register being part of a first physical register, said first physical register being one of said current set of physical registers, wherein said first logical register has a first and second contiguous portions, said first partial width register corresponds to said first contiguous portion, said first physical register has a third portion contiguous with said first partial width register, and said third portion corresponds to said second portion; and partial width stall override means, coupled to said partial width stall means, for overriding said stalling of said array means when a first set of zero bits corresponding to said first logical register indicates that said second contiguous portion of said first logical register contains zeros.

42. The computer system of claim 41 further comprising:

zero extension means, coupled to said array means and said physical registers, for zeroing said third contiguous portion of said first physical register when said first set of zero bits indicates that said second contiguous portion of said first logical register contains zeros.

43. The computer system of claim 42 further comprising:

idiom recognizer means, coupled to said array means, for detecting operations that zero either all or partial widths of said logical registers and setting and clearing said sets of zero bits to indicate which portions of said logical registers contain zeros.

44. The computer system of claim 43 further comprising:

invalidating means, coupled to said array means and said partial width stall means, for selectively setting to an invalid state a current set of valid bits associated with said logical registers in response to said partial width stall means, said array means only renaming individual logical registers of the current set of logical registers whose associated valid bits are in a valid state.

45. The computer system of claim 44 wherein operations of said current set of operations are issued simultaneously but maintain program code order and wherein said array means renames said current set of logical registers simultaneously.

46. The computer system of claim 45 wherein said current set of logical registers are integer registers.

47. The computer system of claim 46 wherein said array means also for independently renaming high byte and low byte partial widths of said logical registers.

48. A computer system comprising:

a bus for providing communication interface;

a memory coupled to said bus for storing instructions and computer data;

an interface circuit coupled to said bus for providing data input and data output to interface with a user; and a microprocessor coupled to said bus means for executing said instructions and processing said computer data, said microprocessor having a renaming mechanism for renaming a current set of logical registers to a current set of physical registers, said current set of logical registers being associated with a current set of operations, said renaming mechanism including, an array for renaming said current set of logical registers to said current set of physical registers by storing rename values corresponding to said physical registers in array locations associated with said logical registers, wherein said logical registers and said physical registers have partial width registers, wherein said logical registers have logical register sizes and said physical registers have physical register sizes, wherein each of said physical registers has a corresponding set of zero bits for indicating whether predetermined portions of said logical registers contain zeros;

a size comparator, coupled to said array, for comparing said logical register sizes to said physical register sizes;

a partial width stall detector, coupled to said size comparator and said array, for stalling renaming of a first logical register by said array when said first logical register is of larger size than a corresponding first partial width register to which said first logical register would otherwise be renamed by said array, said first logical register being one of said current set of logical registers, said first partial width register being part of a first physical register, said first physical register being one of said current set of physical registers, wherein said first logical register has a first and second contiguous portions, said first partial width register corresponds to said first contiguous portion, said first physical register has a third portion contiguous with said first partial width register, and said third portion corresponds to said second portion; and a partial width stall overrider, coupled to said partial width stall detector, for overriding said stalling of said array when a first set of zero bits corresponding to said first logical register indicates that said second contiguous portion of said first logical register contains zeros.

49. The computer system of claim 48 further comprising:

a zero extender, coupled to said array and said physical registers, for zeroing said third contiguous portion of said first physical register when said first set of zero bits indicates that said second contiguous portion of said first logical register contains zeros.

50. The computer system of claim 49 further comprising:

an idiom recognizer, coupled to said array, for detecting operations that zero either all or partial widths of said logical registers and setting and clearing said zero bits to indicate which portions of said logical registers contain zeros.

51. The computer system of claim 50 further comprising:

an invalidating circuit, coupled to said array and said partial width stall detector, for selectively setting to an invalid state a current set of valid bits associated with said logical registers in response to said partial width stall detector, said array only renaming individual logical registers of the current set of logical registers whose associated valid bits are in a valid state.

52. The computer system of claim 51 wherein operations of said current set of operations are issued simultaneously but maintain program code order and wherein said array means renames said current set of logical registers simultaneously.

53. The computer system of claim 52 wherein said current set of logical registers are integer registers.

54. The computer system of claim 53 wherein said array also for independently renaming high byte and low byte partial widths of said logical registers.

55. In a mechanism utilizing an array memory for renaming a current set of logical registers to a current set of physical registers of an extended register set, said current set of logical registers being associated with a current set of operations, wherein said logical registers and said physical registers have partial width registers, wherein said logical registers have logical register sizes and said physical registers have physical register sizes, a method for detecting and selectively overriding partial width stall conditions, said method comprising the steps of:

temporarily assigning said current set of logical registers to said current set of physical registers;

comparing said logical register sizes to said physical register sizes;

detecting a partial width stall condition when a first logical register is of larger size than a first partial width register to which said first logical register is temporarily assigned, said first partial width register being part of a first physical register of said current said of physical registers, wherein said first logical register has a first and second contiguous portions, said first partial width register corresponds to said first contiguous portion, said first physical register has a third portion contiguous with said first partial width register, and said third portion corresponds to said second portion;

overriding said partial width stall condition when said second contiguous portion of said first logical register contains zeros; and renaming said current set of logical registers to said current set of physical registers when a partial width stall condition is detected but overridden.

56. The method of claim 55 wherein said renaming also occurs when a partial width stall condition is not detected.

* * * * *